United States Patent
Hinkle

(10) Patent No.: US 6,442,533 B1
(45) Date of Patent: Aug. 27, 2002

(54) MULTI-PROCESSING FINANCIAL TRANSACTION PROCESSING SYSTEM

(76) Inventor: William H. Hinkle, 464 Gilpin St., Denver, CO (US) 80228

(*) Notice: Subject to any disclaimer, the term of this patent is extended or adjusted under 35 U.S.C. 154(b) by 0 days.

(21) Appl. No.: 09/181,698

(22) Filed: Oct. 28, 1998

Related U.S. Application Data

(60) Provisional application No. 60/063,714, filed on Oct. 29, 1997.

(51) Int. Cl.[7] ............................................. G06F 17/60
(52) U.S. Cl. ........................... 705/35; 705/30; 705/32; 705/36; 705/37; 705/38
(58) Field of Search ............................. 705/37, 38, 36, 705/35, 30, 32

(56) References Cited

U.S. PATENT DOCUMENTS

| | | | |
|---|---|---|---|
| 3,697,693 A | | 10/1972 | Deschenes et al. ............ 179/2 |
| 4,001,568 A | | 1/1977 | Iizuka et al. ................. 235/156 |
| 4,025,905 A | | 5/1977 | Gorgens .................. 340/172.5 |
| 4,321,672 A | | 3/1982 | Braun et al. ................. 364/408 |
| 4,412,287 A | * | 10/1983 | Braddock, III .............. 364/408 |
| 4,621,326 A | | 11/1986 | Rawlins ....................... 364/408 |
| 4,625,276 A | | 11/1986 | Benton et al. ............... 364/408 |
| 4,713,761 A | | 12/1987 | Sharpe et al. ............... 364/406 |
| 4,727,243 A | | 2/1988 | Savar ........................... 235/379 |
| 4,774,664 A | * | 9/1988 | Campbell et al. ............. 705/38 |
| 4,948,174 A | | 8/1990 | Thomson et al. ............. 283/58 |
| 4,994,964 A | | 2/1991 | Wolfberg et al. ............ 364/408 |
| 5,025,373 A | | 6/1991 | Keyser, Jr. et al. ......... 364/408 |
| 5,057,677 A | | 10/1991 | Bertagna et al. ............ 235/381 |
| 5,093,787 A | | 3/1992 | Simmons ..................... 364/406 |
| 5,117,356 A | | 5/1992 | Marks ......................... 364/406 |
| 5,121,945 A | | 6/1992 | Thomson et al. ............. 283/58 |
| 5,170,480 A | | 12/1992 | Mohan et al. ............... 395/600 |
| 5,222,018 A | | 6/1993 | Sharpe et al. ............... 364/406 |
| 5,237,498 A | * | 8/1993 | Tenma et al. ................. 705/30 |

(List continued on next page.)

FOREIGN PATENT DOCUMENTS

| | | | | |
|---|---|---|---|---|
| WO | WO 96/23258 | * | 8/1996 | ........... G06F/11/00 |
| WO | WO 99/22329 | * | 5/1999 | ........... G06F/17/60 |

OTHER PUBLICATIONS

"IBM Stakes Big Claim in Data Mining Market", Apr. 10, 1996, The Gale Group, Report on IBM, v13, pN/A.*

"Customer Analysis Helps Direct Product Initiatives", Mar. 10, 1997, Phillips Business Information, vol. 14, issue 6.*

(List continued on next page.)

Primary Examiner—Tariq R. Hafiz
Assistant Examiner—Akiba Robinson-Boyce

(57) ABSTRACT

A financial transaction processing system is disclosed, wherein substantial processing efficiencies are provided with, additionally, a substantial decrease in the size of the executable code. Each transaction processed by the transaction processing system is described by a transaction data descriptor that includes a series of subtransaction data descriptions of actions that can be performed independently of one another. Thus, complex transaction processing logic is substantially removed from the executable code, and instead such transaction data descriptors are processed interpretatively. Moreover, the independence of the subtransactions allows the subtransactions of a transaction to be processed in parallel when performed on a multiprocessor computer. Additionally, the transaction processing system provides account balancing enhancements in that there are control columns in various data tables that are automatically updated during transaction processing so that by comparing control column totals, an indication of the integrity of current financial records is provided. Additionally, the transaction processing system provides full auditability in that any changes to financial data can be traced for any effective period of time into the past so that auditors can periodically perform a full audit of the financial transaction data retained by the transaction processing system.

8 Claims, 29 Drawing Sheets

U.S. PATENT DOCUMENTS

| | | | | |
|---|---|---|---|---|
| 5,262,942 A | | 11/1993 | Earle | 364/408 |
| 5,317,504 A | * | 5/1994 | Nakayama | 705/30 |
| 5,390,113 A | | 2/1995 | Sampson | 364/419.19 |
| 5,418,713 A | | 5/1995 | Allen | 364/403 |
| 5,420,405 A | | 5/1995 | Chasek | 235/379 |
| 5,438,509 A | | 8/1995 | Heffron | 364/408 |
| 5,438,517 A | | 8/1995 | Sennott et al. | 364/449 |
| 5,444,616 A | | 8/1995 | Nair et al. | 364/405 |
| 5,448,471 A | | 9/1995 | Deaton et al. | 364/401 |
| 5,448,729 A | | 9/1995 | Murdock | 395/600 |
| 5,452,445 A | | 9/1995 | Hallmark et al. | 395/600 |
| 5,455,407 A | | 10/1995 | Rosen | 235/280 |
| 5,457,305 A | | 10/1995 | Akel et al. | 235/379 |
| 5,465,328 A | | 11/1995 | Dievendorff et al. | 395/182.13 |
| 5,496,991 A | | 3/1996 | Delfer, III et al. | 235/379 |
| 5,500,513 A | | 3/1996 | Langhans et al. | 235/380 |
| 5,517,406 A | | 5/1996 | Harris et al. | 364/408 |
| 5,517,644 A | | 5/1996 | Murdock | 395/650 |
| 5,555,503 A | | 9/1996 | Kyrtsos et al. | 364/449 |
| 5,557,742 A | | 9/1996 | Smaha et al. | 395/186 |
| 5,576,945 A | | 11/1996 | McCline et al. | 364/131 |
| 5,581,749 A | | 12/1996 | Hossain et al. | 395/600 |
| 5,612,883 A | | 3/1997 | Shaffer et al. | 364/460 |
| 5,621,812 A | | 4/1997 | Deaton et al. | 382/100 |
| 5,629,855 A | | 5/1997 | Kyrtsos et al. | 364/460 |
| 5,630,072 A | | 5/1997 | Dobbins | 399/222 |
| 5,630,073 A | | 5/1997 | Nolan | 395/245 |
| 5,634,012 A | | 5/1997 | Stefik et al. | 395/239 |
| 5,636,277 A | | 6/1997 | Nagahama | 380/4 |
| 5,640,323 A | | 6/1997 | Kleimenhagen et al. | 364/423.98 |
| 5,652,570 A | | 7/1997 | Lepkofker | 340/573 |
| 5,657,226 A | | 8/1997 | Shin et al. | 364/424.027 |
| 5,657,487 A | | 8/1997 | Doner | 455/456 |
| 5,774,879 A | * | 6/1998 | Custy et al. | 705/35 |
| 5,862,325 A | * | 1/1999 | Reed et al. | 709/201 |
| 5,864,685 A | * | 1/1999 | Hagan | 705/35 |
| 5,937,395 A | * | 8/1999 | Iwamura | 705/30 |

OTHER PUBLICATIONS

Bers, Joanna Smith, "MPP vs. SMP", Oct. 1995, Bank Systems & Technology, v 32, n10, p 30–35.*

Sampson, Wesley C., "Transaction Index: A Tool for Auditors", Spring 1996, Internal Auditing, pp. 16–24.*

Letter to Examiner Robinson–Boyce from inventor dated Aug. 14, 2001.

Letter to Examiner Robinson–Boyce from inventor dated Jul. 16, 2001.

Ferguson, eWeek, "Ellison's "War" Perplexes Some", Aug. 6, 2000.

Edwards, Electronic Engineering Times, "Architects Wrestle with Multiprocessor Options", Aug. 6, 2001, pp. 48.

* cited by examiner

FIG. 4B

OBTAIN THE LIST (IF ANY) OF DESCRIPTIONS OF LICENSEE SERVICE RESELLERS, WHEREIN THE SERVICE RESELLERS PROVIDE_____
_____.

INSERT THIS INFORMATION INTO THE LICENSEE SERVICE RESELLERS MASTER TABLE.

OBTAIN IDENTIFIERS INDICATING OBJECTIVES FOR THE ACCOUNTS HELD BY THE LICENSEE AND INSERT THESE IDENTIFIERS INTO AN ACCOUNT OBJECTIVES MASTER TABLE INDEXED BY LICENSEE.

OBTAIN THE LIST (IF ANY) OF DESCRIPTIONS OF LEGAL CAPACITIES THAT THE LICENSEE SERVES FOR ITS ACCOUNTS, AND INSERT THIS INFORMATION INTO THE ACCOUNT LEGAL CAPACITY MASTER TABLE.

OBTAIN IDENTIFIERS INDICATING LEGAL JURISDICTIONS OF ACCOUNTS HELD BY LICENSEE, AND INSERT THESE IDENTIFIERS INTO A LEGAL JURISDICTION MASTER TABLE INDEXED BY LICENSEE.

OBTAIN IDENTIFIERS FOR ACCOUNT REPRESENTATIVES FOR ACCOUNTS HELD BY LICENSEE, AND INSERT THESE IDENTIFIERS INTO AN ACCOUNT REPRESENTATIVE MASTER TABLE INDEXED BY LICENSEE.

OBTAIN THE LIST OF DESCRIPTIONS OF NAMES (IF ANY) THAT THE LICENSEE USES TO INTERNALLY GROUP INVESTMENTS. INSERT THIS INFORMATION INTO THE ACCOUNT REGISTRATION MASTER TABLE.

FOR EACH ACCOUNT OF LICENSEE, GENERATE A ROW OF THE ACCOUNT MASTER TABLE 84 BY OBTAINING THE INFORMATION NECESSARY TO PROCESS TRANSACTIONS ON THE ACCOUNT.

OBTAIN THE LIST OF _____
_____.

INSERT THIS INFORMATION INTO THE ACCOUNT COMMUNICATION LINKS MASTER TABLE.

FOR EACH TRANSACTION TYPE DESIRED TO BE PERFORMED BY LICENSEE, OBTAIN: (A) AN IDENTIFIER IDENTIFYING THE TRANSACTION; (B) A DESCRIPTION OF THE TRANSACTION; (C) A POSTING CODE; (D) A VALUE INDICATIVE OF WHETHER THE TRANSACTION REQUIRES A PROCESSING OF A FINANCIAL INSTRUMENT; (E) A BOOLEAN VALUE INDICATING WHETHER A SETTLEMENT OF A BUY OR SELL WILL BE PENDING. INSERT THIS INFORMATION INTO THE TRANSACTION MASTER TABLE. FOR EACH TRANSACTION TYPE IDENTIFIED ABOVE, DETERMINE A TRANSACTION DECOMPOSITION INTO SUBTRACTIONS AND ENCODE THE SUBTRACTION ACTIONS TO BE PERFORMED. INSERT THE (TRANSACTION IDENTIFIER, SUBTRANSACTION ENCODING) PAIR INTO THE TRANSACTION PROCESSING MASTER TABLE.

FIG. 4C

OBTAIN THE LIST OF _____
_____
_____.

INSERT THIS INFORMATION INTO THE RECURRING TRANSACTIONS MASTER TABLE.

USING INFORMATION ON EACH ENTITY TO BE FINANCIALLY TRACKED, GENERATE AN ENTITY ATTRIBUTE SCHEMA FOR LICENSEE; INSERT THIS INFORMATION INTO THE ENTITY ATTRIBUTE MASTER TABLE 92.

DETERMINE THE LICENSEE'S TRANSACTIONS THAT ARE APPLICABLE TO EACH FINANCIAL ENTITY OF LICENSEE, AND INSERT THE INFORMATION INTO THE ENTITY TRANSACTION MASTER TABLE.

USING (A) THE ACCOUNT TYPE IDENTIFIERS FROM THE LICENSEE GENERAL LEDGER DEFINITIONS MASTER TABLE; AND (B) THE ACCOUNT SUBTYPES (ACNs) FROM THE LICENSEE ACCOUNT SUBTYPE DEFAULT DEFINITION MASTER TABLE, OBTAIN THE LICENSEE'S GENERAL LEDGER SCHEMA FOR ASSOCIATING ACCOUNT TYPES WITH ACCOUNT SUBTYPES (ACNs) FOR BOTH ASSETS AND LIABILITIES OF THE LICENSEE. INSERT THIS INFORMATION INTO THE SYSTEM GENERAL LEDGER TABLE.

GENERATE THE TRANSACTION JOURNAL USING _____
_____
_____.

GENERATE THE SYSTEM TRADE SETTLEMENT FROM _____
_____
_____.

GENERATE THE SYSTEM SUMMARY TABLE FROM _____
_____
_____.

GENERATE THE SYSTEM REJECT TABLE FROM _____
_____
_____.

GENERATE THE SYSTEM TRANSACTION COUNT TABLE FROM _____
_____
_____.

FIG. 4D

GENERATE THE CUSTOMER INCOME STATEMENT (INCOME/EXPENSE) TABLE FROM _____

GENERATE THE CUSTOMER CASH FLOW (RECEIPTS/DISBURSEMENTS) TABLE FROM _____

GENERATE THE CUSTOMER BALANCE SHEET TABLE FROM _____

GENERATE THE CUSTOMER CAPITAL GAIN TABLE FROM _____

GENERATE THE CUSTOMER PENDING INCOME TABLE FROM _____

GENERATE THE CUSTOMER CAPITAL ADJUSTMENTS TABLE FROM _____

GENERATE THE PERFORMANCE MEASUREMENTS TABLE FROM _____

END

ACCESS ENTITY ATTRIBUTE TABLE

USING "LICENSEE," AND THE ENTITY NUMBER (DENOTED "ENT.ID" HEREINAFTER) IN "TRANSACTION," RETRIEVE, INTO WORKING STORAGE, THE FOLLOWING CORRESPONDING VALUES FROM A ROW OF THE ENTITY ATTRIBUTE MASTER TABLE 92: ACN (ASSET); ACN (LIABILITY); DIVERSIFICATION: TYPE, GROUP, CLASS; PERFORMANCE MEASURE: TYPE, GROUP, CLASS; INVESTED INCOME; INVESTED PRINCIPAL; TOTAL UNITS. ADDITIONALLY, GET THE INDEX OF THIS ROW (DENOTED "EA_ENT_ROW_ID" HEREINAFTER) INTO WORKING STORAGE.

ACCESS THE ENTITY TRANSACTION TABLE

USING "LICENSEE" AND "ENT_ID" AND "TRANS_CODE," VERIFY THE EXISTENCE OF A CORRESPONDING ROW IN THE ENTITY TRANSACTION MASTER TABLE OF A TRANSACTION TO BE PERFORMED.

ACCESS THE ENTITY MASTER TABLE

USING "ENT_ID," RETRIEVE, INTO WORKING STORAGE, THE FOLLOWING CORRESPONDING VALUES FROM A ROW OF THE ENTITY MASTER TABLE: INCOME RATE, INCOME EX-DIVIDEND RATE, INCOME RECORD DATE, INCOME PAYMENT DATE, CAPITAL ADJUSTMENT RATE, CAPITAL ADJUSTMENT EX-ADJUSTMENT DATE, CAPITAL ADJUSTMENT RECORD DATE, CAPITAL ADJUSTMENT PAYMENT DATE.

TEST OTHER ASSETS

USING "LICENSEE," AND "ACCT_TYPE," AND ACN (ASSET) IN WORKING STORAGE, ASSIGN TO "GL_ROWID [ENT_ACN_ASSET]" THE INDEX (POINTER) OF THE CORRESPONDING ROW IN THE GENERAL LEDGER TABLE 88.

TEST OTHER LIABILITIES

USING "LICENSEE," AND "ACCT_TYPE," AND ACN (LIABILITY) IN WORKING STORAGE, ASSIGN TO "GL_ROWID [ENT_ACN_LIAB]" THE INDEX (POINTER) OF THE CORRESPONDING ROW IN THE GENERAL LEDGER TABLE 88.

TEST OTHER INVESTED INCOME

USING "LICENSEE," AND ACCT_TYPE" AND, THE ACCT_SUBTYPE (ACN) FOR LIABILITY INVESTED INCOME (II) IN THE TEMPORARY SUBTYPE TABLE, ASSIGN TO "GL_ROWID [II]" THE INDEX (POINTER) OF THE CORRESPONDING ROW IN THE GENERAL LEDGER TABLE 88.

TEST OTHER INVESTED PRINCIPAL

USING "LICENSEE," AND "ACCT_TYPE" AND, THE ACCT_SUBTYPE (ACN) FOR LIABILITY INVESTED PRINCIPAL (IP) IN THE TEMPORARY SUBTYPE TABLE, ASSIGN TO "GL_ROWID [IP]" THE INDEX (POINTER) OF THE CORRESPONDING ROW IN THE GENERAL LEDGER TABLE.

( END )

PROCESS_INVESTED_INCOME

PROCESS_INVESTED_PRINCIPAL

MULTI-PROCESSING FINANCIAL TRANSACTION PROCESSING SYSTEM

This application claims benefit of U.S. Provisional application Ser. No. 60/063,714 filed Oct. 29, 1997.

FIELD OF THE INVENTION

The present invention relates to a financial transaction processing system, and in particular, to such a system that is capable of decomposing transactions into subtransactions and multi-processing subtransactions simultaneously.

BACKGROUND OF THE INVENTION

Computerized data processing systems for processing financial transactions have become increasingly more complex as further strides toward automation have occurred. Such complexity has generated a number of related difficulties for the financial data processing industry. In particular, complex financial transaction processing systems may have subtle programming defects or errors that may go unnoticed for long periods of time before the extent of the problems thereby generated are fully recognized. For example, the number of positions allotted for the dating of transactions has recently been problematic, wherein the dates for the millennium starting at the year 2000 can be problematic for many financial transaction processing systems.

In addition, such complex financial transaction processing systems also are typically incapable of being fully audited. That is, it is common practice in the financial data processing industry to provide only partial auditability in that it is generally believed that the amount of data required to be stored for full auditability is so large as to not be cost effective.

Further, in many circumstances, the rate of transaction increase is becoming problematic in that progressively larger computers are required for processing financial transactions at an acceptable rate. This problem is exacerbated by the fact that such transaction processing system are not architected for use on multi-processing machines having a plurality of processors. Thus, the advantages of parallel-processing computers cannot be fully utilized by such systems.

Accordingly, it would be advantageous to have a financial transaction processing system that alleviates the above difficulties, and that additionally, provides flexibility to adapt to the changing business needs of business enterprises so that the transactions processed and the respective reports generated may be modified easily according to business constraints and demands.

SUMMARY OF THE INVENTION

The present invention is a financial transaction processing system that achieves substantial increases in auditability and processing efficiency. In particular, the present invention provides auditable trails or history in a number of different ways. For example, financial data within transactions is used in the present invention to update various control fields in different tables or files so that cross-checks of system financial integrity can be performed for assuring that, for example, cash fields, total units fields, and cost fields balance appropriately across system data tables provided by the present invention. Additionally, the present invention provides a full range of auditable history files for each system data table having information that is required during auditing.

The present invention also performs financial transaction processing using a novel computational paradigm. That is, the financial transaction processing system of the present invention has an architecture wherein financial transactions can be decomposed into corresponding collections of independent subtransactions, such that for each input transaction, the corresponding collection of subtransactions are performed by operations that are independent of one another. Thus, the subtransactions can be performed in any order, including in an overlapping fashion, such as may occur during multiprocessing of these subtransactions on a computer having multiple processors.

Further, note that each of the subtransaction is described by a relatively short (e.g., less than 8 characters) text string that can be straightforwardly interpreted as an operation (e.g., either plus or minus) together with a series of operands, in particular, a first operand having a value to be used in modifying a data table field (column) specified by a second operand. Such high level descriptions of subtransactions provide both compact conceptualization and a reduction in the total size of the executable code for the present invention. Accordingly, when one of the subtransactions is performed, not only is its corresponding operation performed on the operands but additionally, control fields such as those mentioned above are updated appropriately in various data tables for the present invention to enhance auditability of the financial data resulting from the transaction processing. Further, note that since the subtransactions are independent of one another and their executable code is relatively small, there is no need for lengthy and complex flow of control transaction processing modules. That is, the size of the code for the present invention may be up to 100 times smaller than many prior art transaction processing systems. Accordingly, this has a substantial positive impact on the efficiency of the present invention in that the swapping of program elements in and out of primary computer memory is substantially reduced.

In another aspect of the present invention, the financial transactions of a plurality of business enterprises can be processed in an interleaved manner. In particular, since the present invention is substantially data driven, including the descriptions of the transactions and their related subtransactions, the present invention can be easily modified to incorporate both different or updated versions of transactions and associated data tables for an existing business enterprise (e.g., also denoted "licensee" hereinafter). Additionally, the transactions and related data tables for an entirely new or different business enterprise (licensee) may be straightforwardly incorporated into the present invention so that its transactions can be interleaved with the transactions of other business enterprises. Thus, transaction processing may be performed by the present invention for business enterprises having different transactions, different account record structures and differently organized general ledgers substantially without modifying the program elements of the transaction processing system.

For example, the present invention can be used to simultaneously process transactions for:

(1) a single software application such as an investment management or telecommunications billing system, (2) multiple disparate software applications such as investment management, and telecommunications billing, paying agencies, etc., all with disparate definitions.

Accordingly, the present invention may be viewed as a software engine, or a user-definable transaction processing tool that can be adapted to a variety of industry specific software application needs without changing the actual program code. That is, by surrounding the present invention with application specific software for inputting transaction data to the multi-processing financial transaction processor of the present invention and retrieving data from the multi-processing financial transaction processor of the present invention, a particular business enterprise can have substantially all of its financial records in condition for auditing on a daily or weekly basis.

The present invention may be further characterized along the following dimensions: flexibility, auditability, multiprocessing, efficiency and size, these dimensions being discussed, in turn, hereinbelow.

Flexibility is achieved by permitting a business enterprise to define:

(1) a series of "reference" tables (also denoted "master tables") that describe the appropriate management decision-making, accounting structure, and regulatory information for the specific application;

(2) a series of audit controls and system procedures that provide for complete control of all processing and prevent the overwriting of any original data;

(3) a series of institutional and customer reporting files, known as the "driven" tables; and (4) the specific processing content of each individual transaction to be processed via a series of table definitions, known as the "driving" tables.

Thus, transactions may be customized according to the business needs of a business enterprise.

Auditability is achieved by;

(1) providing separate control columns for cash, units and cost basis (if any) in detail records generated and stored for each financial transaction;

(2) repeating these three control columns, or variations thereof, in at least three different tables so that subsequent summations of each of the four tables will result in similar balances and thus prove that no critical data has been lost in the course of processing, as one familiar with auditing and financial transactions systems will understand;

(3) adding appropriate data columns:
   (a) to each reference table or master row for maintaining a history of the effects of add, change and delete commands in a current database as well as an archive database;
   (b) to each original file record (i.e. table row) that represents an add to a current database as well as the periodic archive and purge to a permanent database;
   (c) to tables for retaining transaction processing data representing error identification, error negation and error correction.

Thus, auditabilty of transaction records is achieved by four sets of files for a specific period. These are: (a) a snapshot of all the reference files at the end of the period;
(b) snapshots of a history file for each master table, wherein the corresponding history file (table) contains all changes to the master table during the specific period; (c) a snapshot of all financial transactions for the specific period, and (d) a snapshot of all of the "driven" tables at the end of the period.

Multiprocessing is achieved by:

(1) decomposing the processing of the present invention into a series of separate and independent subprocesses that may be simultaneously performed on any number of simultaneous processors, and (2) decomposing input transactions into a series of subtransactions that are processed by independent processes, which may be executed in any particular order, with complete auditability.

For example, multiprocessing can be achieved by allocating the next prescribed subtransaction process to the next available processor.

Efficiency is achieved by:

(1) Defining and utilizing only four standard processing models that perform all prescribed functionality and auditability of the present invention. The models are:
   (a) Processing Model 1 provides an architecture for maintaining historical transaction data so that financial changes can be traced through time;
   (b) Processing Model 2 provides an architecture for automatically maintaining data columns such as Units, Debits and Credits for cross checking table sums to assure that the financial records for a business enterprise balance;
   (c) Processing Model 3 provides an architecture for automatically maintaining financial records relating to financial instruments such as stocks, bonds, real estate, etc.; and
   (d) Processing Model 4 provides an architecture for producing a common processing format for maintaining customer and institutional data tables.

(2) Defining only four primary program modules for controlling functionality of the present invention, these modules being:
   (a) a transaction processing controller module for receiving transactions to be processed, and controlling the processing thereof;
   (b) a preprocessor and decomposer module for determining the validity of a received transaction, assuring that all data tables and rows thereof are available for processing the transaction, and retrieving the appropriate subtransactions data descriptions to be processed;
   (c) a subtransaction scheduling module for scheduling instantiations of the subtransaction processing module on each of one or more processors; and
   (d) a subtransaction processing module for performing each subtransaction retrieved by the preprocess or and decomposer module.

(3) Utilizing a number of software switches to control which tables within collection of "driven"tables are to be updated when a specific type of transaction is to be processed.

Thus, by providing a small number of processing models, decomposing input transactions, and supplying only the necessary subtransaction descriptions, the reliability of the transaction processing system of the present invention is substantially increased.

The software for the present invention is small in size (both source code and object code) due to the following:

(1) defining business enterprise financial data processing methods, accounting structures, and regulatory definitions as data rather than program code;

(2) reducing the processing content to a series of individual transactions; and (3) reducing all financial transactions to a collection of subtransactions wherein each subtransaction includes an operator and two or more operands in an 8-character string.

Thus, the financial processing by the present invention may be performed on several transactions at a time, one transaction at a time, or different processors within a multiprocessor context. Or, the subtransactions for a specific transaction may be spread over several simultaneous processors This means that the business enterprise is afforded a large number of options in tailoring the present invention.

Hence, by defining the accounting structure and processing functionality as data rather than actual program code, the size of the total code required to process a specific industry application may be substantially reduced compared to prior art transaction processing systems. For example, the executable code for the present invention may be less than one megabyte (1 MB). Thus, since the secondary cache attached to each processor in multiprocessing personal computer servers can be one megabyte, substantially the entire executable for the present invention can be provided to each processor. Thus, the positive impact on total system efficiency is believed to be substantial in that secondary cache is typically about four times faster than normal cache, so productivity gains of about three-hundred percent would not be unreasonable. In other words, the executable code for the present invention can reside in the secondary cache of each processor, thereby allowing the off-loading of any processing function to any processor with relative ease. Additionally, given that a typical RAM memory for a personal computing devices is 16 megabytes, it is believed that such a device will have the capability to process the back office financial transactions of a major money center financial institution or communications billing system.

Additional features and benefits of the invention will become evident from the detailed description and the accompanying drawings contained herein.

DETAILED DESCRIPTION OF A PREFERRED EMBODIMENT OF THE INVENTION

Figure 1:
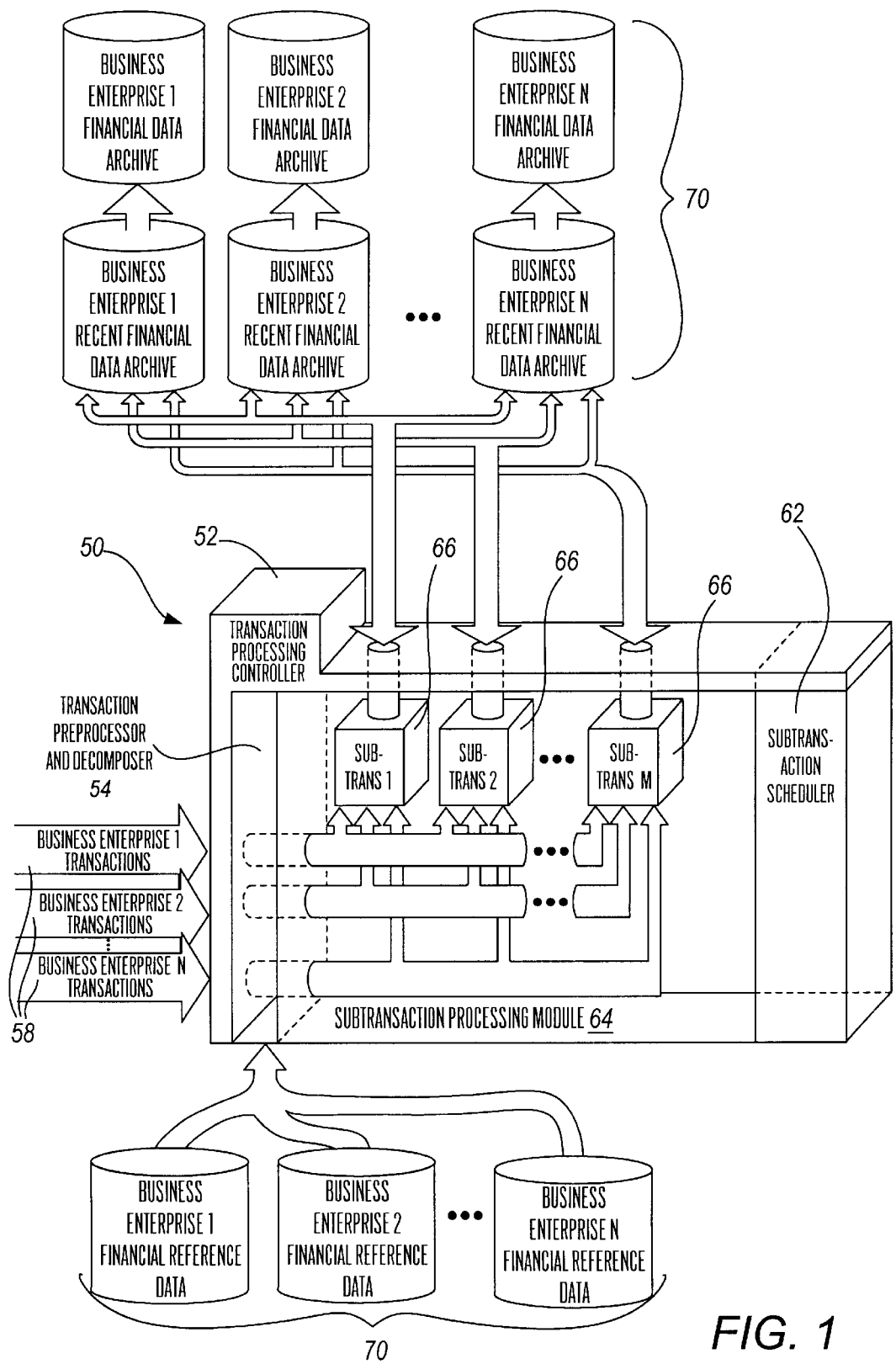
FIG. 1 is a high level block diagram illustrating the present invention conceptually.

FIG. 1 shows a high level conceptual block diagram of a transaction processing system 50 according to the present invention. In particular, the present invention is conceptualized in the present figure as including five functional components, these being:

(a) transaction processing controller 52 for: (i) receiving transactions 58 from business enterprises, (ii) controlling the processing of such transactions, including the scheduling of subtransactions to be performed, and (iii) writing of transaction details to, for example, a transaction journal file or table;

(b) a transaction preprocessor and decomposer 54 for initially receiving a transaction 58 from any one of a plurality of business enterprises as shown, wherein the preprocessor and decomposer 54 decomposes transactions into subtransactions;

(c) a subtransaction processing module 64 for performing the instructions for each subtransaction determined by the transaction preprocessor and decomposer 54. In particular, the subtransaction processing module 64 utilizes a collection of subtransaction programmatic data descriptions 66 that can be independently scheduled and performed for processing each transaction 58 provided to the transaction processing system 50;

(d) a subtransaction scheduler 62 for scheduling the execution of each subtransaction output by the preprocessor and decomposer 54;

(e) a collection of databases 70 containing financial information for each of the one or more business enterprises. Note that the term "database" in the present context includes both the data therein as well as database management functional elements and data structure definitions.

Another illustration of the present invention is provided in FIG. 2. This figure is a block diagram providing both the processing components of FIG. 1, and additionally, greater detail is provided of the tables or files within the databases 70. However, to simplify the discussion hereinafter, the database terminology used will be that of a relational database. Accordingly, files may also be equivalently referred to as tables, records may also equivalently be referred to as rows, and record fields may also be equivalently referred to as columns. Thus, all the data storage symbols having the collective label of 70 are provided within the like numbered databases of FIG. 1. It is worth noting, however, that in one embodiment of the present invention, the data tables for distinct business enterprises may be provided in the same collection of tables such as those represented in FIG. 2. That is, it is an aspect of the present invention that the accounting and transaction processing of the present invention can use the same plurality of financial data tables for business enterprises having substantially different financial transactions and accounting categories. Thus, although FIG. 1 illustrates the databases 70 as being distinct for each business enterprise, many of these databases (if not most) may be combined into a single database having a plurality of data tables such as those labeled collectively "70" in FIG. 2, these tables being discussed in detail hereinafter.

Referring still to FIG. 2, a high level view of the processing performed when processing a transaction 58 is provided. In particular, the transaction processing controller 54 receives an input transaction 58 and invokes the preprocessor and decomposer 54. The preprocessor and decomposer 54 subsequently performs, for each transaction 58, the following functions:

(a) determines, using input from the business enterprise databases 70, whether all necessary data for performing the transaction is available and otherwise rejects the transaction without performing any portion thereof. In particular, the transaction preprocessor and decomposer 54 determines that all data tables to be accessed are available;

(b) retrieves the data needed to perform the transaction;

(c) checks to determine that the transaction operation(s) requested is available, and that the transaction is legitimate to be performed on the data for the input transaction 58;

(d) retrieves the subtransaction data descriptors for decomposing the input transaction 58 into subtransactions.

Accordingly, the preprocessor and decomposer 54 retrieves into the working storage 72 (shown in FIG. 3) of a host computer (not shown), upon which the transaction processing system 50 is operating, substantially all data and table rows that are necessary to process the transaction 58. Additionally, note that as one skilled in the art will understand, if some portion of the required data to process the transaction is unavailable, then the preprocessor and decomposer 54 terminates processing and subsequently writes appropriate error messages and/or details of the transaction into the reject table 74 (FIG. 2).

Assuming that the preprocessor and decomposer 54 successfully performs the gathering of information for the decomposing of the transaction into subtransactions appropriately, then control is returned to the transaction processing controller 52, wherein this controller then writes the details of the transaction to the transaction journal 78 along with identification data uniquely identifying the transaction (e.g., a transaction sequence number and/or time and date stamp). Following this, the transaction processing controller 52 invokes the subtransaction scheduler 62 for scheduling the performance of each subtransaction by an invocation of the subtransaction processing module 64. Note that it is an important aspect of the present invention that since the subtransactions can be processed independently of one another for a given transaction, instantiations of the subtransaction processing module 64 can be executed in substantially any desired order. In particular, such instantiations of the subtransaction processing module 64 can be performed concurrently, thus providing a substantial increase in transaction processing efficiency when such concurrency is provided on a computer having a plurality of processors.

Given that a subtransaction is performed successfully by the subtransaction processing module 64, various accounting tables within the transaction processing system 50 are updated. In general, each subtransaction conceptually indicates a single operation of either plus or minus that is to be performed with two operands also indicated in the subtransaction. That is, the first operand indicates the data to be added or subtracted from a particular field or column of a table row identified by the second operand. Additionally, each subtransaction updates other tables within the transaction processing system 50 automatically in order to provide consistency among the data tables so that: (a) substantially on-line account balancing capabilities can be performed, and (b) full auditability of the records of the business enterprise providing the transaction can be facilitated by retaining history records of table updates, as will be discussed with reference to "master table transaction cluster processing" described hereinbelow. Accordingly, each subtransaction processed by an instantiation of the subtransaction processing module 64 may update a plurality of the data tables contained in the collectively labeled database 70. Note that for one skilled in the art of transaction data processing and accounting, the names provided to the tables are indicative of their information content and structure. However, for clarity, substantially all of the tables for the present invention will be discussed in detail and/or illustrated hereinbelow.

The subtransaction processing module 64 processes subtransactions derived from three general categories of transactions that may be input to the present invention. That is, there may be input transactions for each of the following types of financial transactions (1.1) through (1.3) hereinbelow.

(1.1) Transactions related to exchanges of funds such as cash debits and credits for accounts of a particular business enterprise are provided. At a high level, the tables related to this functionality include the account master table 84 (FIG. 2), the general ledger table 88, and the entity attribute master table 92.

(1.2) Transactions related to additional or customized accounting for clients having accounts in the account master table 84 are provided. For example, in addition to providing the functionality of the transactions described in (1.1) immediately above, a customer income statement (income/expense) table 96 may be provided with client account and transaction information related to income and expenses for tax purposes. Additionally, a customer cash flow (receipts/disbursements) table 100 is also provided for recording any account transaction information related to receipts and disbursements in client accounts. Further, a customer performance measurement table 104 is also provided for retaining client account performance information related to the performance of client portfolios in comparison to investment indexes such as the Dow Jones Industrial Average, the S&P 500, etc. Note that these tables will be discussed and/or illustrated hereinbelow.

(1.3) When transactions are additionally related to financial instruments other than cash, debits and credits, such as portfolio management wherein there is buying and selling of equities, income derived from equities, and trade settlements related thereto. Further, note that these additional capabilities also provide the same degree of flexibility, adaptability and simplicity as provided in relation to the transaction processing capabilities discussed in (1.1) and (1.2) immediately above. That is, financial equity transactions of various types and for various business enterprises may be easily modified and/or added or removed from the transaction processing system 50 of the present invention, since these transactions are also described by transaction data descriptors consisting of a collection of subtransactions that are capable of being performed in substantially any order that is determined by the subtransaction scheduler 62.

Accordingly, in providing the functionality for the transactions related to portfolio management, the preprocessor and decomposer 54, upon being invoked by the transaction processing controller 52, also retrieves into working storage (as shown in FIG. 2) the necessary data for processing such portfolio maintenance transactions, this data including a subtransaction decomposition for the transaction. Subsequently, as discussed hereinabove, the subtransaction scheduler 62 invokes an instance of the subtransaction processing module 64. However, in addition to updating any appropriate rows of the tables 84, 88, 92, 96, 100 and 104, the subtransaction processing module 64 invokes a portfolio adjuster module 110 for capturing and/or updating detailed data of portfolio transactions that are not otherwise effectively captured for proper accounting and auditing. In particular, for a given subtransaction, the portfolio adjuster 110 invokes one of the following modules (2.1) through (2.4) hereinbelow.

(2.1) Original add module 114 for processing a subtransaction related to the addition of further financial instruments to a portfolio such as occurs when securities are bought and must be added to a given account.

(2.2) A reverse of add module 118 for reversing an addition of financial enterprises to a particular account portfolio. Note that this module is typically activated when financial enterprises are inadvertently added to an incorrect portfolio account.

(2.3) An original sell module 122 for processing subtransactions related to selling financial enterprises within a given account portfolio.

(2.4) A reversal of original sell module 126 for reversing the affects of an inadvertent sell of financial enterprises within an account portfolio.

These four modules 114- 26 update the tables labeled collectively as 70B. In particular, the processing performed herein and the tables updated herein are described below.

Manor Programs and Functionality
Major Programs
The N_gine transaction processing system contains four major programs. These are:

(1) Transaction Processing controller 52
(2) Transaction Preprocessor and Decomposer 54
(3) Subtransaction Processing module 64
(4) Subtransaction Scheduler 62

Program Functionality

The purpose of the Transaction Processing controller 52

(a) test for incoming transactions and once detected
(b) execute the Transaction Preprocessor and Decomposer 54 and then
(c) execute the Subtransaction Processing module 64 for each transaction.

The purpose of the Transaction Preprocessor and Decomposer 54 is to verify (a) that all information in the transaction is accurate
(b) that all files and controls are available to properly process the transaction
(c) that the specific subtransaction processing instructions are loaded into working storage.

The purpose of the Subtransaction Processing module 64 is to (a) execute all of the subtransactions that have been previously defined for a transaction
(b) create auditability for every transaction.

The purpose of the Subtransaction Scheduler 62 is to (a) allocate a specific task to a specific processor
(b) return processing to the Transaction Processing controller 52.

The present invention may be described as "Table-Driven Transaction Processing". That is, the present invention permits the processing of virtually any type of user-definable transaction by defining the processing for such transactions as data descriptors that are interpreted in real time and dynamically as needed for processing corresponding transactions. Accordingly, the transaction data descriptors are denoted as "driving data" and are defined by the transaction processing master table and the transaction master table. That is, the transaction master table provides a first initial collection of data for identifying each transaction and the transaction processing table provides the remainder of the data including the subtransaction decompositions. Accordingly, each transaction processed updates an appropriate set of user-definable tables (known as the "driven" data) for completing the processing of the transaction. Since both the "driving" and the "driven" information is expressed as data rather that actual code, the entire functionality of the system can be changed in a straightforward manner.

In the description hereinbelow, the functional components of the present invention are also identified by other naming conventions from the description above. Accordingly, the following table shows the pairing of the functional component identifications above with those also used below:

| ABOVE | BELOW |
|---|---|
| TRANSACTION PROCESSING CONTROLLER 52 | N_GINE COMMAND PROCESSOR |
| TRANSACTION PREPROCESSOR AND DECOMPOSER 54 | N_GINE EDIT PROCESSOR |
| SUBTRANSACTION PROCESSING MODULE 64 | N_GINE POSTING TO AM, EA AND GL |
| SUBTRANSACTION SCHEDULER 62 | N_GINE SCHEDULER |
| PORTFOLIO ADJUSTER 110 | AORS |

-continued

| ABOVE | BELOW |
|---|---|
| ORIGINAL ADD MODULE 114 | ORIGINATE ADD PROCESSING |
| REVERSER OF ADD MODULE 118 | REVERSE ADD PROCESSING |
| ORIGINAL SELL MODULE 122 | ORIGINATE SELL ROUTINE |
| REVERSE OF ORIGINAL SELL MODULE 126 | REVERSER SUBTRACT PROCESS |

N_gine System Design Rules

A. The Magic Number in Software Design is 1. That is,
store data once,
program data once,
process data once.

B. Design a total system with the fewest number of processing models. For example,
One model for processing all adds (inserts),
changes (updates), and deletes (deletes) for all
Master (or Reference) Files (or tables).
One model for processing all of simple transactions (such as debits and credits), including original and reversing entries.
One model for processing all complex transactions (such as buys and sells), including original and reversing entries.
One model for processing all adds (inserts), changes (updates), and deletes (deletes) for all Detail Record (or "driven") Files (or tables).

C. Use the first and last models to process all files (or tables) in the entire system.

D. Include audit controls for every table in the system from the very outset of design.

E. For reasons of productivity assessment, include Production Statistics for every job.
Namely,
Begin Time
Number of Transactions
Number of Acceptances
Number of Rejects
End Time.
These variables represent the only true means of measuring actual productivity.

F. For reasons of auditability, never overwrite any original information. Move all original information from data entry (cradle) to data warehouse (grave) without any changes.

G. For reasons of reliability and profitability, system designs should focus on a "large number of small programs" rather than a "small number of large programs". The result is not only ease of maintenance but also the ability to spread the small programs across a number of simultaneous processors.

H. For reasons of manageability, all system designs should embrace one integrated enterprise-wide standard naming convention for all files (tables), records (rows), and fields (columns).

I. For reasons of portability, use the fewest number of language commands to code the system. Avoid vendor and/or language extensions.

J. For reasons of flexibility, never hard code what can be table-driven.

N_gine Design Concepts
A. Only 4 Processing Models for Financial Services and Telecommunications Applications
  1. Schema
  2. Units, Debit/Credit
  3. Assets/Liabilities
  4. File Maintenance Routine
B. Table-Driven Transaction Processing for maximum flexibility
  1. Number of Transactions
  2. Name of Each Transaction and Unique Details
  3. Processing Algorithms (at least 1, up to 20 depending upon complexity)
  4. Each algorithm has 3 components
    a. Plus (P) or Minus (M)
    b. Operand 1
    c. Operand 2
C. 100% Auditability For Every Transaction by creating
  1. a Detail Record containing all relevant data and
  2. hash totals of three relevant fields in at least 3 other tables.
D. The 3 relevant fields for calculating all hash totals are:
  1. Cash
  2. Units
  3. Cost Basis
E. Basic Relational Database Management System Processing Concepts
  1. Commit/Rollback
  2. Row Level Locking
  3. Indexing, ROWID
  4. Stored Procedures
  5. Shared Memory
F. Some Financial Services Accounting Systems are not permitted to commingle funds. That is, separate accounting for both income and principal must be provided. Therefore, each account master must have a designated "income posting code" to define the proper processing. Such a code might be: (I) Income Only, (P) Principal Only, (B) Both Income and Principal.

N_gine's Basic Tables

Licensee Profile (The Licensee "Reference" or "Master" Tables)

LM The License Master table contains the necessary information to process any type of licensee using either single or multiprocessing computers.

LU The Licensee User Master identifies different users for the disparate systems that may be processed simultaneously.

LT The Licensee Account Type table contains the necessary information to process any type of account be it for a pension trust account, a communications account, or a corporate subsidiary.

LD The Licensee Default Definition table the default definitions for cash, units, and cost basis controls for total system control.

LL The Licensee General Ledger Definition is a list of all of the acceptable entries for the General Ledger. That is, it provides a framework for processing any type of accounting controls for any set of account types.

LS The Licensee Diversification Scheme contains a three level classification scheme for reporting an decision-making purposes for any set of assets and liabilities.

LP The Performance Measurement Group Master contains a three level classification scheme for measuring the performance of different investment groups.

LN The Licensee Summary Name Master contains a list of the entries on any type of Income Statement and Cash Flow Statement.

LW The Licensee Wholesaler Master contains name, address, sales volumes, etc. wholesalers of communications services.

LR The Licensee Reseller Master contains name, address, sales volumes, etc. for resellers of communications services.

Account Profile (The Customer "Reference" Tables)

AO The Account Objectives Table contains the different types of account objectives, such as income, growth, capital preservation, etc.

AL The Account Jurisdiction contains the different types of legal relationships, such as broker, agent, trustee, advisor, etc.

AJ The Account Jurisdiction contains the different types of legal jurisdiction, such as federal law, state law, foreign law, etc.

AR The Account Representatives Table houses the different representatives, their names and communication addresses.

AN The Account Registration Names is a list of legal names used in security settlement.

AM The Account Master table provides all of the necessary information to process any type of account by linking the Account Objective, Account Jurisdiction, Legal Capacity, Profit Center, Account Representative, and Registration tables plus other relevant data for reporting content and reporting cycles.

AC The Account Communications Links links the Account Number for Financial Services to the account numbers for communications services so that all information can be contained in one reporting scheme.

Transaction Profile (The "Driving" Tables)

TM The Transaction Master table provides all of the information to process any type of transaction, excepting the specific processing algorithms.

TP The Transaction Processing table provides all of the specific processing algorithms for any type of transaction master. The Transaction Master and Transaction Processing tables provide all of the necessary information to process any type of transaction.

TR The Transactions—Recurring Table (TR) contains the necessary information for automatically processing any type of transaction on a recurring basis.

Entity Profile (The Entity "Reference" Tables)

EM The Entity Master table provides all of the necessary information to process any type of financial entity.

EA The Entity Attribute table joins all relevant diversification (known as type, group, and class), general ledger (known as accounting control numbers), and performance group (known as type, group, and class) data into one table for only one access seek.

ET The Entity Transaction table links specific transactions to specific entities, such as BG (Buy Government) for a U.S. Treasury Note, BF (Buy Tax-Free) for a tax-free bond, BE (Buy Equity) for common stocks, etc. Note: It is the correct assignment of such transactions to such entities that permits the proper accumulation of data for income tax purposes.

Licensee Status

SG The System General Ledger contains all of the information to process any type of institutional accounting control.

SJ The System Transaction Journal Table contains all of the transactions and all of the details for each transaction for a specific accounting period.

ST The System Trade Settlement Table contains all of the automatically generated offset transactions for Buys and Sells.

SS The System Summary Table contains a record for each execution of the system with the Begin Time, End Time, Number of Total Records Read, Number of Accepts, Number of Rejects, etc.

SR The System Reject Table contains a list of all transactions rejected for whatever reason.

SC The System Transaction Count Table contains the number of each type of transaction processed on any given transaction.

Customer Status (The "Driven" Tables)

CS The Customer Income Statement contains all revenues, expenses, and profits or losses for all customer accounts.

CF The Customer Cash Flow Statement contains all receipts and disbursements for all customer accounts.

CB The Customer Balance Sheet table contains all assets and liabilities for all customer accounts.

CG The Customer Capital Gains table contains all of the realized capital gain details for all customer accounts.

CI The Pending Income table contains all of the pending income, such as interest or dividends, for all accounts.

CA The Pending Capital Adjustments table contains all of the pending capital adjustments, such as stock splits, stock dividends, mergers, acquisitions, etc., for all accounts.

CP The Performance Measurement contains all of the periodic performance records for all customer accounts.

The Control Tables (The "System Balance" Tables)

Since every transaction is recorded in a detail record plus hashed to three other control tables, the control values of cash, units, and cost basis are added to like values in the following control tables:

Account Master, System General Ledger, and Entity Attribute tables.

For other reports such as the Income Statement and the Cash Flow Statements, the Performance Measurement table is used as a control table instead of the General Ledger.

The present invention includes four computational processing models (process models 1 through 4) for processing financial transactions and assuring full auditability and traceability.

The purpose of Process Model 1 (FIG. 5) is to create a single methodology for capturing, maintaining, and archiving the non-financial transaction data including a master table (reference table, or schema ) data for 100% auditability within a single software system. This model provides:

A current database 300 (FIG. 5) (for additions, negations and corrections) and an archive database 304 (Read Only)

Figure 5:
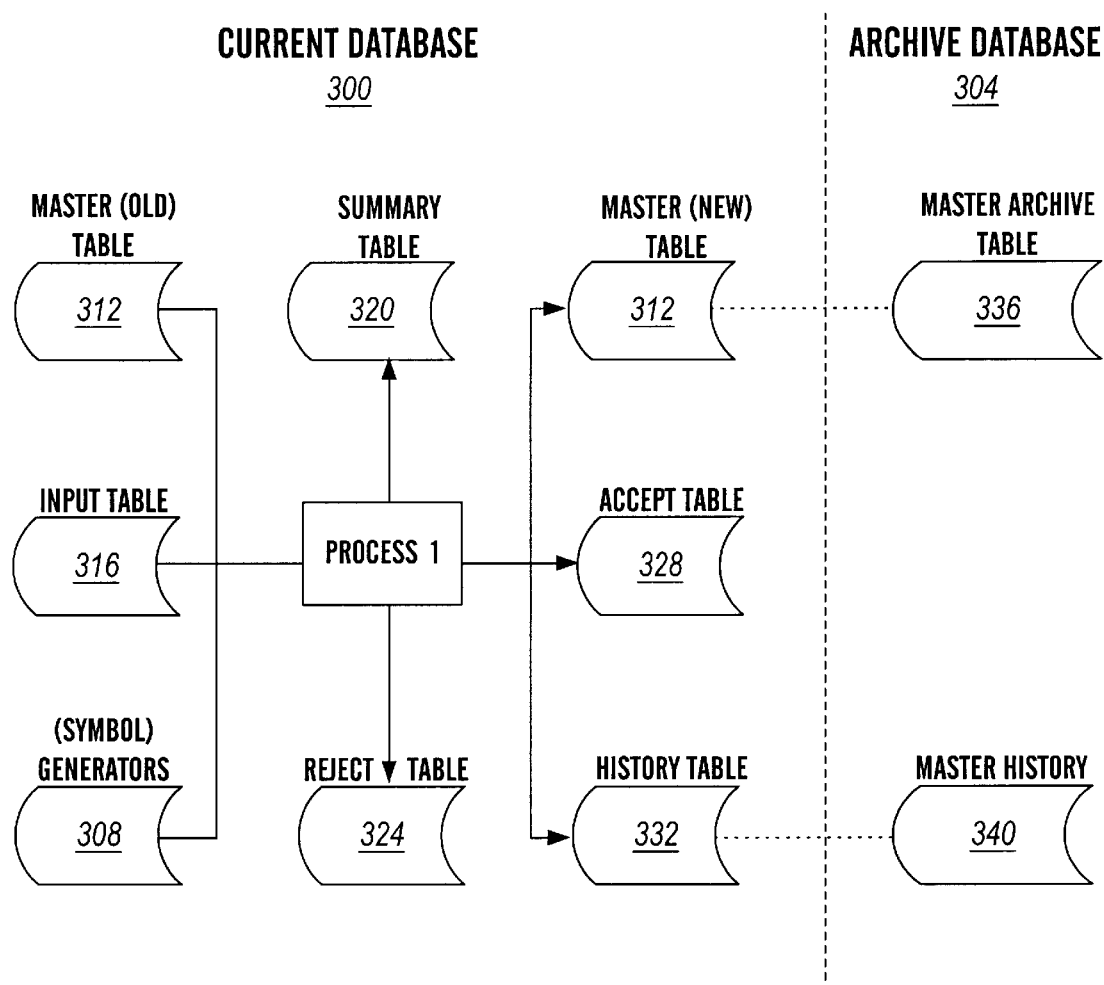
FIG. 5 is a block diagram illustrating process model No. 1 of the present invention.
Figure 6A:
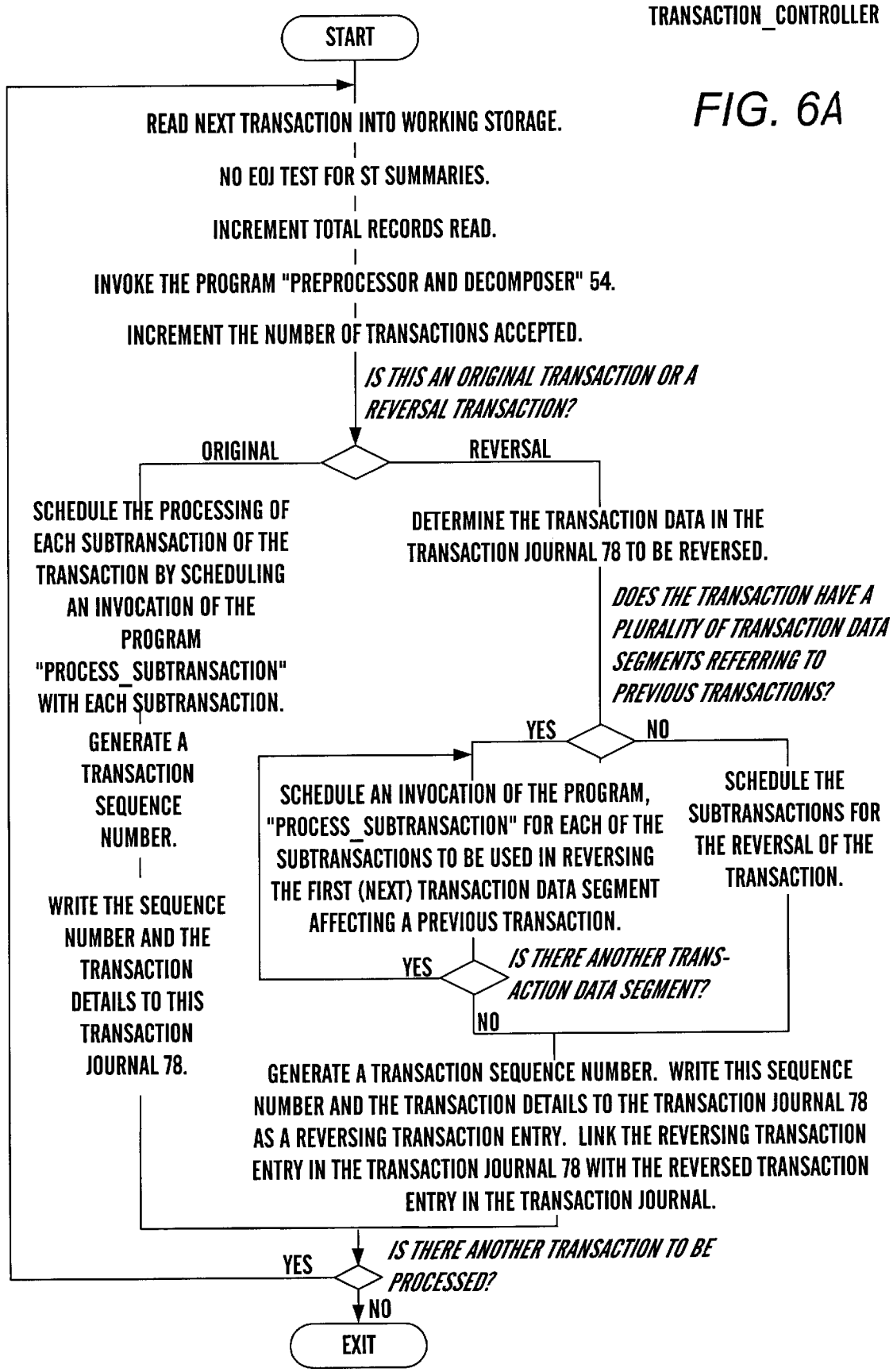
FIGS. 6A–6C is a flowchart of the steps of an embodiment of the transaction processing controller 52 of FIG. 2A.
Figure 6B:
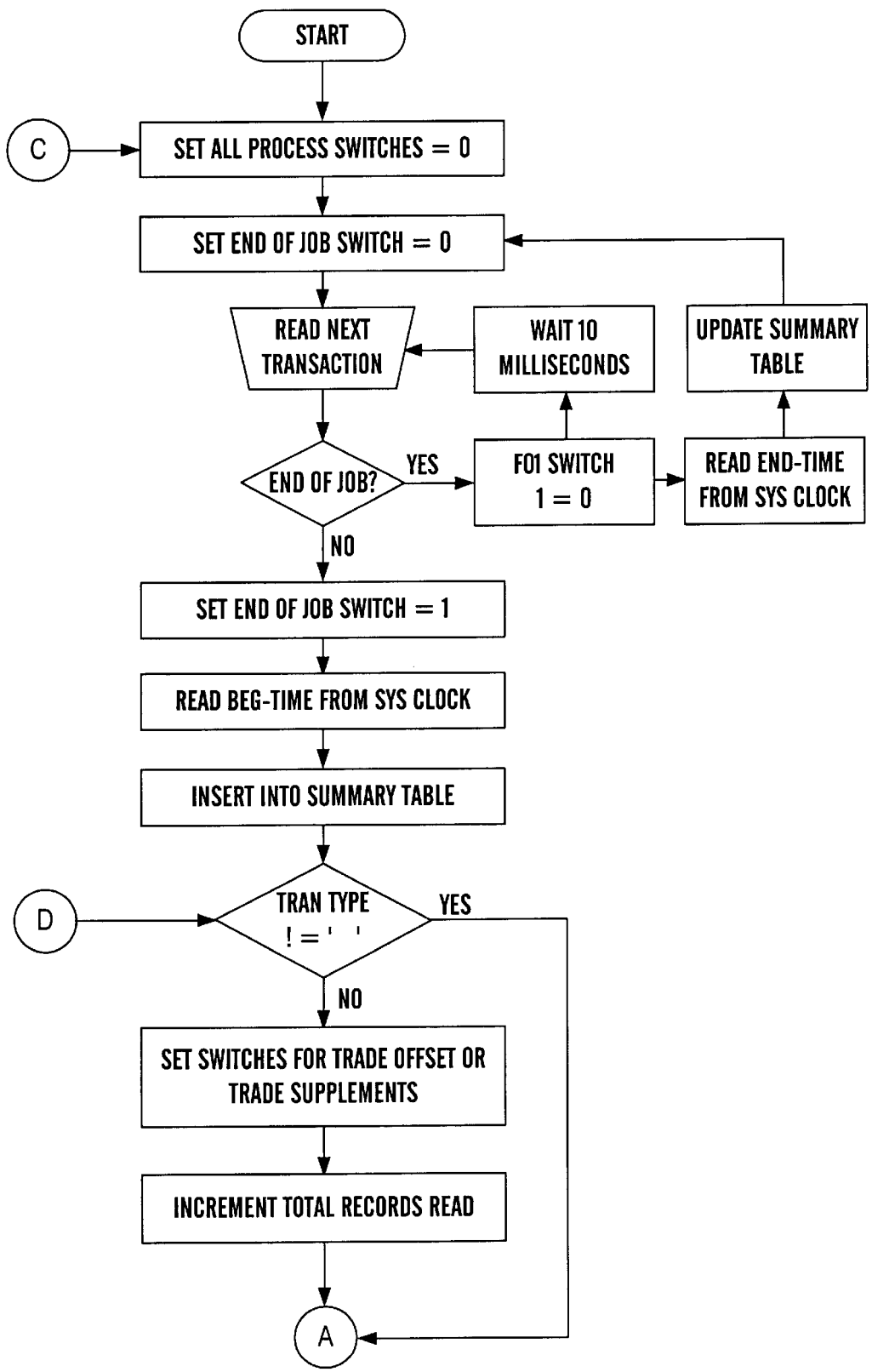
Figure 6C:
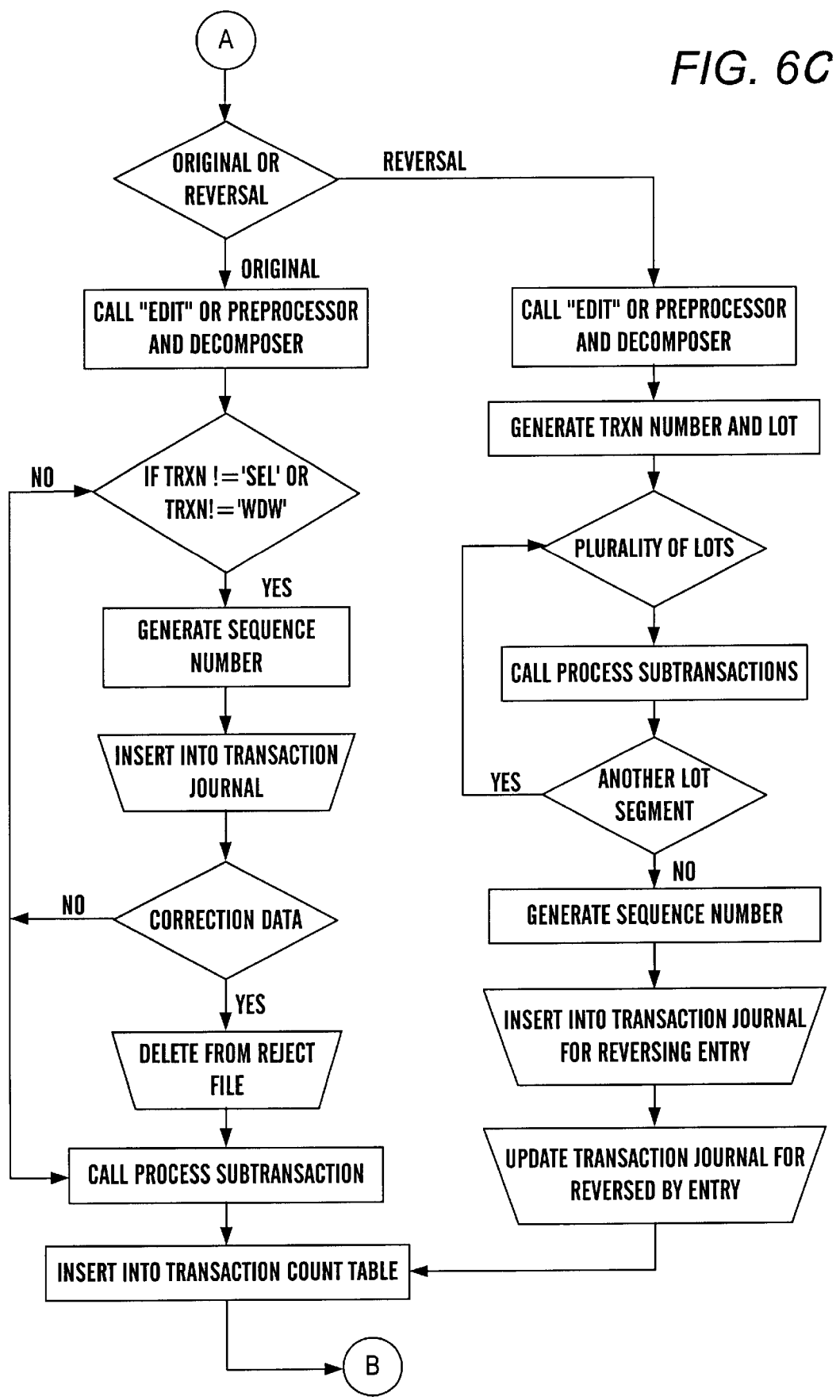
Figure 6D:
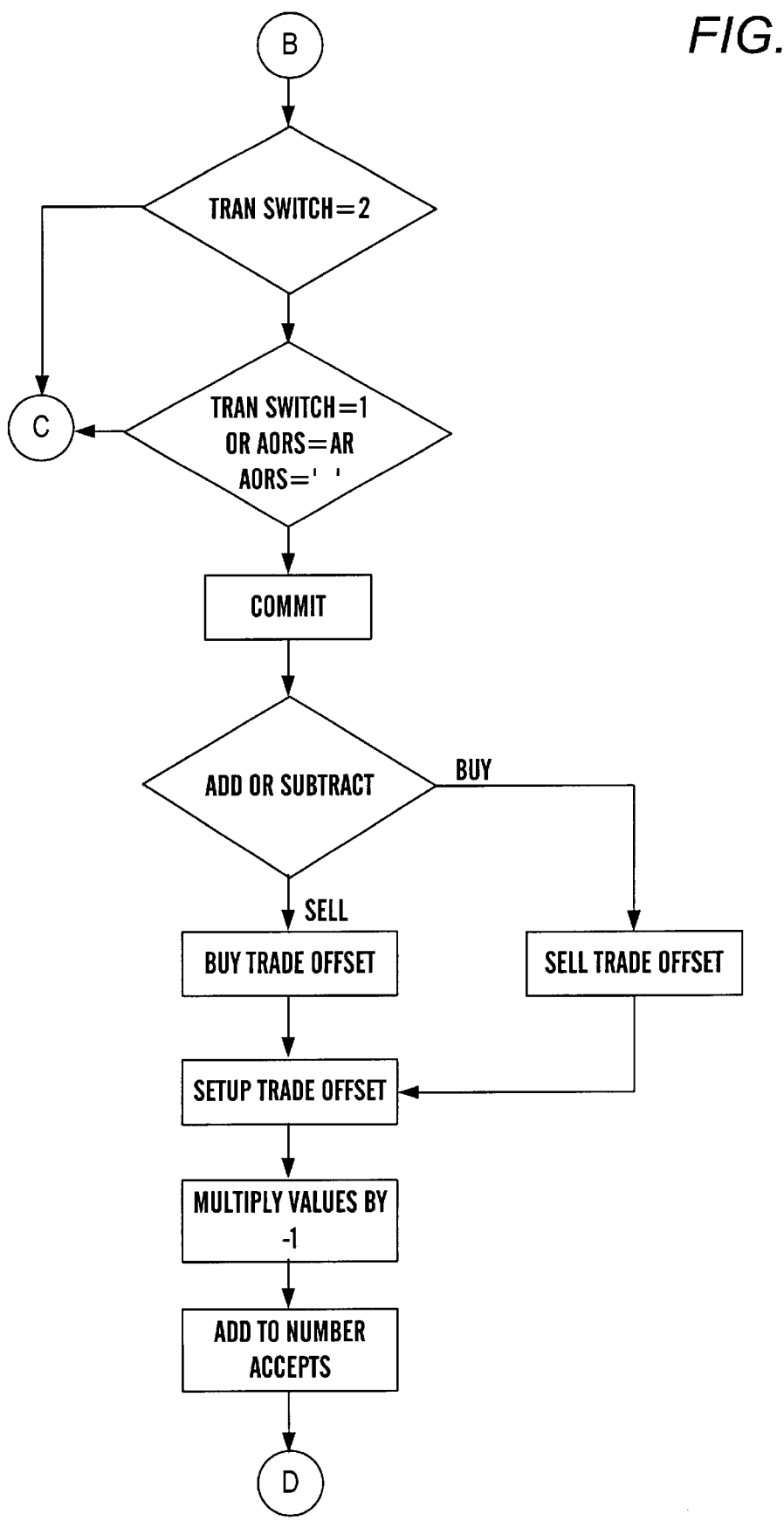

Eight tables (i.e. tables 312, 316, 320, 324, 328, 332, 336 and 340, of FIG. 5)

Number of Modifications

12 Control Fields per master table

A sequence number generator

A process flow methodology for add, change, and delete of data table rows.

The operation of Process Model 1 is as follows:
1) Normal Updating to current database 300

|  | Write to Reject | Write to Accept | Move Master to History | Add to Master | Change Master | Delete Master |
|---|---|---|---|---|---|---|
| Add | | | | | | |
| IF Identifer Found | X | | | | | |
| IF Identifier Not Found | | X | | X | | |
| Change | | | | | | |
| IF Identifier Not Found | X | | | | | |
| IF Identifier Found | | X | X | | X | |
| Delete | | | | | | |
| IF Identifier Not Found | X | | | | | |
| IF Identifier Found | | X | X | | | X |

2) Periodic updating to the archive database 304 at the end of a pre-determined time period. That is, (a) archive snapshots of the archive master 312 in the current database 300 to the master in archive database 304;

(b) archive the archive history 332 in the current database 300 to the master history 340 in the archive database 304;

(c) purge the history table 332 in the current database 304.

The purpose of Process Model 2 (FIGS. 2A, 2B) is to create a single methodology for: capturing, maintaining, and archiving the financial transaction data including: units, and debit/credits for one or more disparate financial applications with 100% auditability, wherein the processing is performed by: (a) computing configurations containing any number of simultaneous processors( (b) decomposing each input financial transaction into separate and independent subcomponents, (c) allocating the subcomponents across any number of multiple processors.

The methodology of process model 2 utilizes a data-driven transaction processing strategy, wherein the manner in which a transaction is processed is determined by retrieving appropriate control data for processing a given input transaction. Thus, the present model provides the ability: (a) to process like systems (such as financial services systems) with different transaction definitions and accounting requirements (such as commercial banking, broker/dealers, mutual funds, insurance systems) and different debits and credits and/or (b) unlike systems (such as telecommunications systems) with disparate definitions (such as landline, wireless, satellite, cable systems) within the present invention at the same time.

The purpose of Process Model 3 (FIGS. 2A, 2B) is to create a single methodology for: capturing, maintaining, and archiving the financial transaction data including: units, debits/credits, financial instruments for one or more disparate financial applications with 100% auditability within a single software system on computing configurations containing any number of simultaneous processors, decomposing each disparate financial transaction into separate and independent subcomponents, allocating the subcomponents across any number of simultaneous processors, and processing the data with 100% auditability. The methodology of Model 3 provides;

"Detail Record Maintenance", that is, the ability to process transactions for similar business enterprises (such as portfolio management systems) relating to various financial instruments (such as disparate assets and liabilities) and/or transactions for dissimilar business enterprises (such as portfolio management systems, paying agencies, stock transfer systems) with disparate languages (such as English, Spanish, French, or German) and disparate definitions (such as management philosophy, accounting, and operating nomenclature) and unlike financial instruments (such as assets and liabilities) within the same software at the same time.

The ability to decompose, allocate, process, and audit each financial instrument transactions with 100% auditability.

Figure 2A:
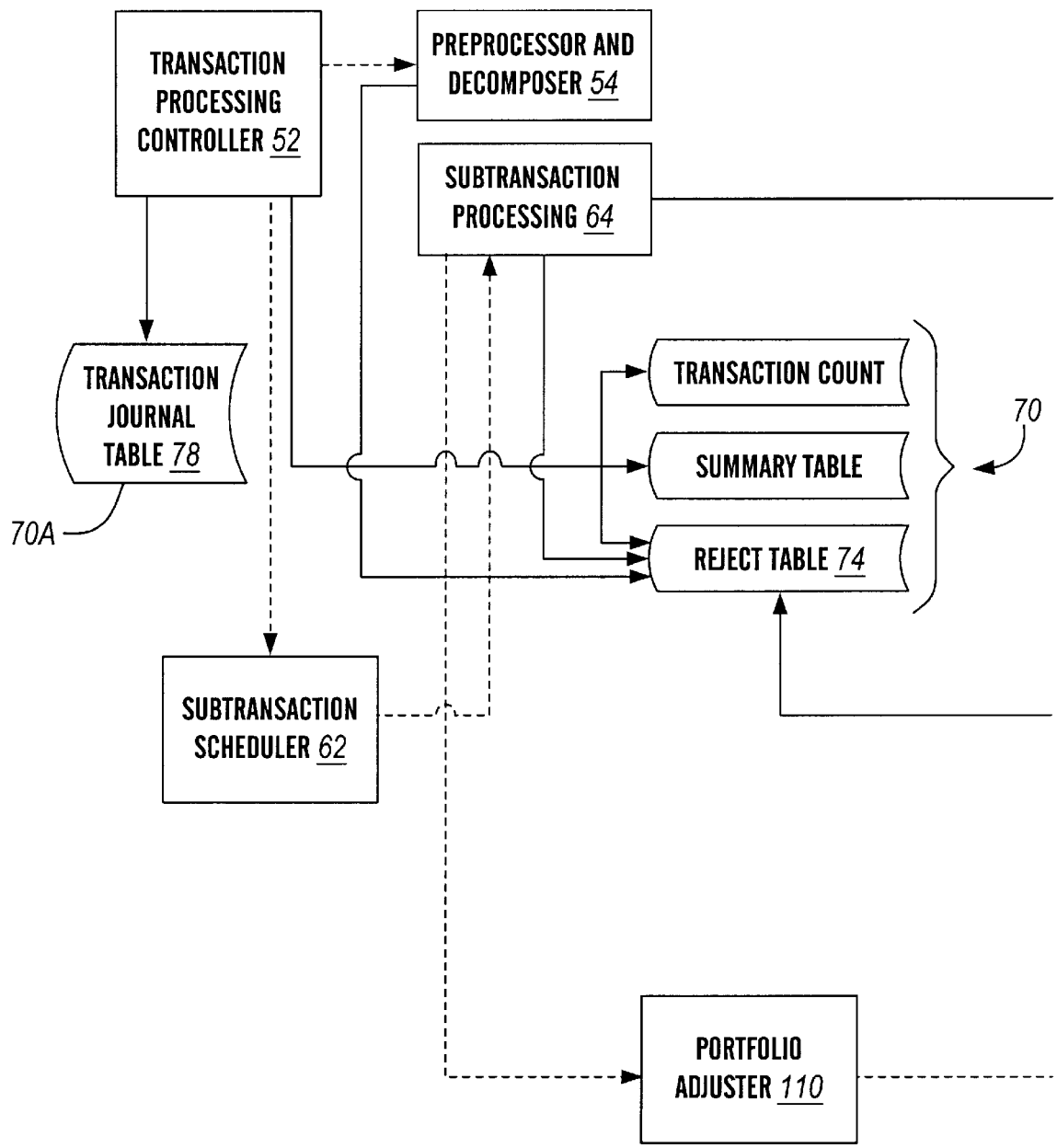
FIGS. 2A and 2B is another block diagram of the present invention illustrates: (a) the high level transaction processing modules, and (b) the data tables (represented by the symbols with arcuate vertical sides) provided and maintained by the present invention. Furthermore, the present figure shows the data flows as solid arrows and control flows as dashed arrows. Moreover, this figure also indicates the data tables effected by process models No. 2 and No. 3 of the present invention.
Figure 2B:
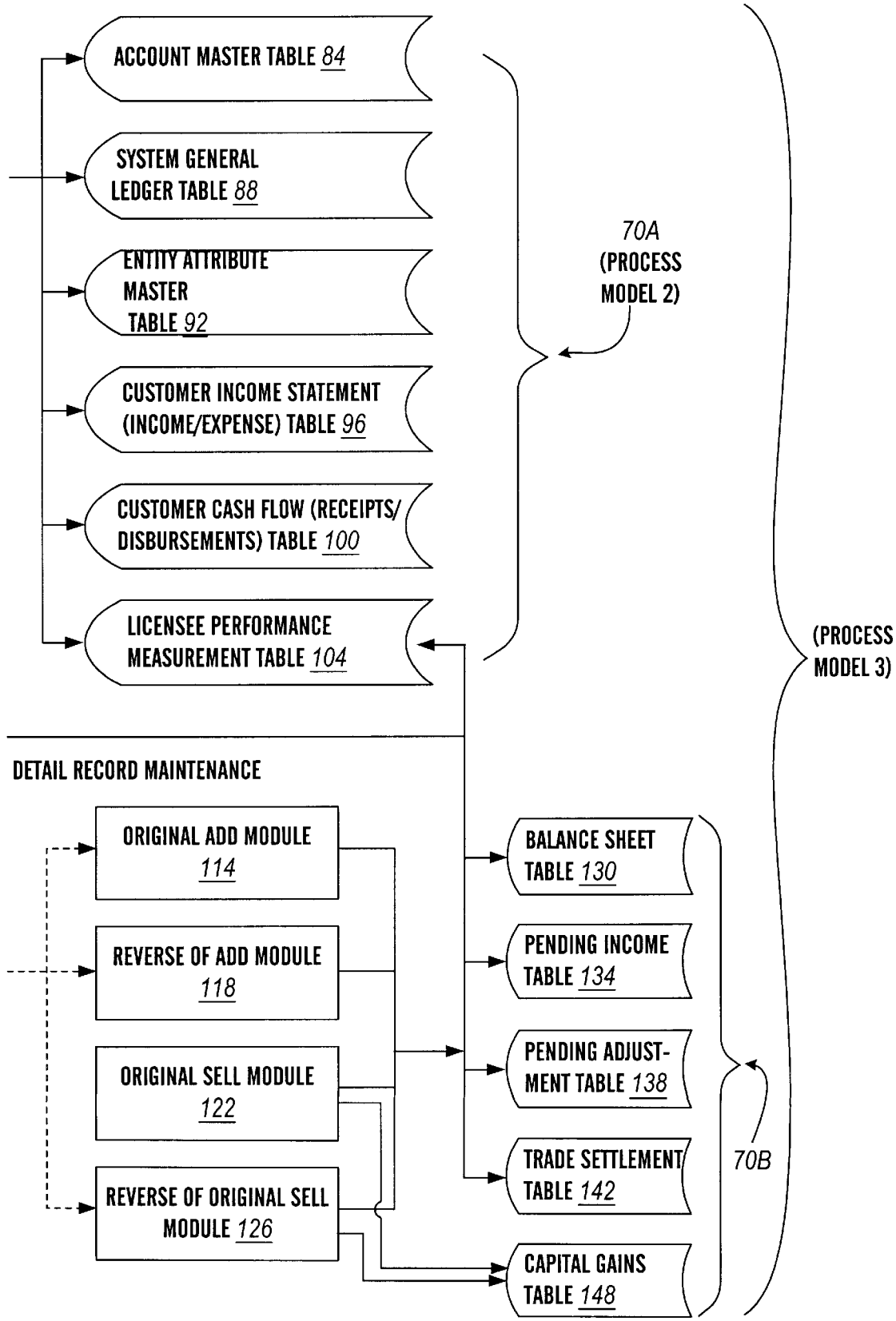
Figure 3:
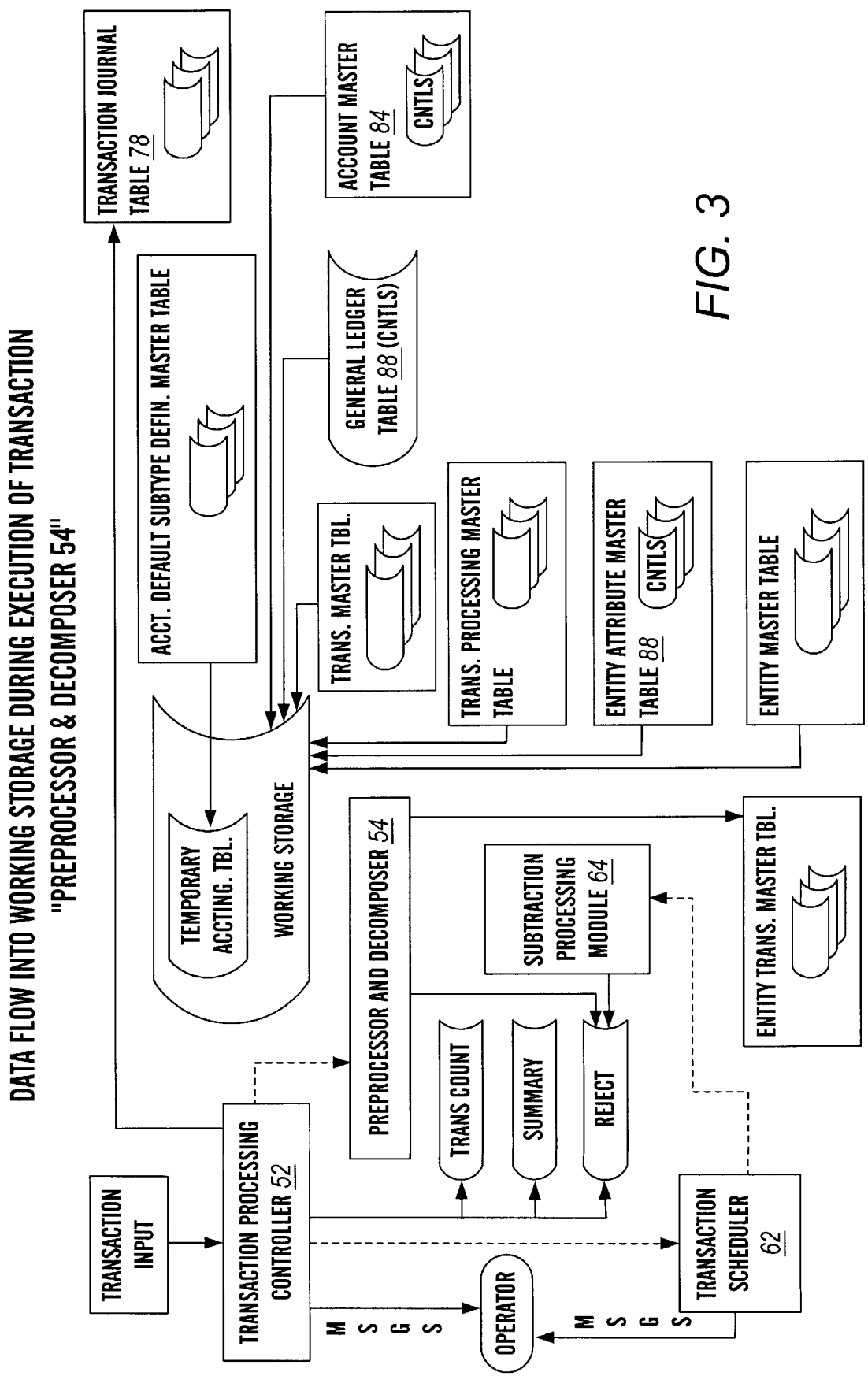
FIG. 3 is another high level block diagram of the present invention during activation of the preprocessor and decomposer 54 wherein the solid arrows are illustrative of the data flows that occur during the activation of the preprocessor and decomposer 54. Moreover, the tables within boxes represent tables having a process model No. 1 representation, and the tables having account balancing control fields include the identifier, "CNTLS."

The current databases 300 (for additions, negations and corrections) and the archive databases 304 (read only);

Sixteen data tables (some of which are shown in FIGS. 2A–2B) plus a sequence generator;

12 control fields appended to the master tables for tracing master table changes;

One transaction three hash totals (mostly using AM, EA, and PM tables);

4 currency fields;

Sequence number generation;

Reversing/reversed by detail;

Processing flow for additions, negations, and corrections.

The purpose of Process Model 4 is to create a single methodology for performing file maintenance including: creating a record (row) containing the initial data in a file (table) or modifying the initial data within an existing record (row) within a file (table) or deleting a current record (row) from a file (table)in any software application on computing configurations using simultaneous processors. Where the term, "Details", hereinbelow represents the identity of the specific financial transaction, the methodology of the process model 4 is provided by programs such as the following:

```
BEGIN
    IF Trxn is "ADD" then
            /*      Test for Duplicate Add                */
            SELECT One or More Values from the Desired File (Table) into Working Storage
            IF Error then
                    /*      Add New Record                */
                    INSERT INTO Reject Report
                    IF Error then
                            Message "INSERT Reject ADD", Details
                            Goto Write Reject Table
                    ENDIF
            ELSIF
                    /*      Increment Existing Record     */
                    Increment One or More Data Values
                    UPDATE SET, Details
                    IF Error then
                            Message "UPDATE Error ADD", Details
                            Goto Write Reject Table
                    ENDIF
            ENDIF
    ELSIF Trxn is "SUBTRACT" then
            /*      Test for Valid Record                 */
            SELECT One or More Value(s) from Existing Record
            IF Error then
                    Message "SELECT Error SUBTRACT", Details
                    Goto Write Reject Table
            ENDIF
            /*      Test for Valid Amounts                */
            IF One or More Amounts > One or More Values from Existing Record then
                    INSERT INTO Reject Report
                    IF Error then
                            Message "INSERT Reject SUBTRACT", Details
                            Goto Write Reject Table
                    ENDIF
            /*      Delete Existing Record                */
            ELSIF   One or More Amounts = One or More Values from Existing Record
            AND     Special Deletion Criteria = TRUE then
                    DELETE Record
                    IF Error then
                            Message "DELETE Error", Details
                            Goto Write Reject Table
                    ENDIF
            ELSE
                    /*      Decrement Existing Record     */
                    Decrement One or More Values
                    UPDATE SET, Details
                    IF Error then
                            Message "UPDATE Error SUBTRACT", Details
                            Goto Write Reject Table
                    ENDIF
            ENDIF
    ELSE
            /*      Invalid ADD or SUBTRACT Code          */
            INSERT INTO Reject Report
            IF Error then
                    Message "INSERT Reject AORS", Details
                    Goto Write Reject Table
            ENDIF
    ENDIF
    Goto EOJ
    <<Write Reject Report>>
    ADD to Reject Table
    IF Error then
            Message "INSERT Reject Table Error", Details
            STOP
    ENDIF
    <<EOJ>>
            Null
END
```

Accordingly, the methodology of process model 4 defines:
(a) A current database (for additions, negations and corrections) and archive database (Read Only)
(b) ADD or SUBTRACT;
(c) Initial tests for values;
(d) Special deletion criteria;
(e) Tests for action;

INSERT or UPDATE;
DELETE or UPDATE;
INSERT INTO Reject Tables;

Processing Model 1

Processing model 1 is a method for processing changes to files (or tables) denoted as master or reference tables (files)

wherein these tables retain fundamental information that is not derivable from other tables. In particular, processing model 1 processes changes to master tables in an automated manner without losing historical financial information. Accordingly, 100% auditability of all data changes is able to be achieved.

The method of achieving this goal uses an architecture denoted as "Master Transaction Cluster Processing" (MTCP). MTCP is based on the premise of creating a logical flow of all original information from data capture (data entry) to permanent data repository (data warehouse) by replacing single master files (or tables) with a cluster of files (or tables). Therefore, MTCP addresses the complete life cycle of all information relevant to organizational decision-making. MTCP is targeted for use in the automatic generation of program code for multiple large-scale real-time transaction processing applications (such as securities trading, telecommunications billing, and work management) on multi-processing computers (using 4, 8, 16, 32 processors), where control is not only an increasing complex issue but an absolute necessity for future competition.

The circumstances leading to the invention of Master Transaction Cluster Processing are:

a) Prior art financial transaction software architecture lacks the ability to identify transactions by table, transaction date, transaction number, and the person authorizing the transaction.

b) Prior art financial transaction systems typically use only one table to contain all Master Information (i.e., non-derivable information) and the data in this table is overwritten, thereby losing historical information. Cases in point would be a record of all of the past mailing addresses or processing instructions for a specific customer.

c) Without 100% retention of an organization's vital information, management has no idea of the accuracy of the information being used for decision-making purposes.

d) The Year 2000 problem, know as Y2K, is proving that past software applications designs have reached technological limits and current maintenance costs are inordinately expensive.

e) Competitive pressures are mounting for higher quality software with lower software development and maintenance costs. Totally new architectures for applications software is in great demand.

f) The ComputerWorld article, "Information: America's Favorite Investment," by Paul Strassman, Computer-World Magazine, Aug. 5, 1996, states that over 1100 companies are spending more on automation annually than the net worths of their respective companies.

a) The Standish Report as described in Development Patterns, InfoWorld Magazine, Feb. 3, 1997, p. 56, states that the success rate of Business Process Reengineering has increased from 16% in 1994 to only 27% in 1996.

Note, in the book "Oracle Design", Ensor & Stevenson, O'Reilly Press, it is a recommended practice to compromise data retention rather than achieve 100% auditability. Today's hardware costs suggest otherwise.

The advantages of the present invention over the approaches discussed above are:

to provide 100% auditability which offers business management the capability to exercise its fiduciary responsibility to its stockholders and Board of Directors, to capture, maintain, and ensure the integrity of all vital information for business enterprise decision-making purposes, and to preserve such information consistent with business enterprise-defined data retention cycles. Additionally, the present invention allows accountants to certify in business enterprise annual reports that all vital corporate data is being properly preserved.

A detailed description of Master Transaction Cluster Processing corresponding to model 1 (the first computational model of the present invention) is as follows.

MTCP Overview

Master Transaction Clustering, or MTCP, performs the following tasks:

a) assigns a unique identifier based on (i) master table identification, (ii) transaction date, (iii) transaction number, and (iv) authorized user, to each transaction that causes a change in the state of a particular record of a master table. That is, if one or more data elements in the record change, then the previous record is written to history, and a new status is assigned to an identifier field used for tracking such changes;

b) creates a logical flow of data as it is originally entered from its inception (data entry) to its repository (data warehouse). The unique architecture of MTCP replaces the Master File (or Table) within prior art systems with a cluster of Master Files (or Tables), known as a "Master Transaction Cluster". This cluster is suitable for multiprocessing (or the use of simultaneous processors within a single computer to complete a common job). Hence, MTCP addresses 100% auditability via maintaining the total life cycle of information. Aged information may be deleted from the appropriate tables consistent with user-defined data retention policies;

c) offers a standard for processing all Master Tables within a total application;

d) provides a test bed for separately testing each Master Table Cluster under development and all Master Table Clusters in concert;

e) permits management to report that it is successfully capturing, maintaining, and preserving all critical information for decision-making purposes.

MTCP Scope

Master Transaction Cluster Processing utilizes the following (FIG. 5):

a) two databases (i.e., the current data base 300 and the archive data base 304), b) sequencing generator 308 having: (i) two external sequence generators; (ii) two internal counters, c) eight tables (denoted master table 312, input table 316, summary table 320, reject table 324, accept table 328, history table 332, master archive table 336 and master history table 340), and d) twelve additional fields for every row in the master table 312.

MTCP Independence

Master Transaction Cluster Processing of Model 1 is independent of any:

a) application—such as accounts receivable, customer billing, etc.

b) industry—such as financial services, telecommunication, or work management, c) hardware manufacturer—such as Compaq, Digital, HP, IBM, NCR, Unisys, d) operating system—such as MS-DOS, UNIX, OpenVMS, MVS, etc.

e) network—such as Novell, Ethernet, etc.

f) relational database management system—such as Oracle, Sybase, Microsoft SQL Server, Informix, etc., and g) computer language—such as SQL, COBOL, FORTRAN, PL/1, Java, etc.

MTCP Architecture

The Master Transaction Cluster Processing (MTCP) architecture can be used for any application in any industry using any computer language. Within the typical structured processing scheme of input and process, the Master Transaction Cluster Processing focuses solely on the process function. Thus, the method permits users to define input screens and defined output reports.

MTCP Databases

Unlike prior art software system which contain only one table for each set of primary records, Master Transaction Cluster Processing uses eight related tables, or a cluster of tables, to track all information on a cradle to grave basis. The cradle being its point in inception (or data entry), and the grave being its permanent repository (or data warehouse). Consequently, the "Master Transaction Cluster" spans two different databases: one denoted the Current database 300 containing all relevant data for the current processing period and a second denoted the Archive database 304 containing all relevant data for all previous processing periods. The Current database 300 represents the area of high inquiry, and the Archive database 304 represents the area of low inquiry. Consequently, the Current database 300 is normally placed on high-speed internal disk drive and the Archive database 304 is normally placed on less expensive lower-speed CD-ROMs. Note that trailing information in the Archive database 304 may be destroyed consistent with defined data retention policies, statute of limitations, etc.

MTCP Tables

The six tables in the Current database 300 are the
  a.) Master Table 312 (M) that will contain all records to be maintained.
  b.) Input Table 316 (I) that will contain all records prior to updating.
  c.) Reject Table 324 (R) that will contain all records rejected during processing.
  d.) Accept Table 328 (A) that will contain all records accepted during processing.
  e.) History Table 332 (H) that contain a complete snapshot of all records prior to updating.
  f.) Summary Table 320 (S) that contains the results of a specific processing operation.
and the two tables in the Archive database 304 are the:
  g.) Master Archive Table 336 that contains snapshots of the master table 312 at the end of each processing period.
  h.) Master History Table 340 that contains a history of the master table 312 changes during a current processing period.

Note that the Master Table (M), Input Table (I), Reject Table (R), the Accept Table (A), the History Table (H) in the same "Master Transaction Cluster" share the same number and order of data elements consisting of alphabetic, numeric, and date items. Alternatively, the Summary Table (S) contains the start time, end time, number of accepts, and number of rejects for each time a series of master table 312 modifications are provided.

MTCP Generator and Counters

The Generators 308 include two different external counters and two internal counters used in effecting 100% auditability. The two external counters are the Accept Sequence Number Generator and the Reject Sequence Number Generator. The two internal counters are the Total Records Read Counter and the Number of Modifications Counter. All are used only in the Current database 300, as the Archive database 304 is read-only in nature.

Regarding the external counters, the Accept Sequence Number Generator included in the Current database 300 automatically generates sequential numbers for the processing period (daily, weekly, monthly, etc.) starting with the number 1, and increments by 1, so that every transaction processed against the preceding (old) master table 312 will receive a specific transaction number, and accordingly, each transaction processed will be uniquely identifiable based on master table identity, transaction date, transaction number, and authorized user. Note that the transaction date is read off the internal system clock. The Reject Sequence Number Generator counts the number of rejects for the specific processing period. Its function is similar to the Accept Sequence Number Generator. Both the Accept Sequence Number Counter and the Reject Sequence Number Counter are "processing period" specific. That is, both are cleared to zero at, e.g., midnight on the end of the processing period so that each processing period may be separately identified and audited.

Regarding the internal counters, the Total Records Read Counter counts the number of transactions read during a specific processing performance. Since the Total Records Read Counter is "job execution" dependent, this counter is cleared to zero at the outset of every processing program execution. The Number of Modifications Counter counts the number of times a specific record has been changed. As this counter is "record" dependent, this counter is never cleared to zero. This specific counter should identify the number of individual records that may be retrieved, viewed, and verified from all of the tables in the specific Master Transaction Cluster to prove its auditability.

MTCP Archive Database 304

The Archive database 304 is read only. Within the Archive database 304, information contained in the Master Archive Table 336 represents a snapshot of information in the Master Table in the Current database 300 at a particular point in time such as the end of a month, quarter, or year. And, information in the History Archive Table 336 contains all of the transactions that have occurred from the beginning of the most recent processing period until the particular point in time, be it month, quarter, or year. For example, the Master Archive Table 336 contains the status of the Master Table 312 at the end of the first quarter, and the History Archive 340 contains all of the transaction modifications occurring since the end of the last quarter. In this fashion, any status of any Master Table 312 can be recreated for any point in time (say, month ends) by simply processing all transactions in the History Archive 340 for the desired period against the previous Master Archive Table 336, or the beginning of the period.

MTCP SOL Script Library Implications

To achieve 100% auditability of a complete system, every master file (or table in relational database management systems has a Master Transaction Cluster. Therefore, a total system containing 15 tables would require 15×8 or 120 tables to achieve full 100% auditability. Since each table will require at least 4 SQL scripts to (1) Create Table, (2) Select data from the table, (3) Delete data from the table, and (4) Drop the Table in the event of redefinition, the number of SQL scripts is 15×8×4, or 960 SQL Scripts. Then, each Master Transaction Cluster will require at least a Processing Program plus a Review, Reset, and Retest, or at least four more programs for each cluster, or 4×15, or 60, more SQL Scripts. All of the SQL scripts would be stored in one SQL Script Library on the computer for future reference and ease of maintenance.

MTCP Multi-processing

The multi-processing of the Master Transaction Cluster occurs in the following manner:

For additions (or Insertions in SQL) of data
The Insertions to the Master Table 312 and Insertions to the Accept Table 328 may be processed simultaneously.

For changes (or Updates in SQL) of data
The Update of the Master Table 312 and the Insert to the Accept Table 328 may be processed simultaneously after the original record from the Master Table 312 has been copied to the History Table 332.

For deletes (or Deletes in SQL) of data
The Deletion from the Master Table 312 and the Insertion to the Accept Table 328 may be processed simultaneously after the current record in the Master Table 312 has been updated for the transaction identifier and then copied to the History Table 332.

MTCP Creation

Before processing any Master Transaction Cluster, the necessary databases and files (or tables) must be created. For each business enterprise utilizing the present invention, these databases and files are created only once in the following manner:

(Begin Program)
  Create "Current" database
  Create "Archive" database
  in the "Current" database
    Create Master Table
    Create Input Table
    Create Reject Table
    Create Accept Table
    Create Second Accept Table (on separate disk unit, if desired)
    Create History Table
    Create Summary Table
    Create Sequence Number for Accepts
    Create Sequence Number for Rejects
  in the "Archive" database
    Create Master Archive
    Create History Archive
(End of Program)

MTCP Processing

Processing of the "Master Transaction Cluster" then occurs in the following manner.

Step 1: All required information for processing a transaction is first captured on an Input Form.

Step 2: Once this information is edited by, e.g., an operator, an Enter Key can be pressed by an operator to write this information to the Input Table 316 for particular master transaction clusters.

Step 3: For each input table 316, a polling program notes that the Input Table is not empty and has a transaction action to be processed whereupon the action is processed by a process (denoted "process 1" in FIG. $M_1$).

Step 4: The transaction processing program determines the type of file maintenance to perform; basically, (1) add a record (entitled Insert a Row in SQL), (2) change a record (entitled Update a Row in SQL), and (3) delete a record (entitled Delete a Row in SQL), which in turn determines the multi-processing potential as described above in the MTCP Multi-processing.

The normal daily processing flow to achieve 100% auditability in either real-time or batch mode is as follows:

---

```
(Begin Program)
Read System Clock to Store Begin Time
(Read Next Transaction)
If Last Transaction
        Read System Clock to Store End Time
        Write End Time, Begin Time, Number of Accepts, Number of Rejects,
                and Total Records Read to Summary Table
        Goto End ofProgram
Increment Total Records Read by 1
(Add a New Record)
If transaction is "Add" then
        If record exists then
                Process Addition Error
                Goto Write Reject Table
*************************************************************
                * Select System Clock Date       into Insert - Transaction Date     *
                * Increment Sequence Number      into Insert - Transaction Number   *
                * Select User Name               into Insert - Transaction User     *
                * Select Zero                    into Update - Transaction Number   *
                * Select Zero                    into Delete - Transaction Number   *
*************************************************************
                Insert to Master Table
                Goto Write Accept Table
                (Change an Existing Record)
If transaction is "Change" then
        If record does not exist then
                Process Change Error
                Goto Write Reject Table
*************************************************************
* (Master Snapshot)                                                       *
* Move Master Table Record to History Table                               *
*************************************************************
                * Select System Clock Date       into Update - Transaction Date     *
                * Increment Sequence Number      into Update - Transaction Number   *
                * Select User Name               into Update - Transaction User     *
                * Select Zero                    into Delete - Transaction Number   *
                * Increment Master Table Number of Modifications by 1     *
```

```
                -continued

************************************************************
    Update Master Table with New Data
    Goto Write Accept Table
(Delete an Existing Record)
    If transaction is "Delete" then
              If record does not exist then
              Process Drop Error
              Goto Write Reject Table
************************************************************
         * Select System Clock Date     into Delete - Transaction Date    *
         * Increment Sequence Number    into Delete - Transaction Number  *
         * Select User Name             into Delete - Transaction User    *
************************************************************
         * Update Master Table Record for Tran Date/Tran Num/User         *
************************************************************
         * (Master Snapshot)                                              *
         * Move Master Table Record to History Table                      *
************************************************************
         Delete Master Table Record Prom Master Table
         (Write MULTI-PROCESSED Accept Table)
************************************************************
         * Move "Current"              into Archive - Status  *
         * Move "System Date"          into Archive - Date    *
******************************************
         Increment Accept Counter
         Insert to Accept Table
         Insert Second Accept Table (on a separate disk drive, if desired)
         Goto Loop to Next Transaction
(Write Reject Table)
              Increment Reject Counter
              Insert to Reject Table
(Loop to Next Transaction)
              Goto Read Next Transaction
(End of Program)
              End
```

Note: The specific multiprocessing of "Write Multiprocessed Accept Table" may be relocated to the specific routine (Add, Change, or Delete) depending upon the computer language being used.

Step 5: At the end of the "proofing period", such as daily or weekly, when proof tallies are matched to computer tallies, the Accept Table can be deleted as follows:

(Begin Program)
   Delete All Records from the Accept Table
(End Program)

Step 6: Backup all databases and tables before any information is purged as follows:

(Begin Program)
   Write All Tables in the "Current" database to backup
   Write All Tables in the "Archive" database to backup
(End of Program)

Step 7: At the end of a user-defined period, an archive and purge process occurs that (Begin Program)

```
************************************************
* Move "Archive"           to Archive Status
* Move "System Date"       to Archive Date
************************************************
```

Move All Records in the Master Table to Master Archive.
   Move All Records in the History Table to the History Archive.
(End Program)

Step 8: In the event that current records are wrongfully moved to the History Archive, they may be retrieved by (Begin Program)
   Move Specific Records from the Master Archive to the Master Table
   Move Specific Records from the History Archive to the History Table
(End Program)

This program should be executed only after Records have been moved from the Current database 300 to the Archive database 304. It should never be run after new transactions have been processed to the Current database 300.

MTCP Backup/Recovery

If necessary, a recovery program can be utilized at any time in the event of hardware failure. Upon complete recovery, Step 7 and Step 8 will have to be re-executed to insure the correct status before the next day's processing is begun. The Accept Table can then be used to as a substitute Input Table to return the system to its previous processing point. Once this table is exhausted, data from the Input Table would supply the remaining data for the processing job.

MTCP Management

Once test data are defined and processed, a business enterprise may (a) Review lists of the contents of all Master Tables 312 for determining correctness.

(b) Reset the contents of all Master Tables for performing the next test.

(c) Retest.

MTCP Auditability

Once auditabilty is achieved, the business enterprise may query:

(a) When a Master Table Cluster was created.

(b) When each record was added (or inserted) to the Master Table 312, (c) How many authorized changes (or updates) have been made to a record of the Master Table 312.

(d) Prove the integrity of the master transaction cluster by producing a sequential list of all record changes, and if the record was deleted, where the record is stored.

Accordingly, 100% auditability of every change, every day, for every application is possible.

Multiprocessing Defined

Unlike serial processing which processes all jobs in sequential fashion, multiprocessing processes some of the same jobs simultaneously, or in parallel. While multiprocessing is not new, major computer manufacturers such as Compaq, Digital, Hewlett-Packard, IBM, NCR, Unisys, etc. have announced offerings of low-cost multiprocessing machines based on 2, 4, 8, and sixteen processors. These machines will rapidly increase the demand for multiprocessing software, which is known as "multithreaded" software. Multithreaded software permits the simultaneous execution of more than one jobs or job sequences.

Multiprocessing takes two forms, Symmetrical Multiprocessing (SMP) and Massively Parallel Processing (MPP), the difference being that symmetrical multiprocessing machines collectively have only one bus between the processors and the peripheral storage. For example, a symmetrical multiprocessing machine may have eight processors, one bus, and sixteen disk drives. In contrast, massive parallel processing machines has one bus for each processor. For example, a massively parallel machine may have eight processor, eight busses, and sixteen disk drives. Therefore, symmetrical multiprocessing machines are best suited for applications with a high processing content and a low input/out content. In contrast, massively parallel processing machines are best suited for applications that can be parallelized and have a high input/output requirement, as is the case with many commercial systems.

In either event, multiprocessing machines are best utilized when carefully tuned to avoid bottlenecks. This is likely to mean that all of the layers constituting a computing environment are multiprocessing-enabled. That is, the hardware, operating system, relational database management system, and the specific application are capable of multiprocessing. Some multiprocessing mainframes have been available for several years as well as some versions of the UNIX operating system. Only a few multiprocessing relational databases exist and even fewer multiprocessing applications. It is believed by some that the success of multiprocessing is solely dependent upon the "knowledge of the application" rather than "knowledge of the underlying tools," the tools being the hardware, operating system, and relational database system.

Accordingly, it is believed that the limiting factors for the success of multiprocessing for financial systems depends on:

(1) the lack of financial transaction application knowledge, (2) a lack of understanding of how multiprocessing can be used to effect 100% auditability, and (3) the lack of understanding as to how to decompose a financial transaction system into a series of small independent processes that may be performed simultaneously.

MTPC Uniqueness

Approaching multiprocessing from the business enterprise perspective, there are several levels by which processing could be sub-divided. These are by:

(1) application, wherein certain applications are capable of being performed in parallel, such as e.g., Accounts Receivable, Accounts Payable, etc.

(2) function, wherein certain functions within an application are capable of being performed in parallel, such as, e.g., updating customer profiles, customer status, or performance.

(3) process, wherein certain large tasks are capable of being decomposed into smaller tasks that can be performed in parallel, such as, e.g., by splitting a large Accounts Receivable process, such as billing, into subcomponents.

(4) transaction, wherein transactions are decomposed into subtransactions that are capable of being performed in parallel.

The value of MTCP is that it addresses the last form of multiprocessing which is believed to be the most critical to delivering rapid response times for real-time financial transaction processing systems. That is, by dividing a transaction into subtransactions that can be spread across several multiprocessors) processing throughput may be faster. Plus, the large number of small programs make maintenance much easier and less expensive.

A first embodiment of the transaction processing controller 52 is provided in the flowchart of FIG. 6. Note that for simplicity, error handling and related validity checking steps have been omitted. However, the performance of such steps is within the scope of the present invention, as one skilled in the art will appreciate. A second pseudo-code embodiment of the transaction processing controller 52 follows.

Pseudo-Code for the Command Processor

Transaction Processing Controller 52

```
BEGIN
    /* The following switches are global. They control both the activity of the system. */
    /* The Processor Switches monitors the availability of an eight processor computer. */
    /* The Process Switches monitors all of the jobs that are to be executed. */
    /* These switches initialize the system, and then change throughout processing */
    /* as the subcomponents of the system and the processors finish. */
    /* The Processor Switches are turned ON as jobs are sent to specific processors. */
    /* The Processor Switches are turned OFF after the jobs are completed. */
    Set Processor 1 Switch = 0
    Set Processor 2 Switch = 0
    Set Processor 3 Switch = 0
    Set Processor 4 Switch = 0
    Set Processor 5 Switch = 0
    Set Processor 6 Switch = 0
    Set Processor 7 Switch = 0
```

-continued

```
Set Processor 8 Switch = 0
Read Begin Time from Systems Clock into Working Storage
Set Total Records Read = 0
Set Number Accepts = 0
Set Number Rejects = 0
/* The Command Programs reads the transaction input from the operator, then   */
/* edits the transaction for validity and loads the transaction processing algorithms   */
/* from the Transaction Processing table (or cache file) to a temporary table. It then   */
/* walks down all of algorithms in the temporary table to process the total transaction   */
/* with 100% auditability. Each algorithm may be passed to a separate processor.
/* Read operator instructions for starting and ending item in input stream   */
/* For the purposes of restart in the event of mid-stream job failure   */
/* For the purpose of omissions in processing.   */
/* Operator may enter Begin .............. End for all items   */
/* Operator may enter Begin ..... End for a beginning list   */
/* Operator may enter Begin ..... End for an intermediate list   */
/* Operator may enter Begin ..... End for an ending list   */
Read Beginning Item in Input Stream from Master Control Terminal
Read Ending Item in Input Stream from Master Control Terminal
Set Beginning Item to Next Transaction
Set Ending Item to End of List
Read System Clock for Begin Time
Add Record with Begin Time
IF Error then
    Message "No System Table Record for Begin Time", Details
ENDIF
<<Read Next Transaction>>
/* The Process Switches are turned ON as each transaction subcomponent is completed. */
/* The Process Switches are turned OFF after the total transaction is completed. */
Set Process 1 Switch = 0
Set Process 2 Switch = 0
Set Process 3 Switch = 0
Set Process 4 Switch = 0
Set Process 5 Switch = 0
Set Process 6 Switch = 0
Set Process 7 Switch = 0
Set Process 8 Switch = 0
Set Process 9 Switch = 0
Set Process 10 Switch = 0
Set Process 11 Switch = 0
Set Process 12 Switch = 0
Set Process 13 Switch = 0
Set Process 14 Switch = 0
Set Process 15 Switch = 0
Set Process 16 Switch = 0
Set Process 17 Switch = 0
Set Process 18 Switch = 0
Set Process 19 Switch = 0
Set Process 20 Switch = 0
Set Process 21 Switch = 0
Set Process 22 Switch = 0
Set Process 23 Switch = 0
Set Process 24 Switch = 0
Read Next Transaction into Working Storage
IF EOF then
    Read End Time from Systems Clock into Working Storage
    INSERT End-time, Begin Time
        Total Records Read, Number Accepts, Number Rejects
        into Summary Table
    IF Error then
        Message "INSERT ST Table", Details
        STOP
    ENDIF
    Goto EOJ
ENDIF
IF Next Transaction = End of List
    Goto EOJ
ENDIF
Increment Total Records Read
<<Test Transaction Type>>
IF Transaction Type != ' ' then
/* Set Switches for Trade Offset and Settle Offset Processing   */
    Set Process 1 Switch = 0
    Set Process 2 Switch = 1
    Set Process 3 Switch = 1
    Set Process 4 Switch = 1
    Set Process 5 Switch = 1
    Set Process 6 Switch = 0
    Set Process 7 Switch = 1
```

-continued

```
      Set Process 8 Switch = 1
      Set Process 9 Switch = 1
      Set Process 10 Switch = 1
      Set Process 11 Switch = 0
      Set Process 12 Switch = 1
      Set Process 13 Switch = 1
      Set Process 14 Switch = 1
      Set Process 15 Switch = 1
      Set Process 16 Switch = 1
      Set Process 17 Switch = 0
      Set Process 18 Switch = 0
      Set Process 19 Switch = 1
      Set Process 20 Switch = 1
      Set Process 21 Switch = 1
      Set Process 22 Switch = 1
      Set Process 23 Switch = 1
      Set Process 24 Switch = 0
ENDIF
<<Test OORR>>
IF OORR = 'O' then
      ****************
      CALL N_gine EDIT
      ****************
      IF Edit Error
            Message "Edit Error", Details
            Goto Write Reject Table
      ENDIF
      IF Tran-Type != 'Sell'
      OR Tran-Type != 'Withdraw' then
            INSERT into Transaction Journal Table
            IF Error
                  Message "Insert TJ Error", Details
                  Goto Write Reject Table
            ENDIF
            IF Correction Data then
                  DELETE from Reject Table
                  IF Error
                        Message "Delete Reject Error", Details
                        Goto Write Reject Table
                  ENDIF
            ENDIF
      ENDIF
      *********
      CALL TT      i.e., execute the algorithms in the temporary table
      *********
      IF Temporary Table Error then
            Message "Temporary Table Error", Details
            Goto Write Reject Table
      ENDIF
      Generate Sequence Number
ELSIF OORR = 'R'
      ****************
      CALL N_gine EDIT
      ****************
      IF Edit Error
            Message "Edit Error", Details
            Goto Write Reject Table
      ENDIF
      Assign Transaction Number = '000000'
      Assign LOT Number = 1
      <<Read Next Reversal>>
      Read Transaction Journal Table for reversal number
      IF "No Transaction Exists" where LOT = 1 then
            Message "No Transaction Exists", Details
            Goto Write Reject Table
      ENDIF
      IF "No Transaction Exists" and LOT > 1 then
            Goto Transaction Wrap-up
      ENDIF
      IF Previously Reversed
            Message "Previously Reversed", Details
            Goto Write Reject Table
      ENDIF
      INSERT Reversing Transaction" to Transaction Journal Table
      IF Error
            Message "INSERT TJ Reversing Error", Details
            Goto Write Reject Table
            ENDIF
            UPDATE "Reversed" Transaction
```

-continued

```
        IF Error
            Message ""UPDATE TJ Reversed Error", Details
            Goto Write Reject Table
        ENDIF
        Increment the LOT Number
        *********
        CALL TT    i.e., execute the algorithms in the temporary table
        *********
        IF Temporary Table Error then
            Message "Temporary Table Error", Details
            Goto Write Reject Table
        ENDIF
        Goto Read Next Reversal
        Generate Sequence Number
        UPDATE "Reversed" Transaction, ALL ROWS with Reversing Data
        IF Error then
            Message "UPDATE TL Table Reversed", Details
            Goto Write Reject Report
        ENDIF
        UPDATE "Reversing" Transaction, ALL ROWS with Reversed Data
        IF Error then
            Message "UPDATE TL Table Reversing", Details
            Goto Write Reject Report
        ENDIF
    ELSE
        INSERT into Reject Table "No Originate or Reverse Code"
        IF Error then
            Message "Insert Reject Table", Details
            Goto Write Reject Table
        ENDIF
    ENDIF
ENDIF
<<Transaction Wrap-up>>
INSERT INTO Transaction Count Table
Select Original-Count and Reversal Count from TC Table into Working Storage
IF Error then
    INSERT INTO TC Table, Details
    IF Error then
            Goto Write Reject Table
    ENDIF
ELSE
    IF      AORS = 'O' then
            Increment Original-Count
    ELSIF   AORS = 'R'
            Increment Reversal-Count
    ELSE
            Message "Invalid AORS Code", Details
        STOP
    ENDIF
ENDIF
<<Test Trade Settlement>>
IF      Transaction Switch = 2
        Goto Loop Next Transaction
ENDIF
IF      Transaction Switch = 1
OR      AORS = ' ' then
        Goto Loop Next Transaction
ENDIF
/* COMMIT Work to Database    */
COMMIT Original Transaction Before Offset Transaction
IF      AORS = 'A' then
        Insert Licensee Trade Offset Buy in Transaction Identifier
ELSIF   AORS = 'S'
        Insert Licensee Trade Offset Sell in Transaction Identifier
ELSE
        Message "Invalid AORS", Details
ENDIF
/* Swap Account Numbers for Automatic Transaction    */
Move Account Number to Working Storage Account Number
Move Buyer/Seller Number to Account Number
Move Working Storage Account Number to Account Number
Multiply the Net Amount by −1
Multiply the Amount Units by −1
Add Number of Settlement Days from Entity Master to Trade Date to determine Settlement Date
Add to Total Number of Accepts
UPDATE Row in System Table for Number of Accepts
IF Error then
    Message "Update Error for Accepts", Details
    Goto Write Reject Record
ENDIF
```

-continued

```
    Go to Test Transaction Type
    <<Loop Next Transaction>>
    /* COMMIT Work to Database   */
    COMMIT Original Transaction or Offset Transaction, if any
    Goto Read Next Transaction
    <<Write Reject Record>>
    Add to Total Number of Rejects
    UPDATE Row in System Table for Number of Rejects
    IF Error then
        Message "Update Error for Rejects", Details
    ENDIF
    INSERT Into Reject Table, Details
    IF Error
        Message "Insert Command Reject Table", Details
        STOP
    ENDIF
    Move Incoming Licensee Identifier to Stored Licensee Identifier
    Move Incoming Account Identifier to Stored Account Identifier
    Move Incoming Transaction Identifier to Stored Transaction Identifier
    Move Incoming Entity Identifier to Stored Entity Identifier
    Goto Read Next Transaction
    <<EOJ>>
    Read System Clock for End Time
    Add Record with End Time
    IF Error then
        Message "No System Table Record for End Time", Details
    ENDIF
END
```

Figure 7A:
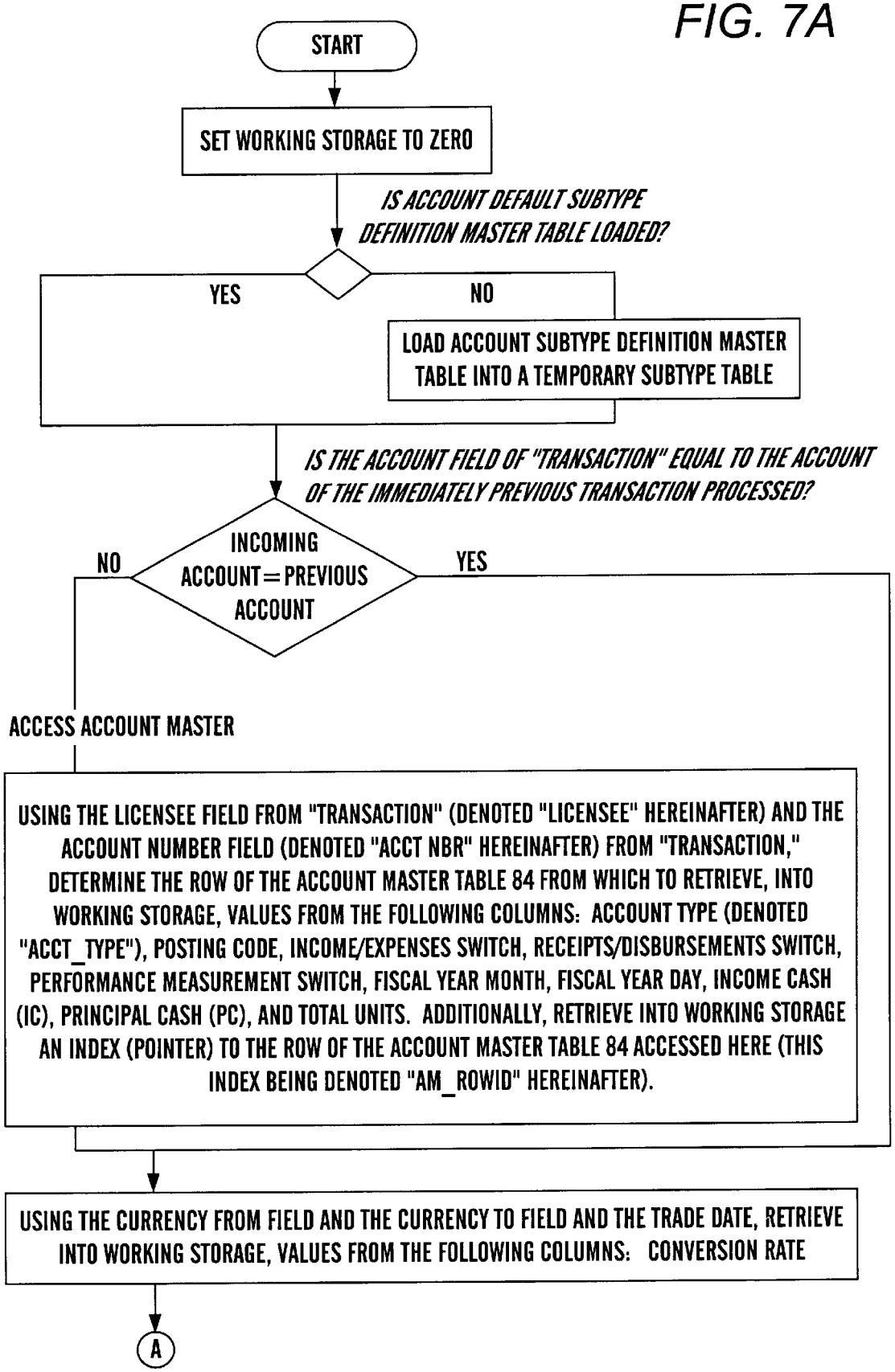
FIGS. 7-A through 7-D show the high level steps performed by an embodiment of the preprocessor and decomposer 54 of FIG. 2A.
Figure 7B:
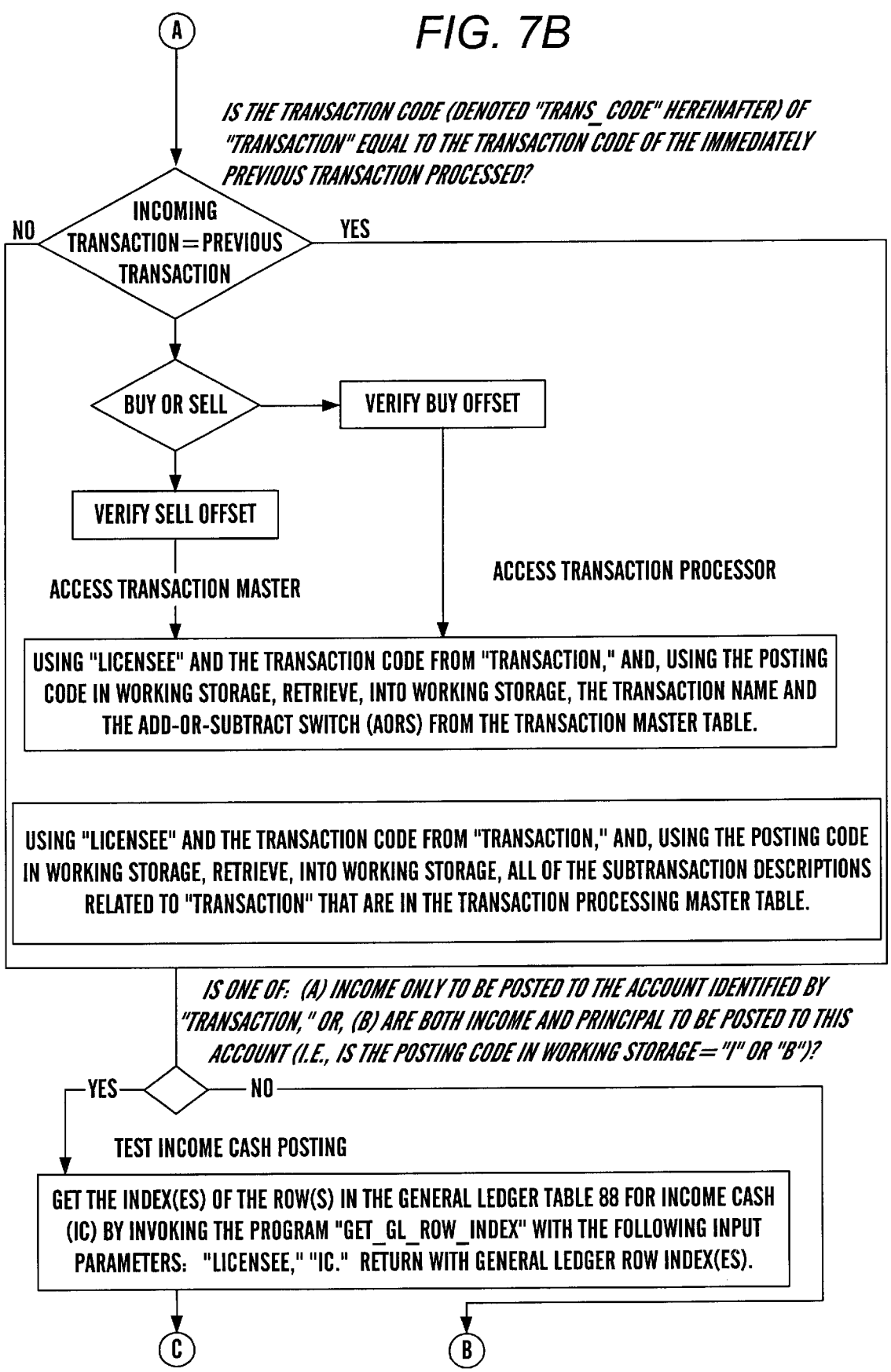
Figure 7C:
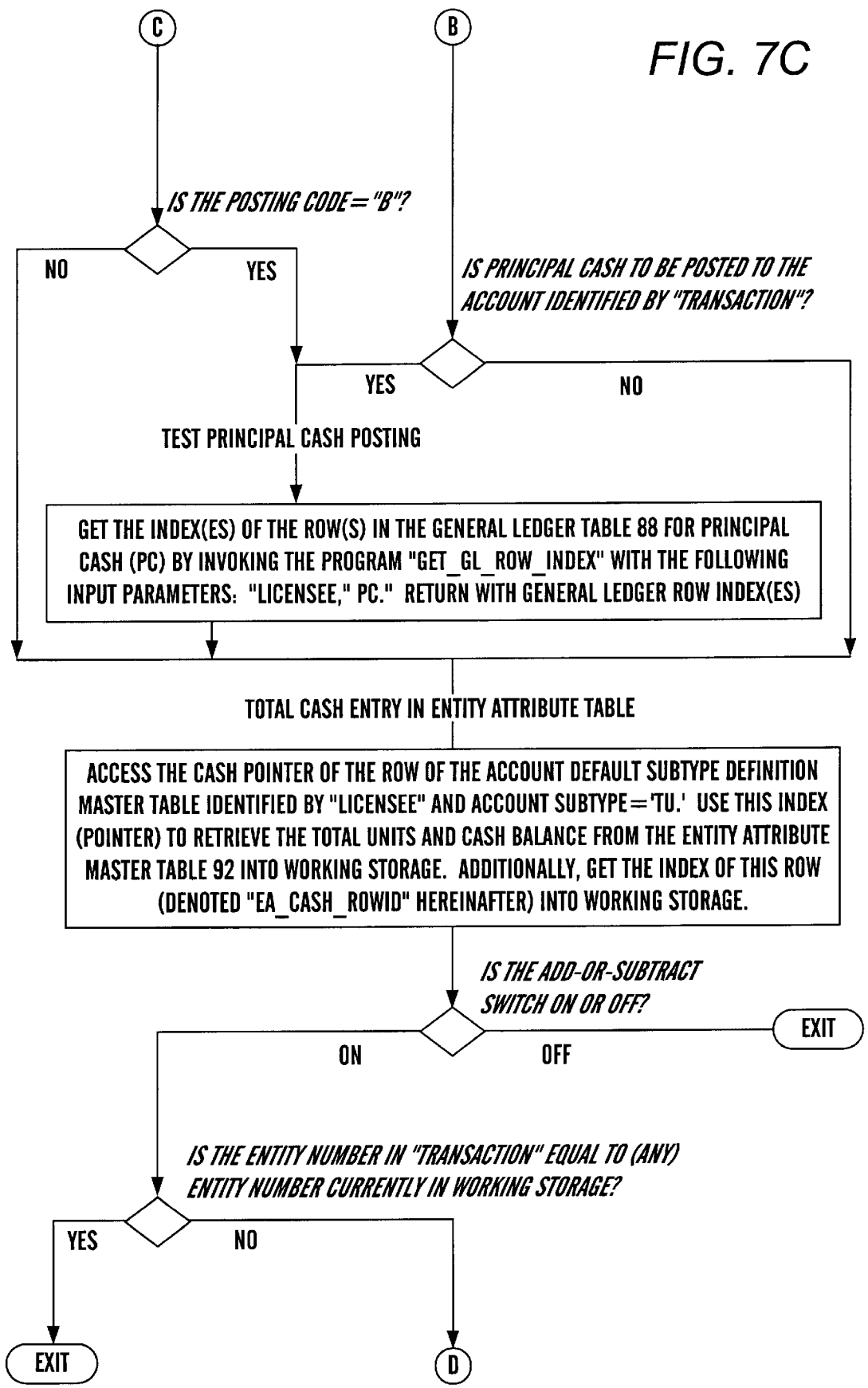
Figure 8A:
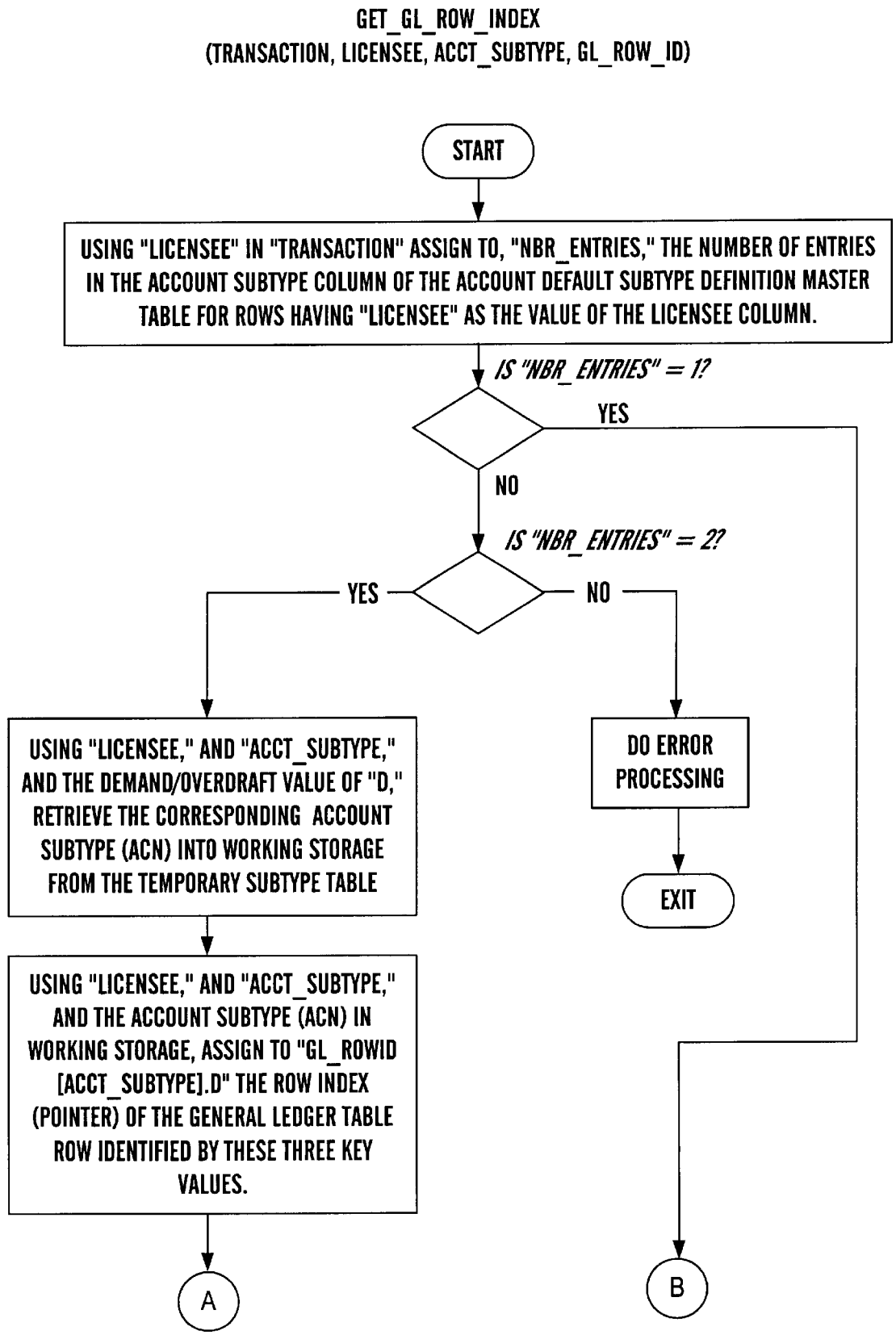
FIGS. 8-A and 8-B show the steps of a flowchart for obtaining indexes or pointers to particular rows of a general ledger table wherein the rows are used in processing a transaction.
Figure 8B:
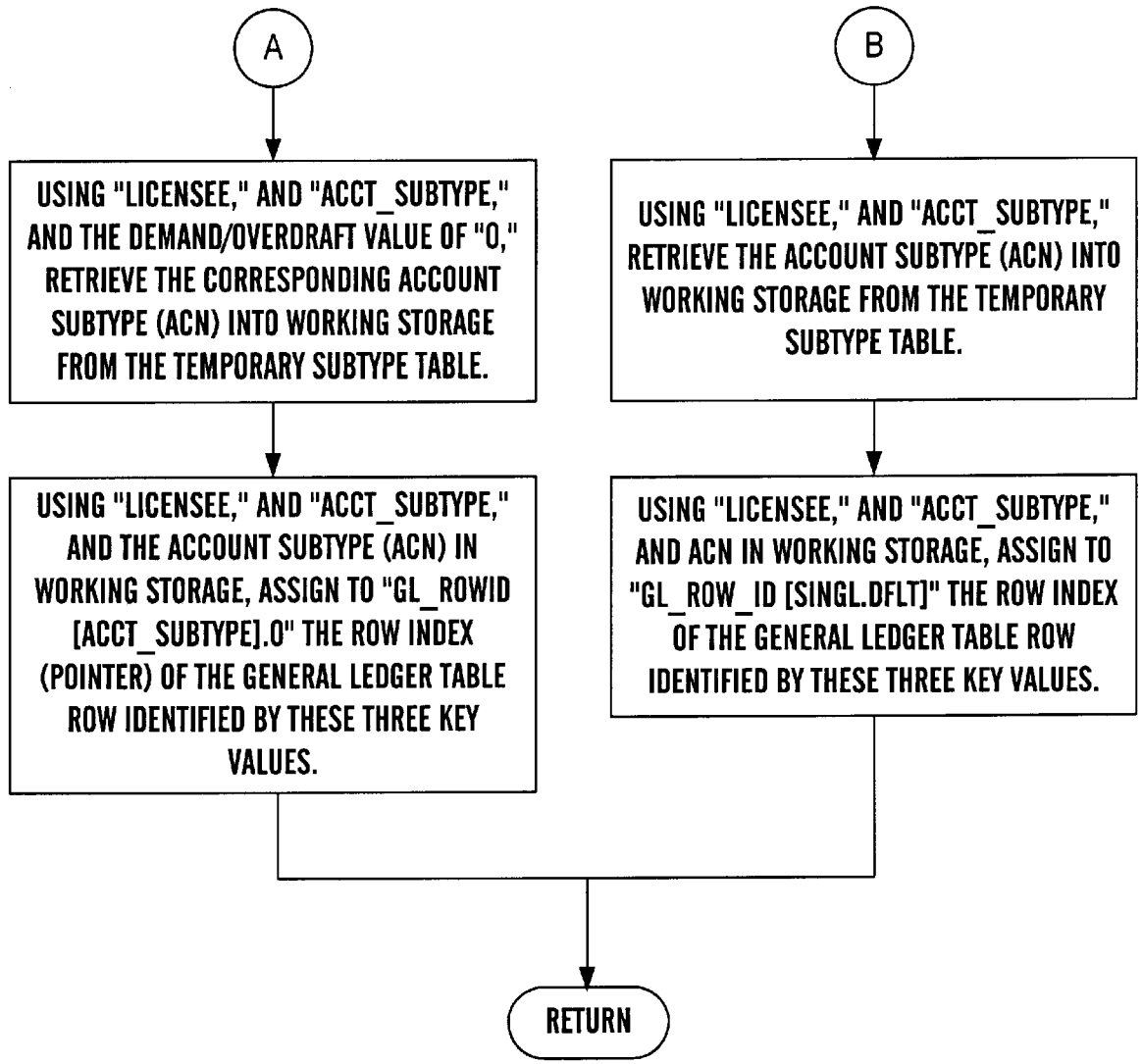

A first embodiment of the transaction preprocessor and decomposer 54 is provided in the flowcharts of FIGS. 7-A through 7-D and FIGS. 8-A and 8-B. Note that for simplicity, error handling and related validity check steps have been omitted. However, the performance of such steps is within the scope of the present invention, as one skilled in the art will appreciate.

A second pseudo-code embodiment of the transaction preprocessor and decomposer 54 follows.

Pseudo-Code for the Edit Processor for all Incoming Transactions

Transaction Preprocessor and Decomposer 54

```
BEGIN
    Housekeeping
        Set Working Storage Alphas to Blanks
        Set Working Storage Numbers to Zeroes
    IF Incomig Licensee Identifier = Stored Licensee Identifier then
        Using Licensee Identifier from Input String, retrieve
            Licensee Name
            Trade Settlement Switch
            Trade Offset Buy
            Trade Offset Sell
            from Licensee Master into Working Storage
        IF Error then
            Message "No Licensee Master", Detail
            Goto EOJ
        ENDIF
    ENDIF
    /************************************************/
    IF    the Default Definition Table has not been loaded to memory then
          LOAD all records from the Default Definition Table consisting of
              Licensee
              DD Class
              DD Identification
              DD Sub-Class
              DD Accounting Control Number
              DD Name
                    from the Default Definition Table
                    into the Temporary Table (TA)
          IF Error then
              Message "NO TA Table", Details
              Goto EOJ
          ENDIF
    ENDIF
    /************************************************************/
    IF the Incoming Account Identifier = Stored Account Identifier
          Goto Access Transaction Master (TM)
```

-continued

```
ELSE
            /*** This is the first table containing control totals for cash, units, and cost basis ***/
            <<Access Account Master>>
            From the Account Master Table (TM)
            using the Licensee Identifier from the Input String
            and the Account Identifier from the Input String, retrieve
                    Account Type
                    Income Posting Code
                    Income/Expense Switch
                    Receipt/Disbursement Switch
                    Performance Measurement Switch
                    Fiscal Year - Month
                    Fiscal Year - Day
                    Fiscal Year - Number Periods
                    Income Cash Balance
                    Principal Cash Balance
                    Invested Income
                    Invested Principal
                    Total Units - Assets
                    Liabilities
                    Total Units - Liabilities
                    and the Row Identification of the Account Master Record
                            from the Account Master Table (AM) into Working Storage
            IF Error then
                    Report "Invalid Account Identifier", Details
                    Goto Write Reject Report
            ENDIF
ENDIF
<<Access Transaction Master>>
IF      the Incoming Transaction Identifier = Stored Transaction Identifier
        Goto Test Cash Entry in Entity Attribute Table
ELSE
        Using the Licensee Identifier from the Input String
        and the Transaction Identifier from the Input String
                Transaction Name
                Add or Subtract Switch
                Settlement Switch
        and the Row Identification
                from the Transaction Master Table (TM) into Working Storage
IF Error then
        Message "Invalid Transaction Identifier", Details
        Goto Write Reject Report
ENDIF
IF AORS = 'A' then
        Using the Licensee Identifier from the Input String
        and the Trade Offset Buy from Working Storage, verify
        the existence of a Trade Offset Buy in the TM Table
        IF Error then
                Message "No Trade Offset Buy", Details
                Goto Write Reject Table
        ENDIF
ELSE AORS = 'S' then
        Using the License Identifier from the Input String
        and the Trade Offset Sell from Working Storage, verify
        the existence of a Trade Offset Sell in the TM Table.
        IF Error then
                Message "No Trade Offset Sell", Details
                Goto Write Reject Table
        ENDIF
ELSE
        Message "Invalid AORS Code", Details
        Goto Write Reject Report
ENDIF
<<Access Transaction Processing Table (TP)>>
Using the Licensee Identifier from the Input String
and the Transaction Identifier from the Input String, retrieve
        ALL of the Transaction Processing algorithrns
        from the Transaction Processing Table (TP)
        into a Temporary Table (TT) in Working Storage
IF Error then
        Message "No Transaction Processing Algorithms", Details
        Goto Write Reject Report
ENDIF
/*** This is the second control table containing cash, units, cost basis, liabilities, etc. ***/
<<Test Income Cash Posting Controls>>
IF the Working Storage Income Posting Code = 'I'
OR the Working Storage Income Posting Code = 'B' then
        Count the number of IC entries in the TA table
        <<Test Income Cash>>
```

-continued

```
            IF count = 1 then
                    Using Licensee Identifier from the Input String
                    and the Class = 'IC'
                    and the Sub-Class =' ' retrieve
                            Accounting Control Number from TA into Working Storage
                    IF Error then
                            Message "Invalid Income Cash ACN", Details
                            Goto Write Reject Record
                    ENDIF
                    Using the Licensee Identifier from the Input String
                    and the Accounting Control Number in Working Storage, retrieve
                    Accounting Control Number
                            and the Row Identification from General Ledger Table (SG)
                    IF Error then
                            Message "Invalid Income Cash on SG", Details
                            Goto Write Reject Report
                    ENDIF
            ELSIF count = 2 then
                    Using the Licensee Identifier from the Input String
                    and the Class = 'IC'
                    and the Sub-class = 'D', retrieve
                            Accounting Control Number from TA into Working Storage
                    IF Error then
                            Message "Invalid Income Cash Demand ACN in TA", Details
                            Goto Write Reject Report
                    ENDIF
                    Using the Licensee Identifier from the Input String
                    and the Accounting Control Number in Working Storage, retrieve
                            Accounting Control Number
                            and the Row Identification from the General Ledger
                    IF Error then
                            Message "Invalid Income Cash Demand in GL", Details
                            GOto Write Reject Report
                    ENDIF
                    Using the Licensee Identifier from the Input String
                    and the Class = 'IC'
                    and the Sub-class ='O', retrieve
                    Accounting Control Number from TA table into Working Storage
                    IF Error then
                            Message "Invalid Income Cash Overdraft ACN in TA",
                                    Details
                            Goto Write Reject Report
                    ENDIF
                    Using the Licensee Identifier from the Input String
                    and the Accounting Control Number in Working Storage, retrieve
                            Accounting Control Number
                            and the Row Identification from the General Ledger
                    IF Error then
                            Message "Invalid Income Cash Overdraft in GL", Details
                            Goto Write Reject Report
                    ENDIF
            ELSE
                    Message "Invalid Income Cash Count on DD", Details
                    Goto Write Reject Record
            ENDIF
<<Test Principal Cash Posting Controls>>
ELSIF the Working Storage Income Posting Code = 'P'
            Count the number of PC entries in the TA table
            <<Test Principal Cash>>
            IF count = 1 then
                    Using the Licensee Identifier from the Input String
                    and the Class = 'PC'
                    and the Sub-Class = ' ' retrieve
                            Accounting Control Number from TA into Working Storage
                    IF Error then
                            Message "Invalid Principal Cash ACN", Details
                            Goto Write Reject Record
                    ENDIF
                    Using the Licensee Identifier from the Input String
                    and the Accounting Control Number in Working Storage, retrieve
                    Accounting Control Number
                            and the Row Identification from General Ledger Table (SG)
                    IF Error then
                            Message "Invalid Principal Cash on SG", Details
                            Goto Write Reject Report
                    ENDIF
            ELSIF count = 2 then
                    Using the Licensee Identifier from the Input String
                    and the Class = 'PC'
```

-continued

```
                        and the Sub-class = 'D', retrieve
                                Accounting Control Number from TA into Working Storage
                        IF Error then
                                Message "Invalid Principal Cash Demand ACN in TA",
                                        Details
                                Goto Write Reject Report
                        ENDIF
                        Using the Licensee Identifier from the Input String
                        and the Accounting Control Number in Working Storage, retrieve
                                Accounting Control Number
                                and the Row Identification from the General Ledger
                        IF Error then
                                Message "Invalid Principal Cash Demand in GL", Details
                                Goto Write Reject Report
                        ENDIF
                        Using the Licensee Identifier from the Input String
                        and the Class = 'PC'
                        and the Sub-class = 'O', retrieve
                        Accounting Control Number from TA table into Working Storage
                        IF Error then
                                Message "Invalid Principal Cash Overdraft ACN in TA",
                                        Details
                                Goto Write Reject Report
                        ENDIF
                        Using the Licensee Identifier from the Input String
                        and the Accounting Control Number in Working Storage, retrieve
                                Accounting Control Number
                                and the Row Identification from the General Ledger
                        IF Error then
                                Message "Invalid Principal Cash Overdraft in GL", Details
                                Goto Write Reject Report
                        ENDIF
                ELSE
                        Message "Invalid Principal Cash Count on DD", Details
                        Goto Write Reject Record
                ENDIF
        ELSE
                Message "Invaiid Posting Code", Details
                Goto Write Reject Report
        ENDIF
ENDIF
<<Test Cash Entry in Entity Attribute Table>>
Using the Licensee Identifier from the Input String
and the Account Control Number frorn the TU Record in Working Storage, retrieve
        The Total Units - Assets
        and the Row Identifier from the Entity Attribute Table (EA)
IF Error then
        Message "Invalid Total Units", Details
        Goto Write Reject Table
ENDIF
<<Test Asset/Liability Processing>>
IF Working Storage Add or Subtract Switch (AORS) is OFF then
        Goto EOJ
ENDIF
IF Incoming Entity Identifier = Stored Entity Identifier then
        GotoEOJ
ENDIF
/*** This is the third table containing control table for cash, units, cost basis, liabilities, etc. ***/
<<Access Entity Attribute Table (EA)>>
        Using the Licensee Identifier from the Input String
        and the Entity Identifier from the Input String, retrieve
                Accounting Control Number (Asset)
                Accounting Control Number (Liability)
                Diversification Type
                Diversification Group
                Diversification Class
                Invested Income Balance
                Invested Principal Balance
                Total Units - Assets
                Total Units - Liabilities
                and the Row Identification of the Entity Attribute Record
                        from the Entity Attribute Table (EA) into Working Storage
```

-continued

```
            IF Error then
                    Message "Invalid Entity Identifier in EA", Details
                    Goto Write Reject Table
            ENDIF
<<Access the Entity Transaction Table (ET)>>
            Using the Licensee Identifier from the Input String
            and the Entity Identifier from the Input String, verify
                    the existence of an acceptable transactic
                    in the Entity Transaction Table (ET) for the Entity Identifier.
            IF Error then
                    Message "Invalid Transaction for this Entity", Details
                    Goto Write Reject Table
            ENDIF
            <<Access the Entity Master Table (EM)>>
            Using the Entity Identifier from the Input String, retrieve
                    Income Rate
                    Income Ex-Date
                    Income Record Date
                    Income Payment Date
                    Cap-Adj Rate
                    Cap-Adj Ex-Date
                    Cap-Adj Record Date
                    Cap-Adj Payment Date
                    Settlement Days
                    Current Price
                            from the Entity Master Table (EM) into Working Storage
            IF Error then
                    Message "No Entity Master", Detaiis
                    Goto Write Reject Report
            ENDIF
<<Test Other Assets>>
            Using the Licensee Identifier from the Input String
            and the Account Type from Working Storage
            and the Accounting Control Number - Asset from Working Storage, retrieve
                    the Accounting Control Number - Asset
                    and Row Identifier from the General Ledger (SG)
            IF Error then
                    Message "Invalid ACN - Asset", Details
                    Goto Write Reject Report
            ENDIF
<<Test Other Liabilities>>
            Using the Licensee Identifier from the Input String
            and the Account Type from Working Storage
            and the Accounting Control Number - Liability from Working Storage, retrieve
                    the Accounting Control Number - Liability
                    and Row Identifier from the General Ledger (SG)
            IF Error then
                    Message "Invalid ACN - Liabilities", Details
                    Goto Write Reject Report
            ENDIF
<<Test Invested Income>>
            Using the Licensee Identifier from the Input String
            and the Account Type Code from Working Storage
            and the Invested Income Identifier from Working Storage, retrieve
                    the Invested Income Balance
                    and the Row Identifier from the General Ledger Table (SG)
            IF Error then
                    Message "Invalid Invested Income"
                    Goto Write Reject Table
            ENDIF
<<Test Invested Principal>>
            Using the Licensee Identifier from the Input String
            and the Account Type Code from Working Storage
            and the Invested Principal Identifier from Working Storage, retrieve
                    the Invested Principal Balance
                    and the Row Identifier from the General Ledger Table (SG)
            IF Error then
                    Message "Invalid Invested Principal"
                            Goto Write Reject Table
                    ENDIF
                    Goto EOJ
            <<Write Reject Table>>
                    Add to Reject Table
                    IF Error then
                            Message "Invalid Insert to Reject Table", Details
                            STOP
                    ENDIF
```

```
           <<EOJ>>
                Null
END
```

Pseudo-Code for the Scheduler Subtransaction Scheduler 62

```
BEGIN
    <<Read Next Process>>
    Read Next Transaction in Temporary Table (TT)
        IF EOJ then
            <<Test All Switches - AORL>>
            IF   All 18 Process Switches = 0
                Goto EOJ
            ENDIF
            Wait 10 milliseconds
            Goto Test All Switches - AORL
        ENDIF
    <<Test Processor Availability>>
    IF Processor 1 Switch = 0 then
        Set Processor 1 Switch = 1
        Initiate Process on Processor 1  @ end, Set Processor 1
        Switch = 0
        Goto Next Process Loop
    ENDIF
    IF License Master (LM) Number of Processors = 1 then
        <<Test 1 Processor>>
        IF Processor 1 Switch = 1 then
            Wait 10 Milliseconds
            Goto Test 1 Processor
        ENDIF
        Goto Test Processor Availability
    ENDIF
    IF Processor 2 Switch = 0 then
        Set Processor 2 Switch = 1
        Initiate Process on Processor 2  @ end, Set Processor 2
        Switch = 0
        Goto Next Process Loop
    ENDIF
    IF License Master (LM) Number of Processors = 2 then
        <<Test 2 Processors Busy>>
        IF   Processor 1 Switch = 1
        AND  Processor 2 Switch = 1 then
            Wait 10 milliseconds
            Goto Test 2 Processors Busy
        ENDIF
        Goto Test Processor Availability
    ENDIF
    IF Processor 3 Switch = 0 then
        Set Processor 3 Switch = 1
        Initiate Process on Processor 3  @ end, Set Processor 3
        Switch = 0
        Goto Next Process Loop
    ENDIF
    IF Processor 4 Switch = 0 then
        Set Processor 4 Switch = 1
        Initiate Process on Processor 4  @ end, Set Processor 4
        Switch = 0
        Goto Next Process Loop
    ENDIF
    IF License Master (LM) Number of Processors = 4 then
        <<Test 4 Processors Busy>>
        IF   Processor 1 Switch = 1
        AND  Processor 2 Switch = 1
        AND  Processor 3 Switch = 1
        AND  Processor 4 Switch = 1 then
            Wait 10 milliseconds
            Goto Test 4 Processors Busy
        ENDIF
        Goto Test Processor Availability
    ENDIF
    IF Processor 5 Switch = 0 then
        Set Processor 5 Switch = 1
        Initiate Process on Processor 5  @ end, Set Processor 5
        Switch = 0
        Goto Next Process Loop
    ENDIF
    IF Processor 6 Switch = 0 then
        Set Processor 6 Switch = 1
        Initiate Process on Processor 6  @ end, Set Processor 6
        Switch = 0
        Goto Next Process Loop
    ENDIF
    IF Processor 7 Switch = 0 then
        Set Processor 7 Switch = 1
        Initiate Process on Processor 7  @ end, Set Processor Switch
        7 = 0
        Goto Next Process Loop
    ENDIF
    IF Processor 8 Switch = 0 then
        Set Processor 8 Switch = 1
        Initiate Process on Processor 8  @ end, Set Processor 8
        Switch = 0
        Goto Next Process Loop
    ENDIF
    IF Licensee Master (LM) Number ofProcessors = 8 then
        <<Test 8 Processors Busy>>
        IF   Processor 1 Switch = 1
        AND  Processor 2 Switch = 1
        AND  Processor 3 Switch = 1
        AND  Processor 4 Switch = 1
        AND  Processor 5 Switch = 1
        AND  Processor 6 Switch = 1
        AND  Processor 7 Switch = 1
        AND  Processor 8 Switch = 1 then
            Wait 10 milliseconds
            Goto Test 8 Processors Busy
        ENDIF
        Goto Test Processor Availability
    ENDIF
    <<Next Process Loop>>
        Goto Read Next Process
    <<EOJ>>
    Null
END
```

Process the Controls Process Routine in the Temporary Table (TT)

```
BEGIN
    IF OORR = "O" then
        Set Factor = + 1
    ELSIF OORR = 'R' then
        Set Factor = - 1
    ENDIF
    <<Total Units>>
    IF       Operand 2 = 'TU' then
             (AMU) Process AM  Units
             (EAU) Process EA  Units
             (PMU) Process PM  Units
    <<Cash Balances>>
    ELSIF    Operand 2 = 'IC'
    OR       Operand 2 = 'PC' then
             (AMC) Process AM  Income Cash Demand
                                Income Cash Overdraft
                                Principal Cash Demand
                                Principal Cash Overdraft
```

```
              (EAC) Process EA    Income Cash
                                  Principal Cash
    (GLC)     Process GL          Assets - Income Cash Demand
                                  Assets - Income Cash Overdraft
                                  Assets - Principal Cash Demand
                                  Assets - Principal Cash Overdraft
                                  Liab - Income Net Worth
                                  Liab - Principal Net Worth
    <<Investment Balances>>
    ELSIF     Operand 2 = 'II'
    OR        Operand 2 = 'IP' then
              (AMI) Process AM    Invested Income
                                  Invested Principal
              (EAI) Process EA    Cost
              (GLI) Process GL    Assets - Actg Control Number
                                  Liab - Income Net Worth
                                  Liab - Principal Net Worth
    <<Other Customized Investment Reporting>>
    ELSIF     Operand 2 = 'I' and Report Request = 'Y'
    OR        Operand 2 = 'E' and Report Request = 'Y' then
              (IEE) Process IE
              (PME) Process PM
    <<Receipts/Disbursements>>
    ELSIF     Operand 2 = 'R' and Report Request = 'Y'
    OR        Operand 2 = 'D' and Report Request = 'Y' then
              (IEC) Process RD
              (PMC) Process PM
    <<Performance Measurement>>
    ELSIF     Operand 2 = 'PM' and Report Request = 'Y' then
              (PMP) Process PM
    <<Contributions/Distributions>>
    ELSIF     Operand 2 = 'CN' and Report Request = 'Y'
    OR        Operand 2 = 'DN' and Report Request = 'Y' then
              (CDC) Process PM
    <<Management Fees>>
    ELSIF     Operand 2 = 'MF' and Report Request = 'F' then
              (PMM) Process PM
    <<Commissions>>
    ELSIF     Operand 2 = 'CM" then
              (PCM) Process PM
    <<Federal Taxes>>
    ELSIF     Operand 2 = 'FT' then
              (PMF) Process PM
    <<State Taxes>>
    ELSIF     Operand 2 = 'ST' then
    (PMS)     Process PM
    ELSE
              Message "Invalid Operand 2"
              STOP
    ENDIF
END
```

Process the Detail Records Maintenance Routine (AORS)
Note: Leave all switches=1 until the last routine is completed. This forces the processing to loop through each succeeding routine until completed. Then turn set all switches=0 so that the Scheduler will revert back to the Command Program to read another transaction.

```
<<Originate ADD>>
IF OORR = 'O' and
    AORS = 'A' then
        IF        Process 1 SWitch = 0 then
                  Set Process 1 Switch = 1
                  Initiate Process BS
        ELSIF     Process 2 Switch = 0 then
                  Set Process 2 Switch = 1
                  Initiate Process PI/PA
        ELSIF     Process 3 Switch = 0 then
                  Set Process 3 Switch = 1
                  Initiate Process TS
        ELSIF     Process 4 Switch = 0 then
                  Set Process 4 Switch = 1
                  Initiate Process PM
        ELSE
                  Set Process 1 Switch = 0
                  Set Process 2 Switch = 0
                  Set Process 3 Switch = 0
                  Set Process 4 Switch = 0
        ENDIF
<<Reverse ADD>>
ELSIF OORR = 'R' and
    AORS = 'A' then
        IF        Process 5 Switch = 0 then
                  Set Process 5 Switch = 1
                  Initiate Process BS
        ELSIF     Process 6 Switch = 0 then
                  Set Process 6 Switch = 1
                  Initiate Process PI/PA
        ELSIF     Process 7 Switch = 0 then
                  Set Process 7 Switch = 1
                  Initiate Process TS
        ELSIF     Process 8 Switch = 0 then
                  Set Process 8 Switch = 1
                  Initiate Process PM
        ELSE
                  Set Process 5 Switch = 0
                  Set Process 6 Switch = 0
                  Set Process 7 Switch = 0
                  Set Process 8 Switch = 0
        ENDIF
<<Originate SUB>>
ELSIF 00RR = 'O' and
    AORS = 'S' then
        IF        Process 9 Switch = 0 then
                  Set Process 9 Switch = 1
                  Initiate Process BS
        ELSIF     Process 10 Switch = 0 then
                  Set Process 10 Switch = 1
                  Initiate Process PI/PA
        ELSIF     Process 11 Switch = 0 then
                  Set Process 11 Switch = 1
                  Initiate Process TS
        ELSIF     Process 12 Switch = 0 then
                  Set Process 12 Switch = 1
                  Initiate Process CG
        ELSIF     Process 13 Switch = 0 then
                  Set Process 13 Switch = 1
                  Initiate Process PM
        ELSE
                  Set Process  9 Switch = 0
                  Set Process 10 Switch = 0
                  Set Process 11 Switch = 0
                  Set Process 12 Switch = 0
                  Set Process 13 Switch = 0
        ENDIF
<<Reverse SUB>>
ELSIF OORR = 'R' and
    AORS = 'S' then
        IF        Process 14 Switch = 0 then
                  Set Process 14 Switch = 1
                  Initiate Process BS
        ELSIF     Process 15 Switch = 0 then
                  Set Process 15 Switch = 1
                  Initiate Process PI/PA
        ELSIF     Process 16 Switch = 0 then
                  Set Process 16 Switch = 1
                  Initiate Process TS
        ELSIF     Process 17 Switch = 0 then
                  Set Process 17 Switch = 1
                  Initiate Process CG
        ELSIF     Process 18 Switch = 0 then
                  Set Process 18 Switch = 1
                  Initiate Process PM
        ELSE
                  Set Process 14 Switch = 0
                  Set Process 15 Switch = 0
                  Set Process 16 Switch = 0
                  Set Process 17 Switch = 0
                  Set Process 18 Switch = 0
        ENDIF
ENDIF
```

Figure 9A:
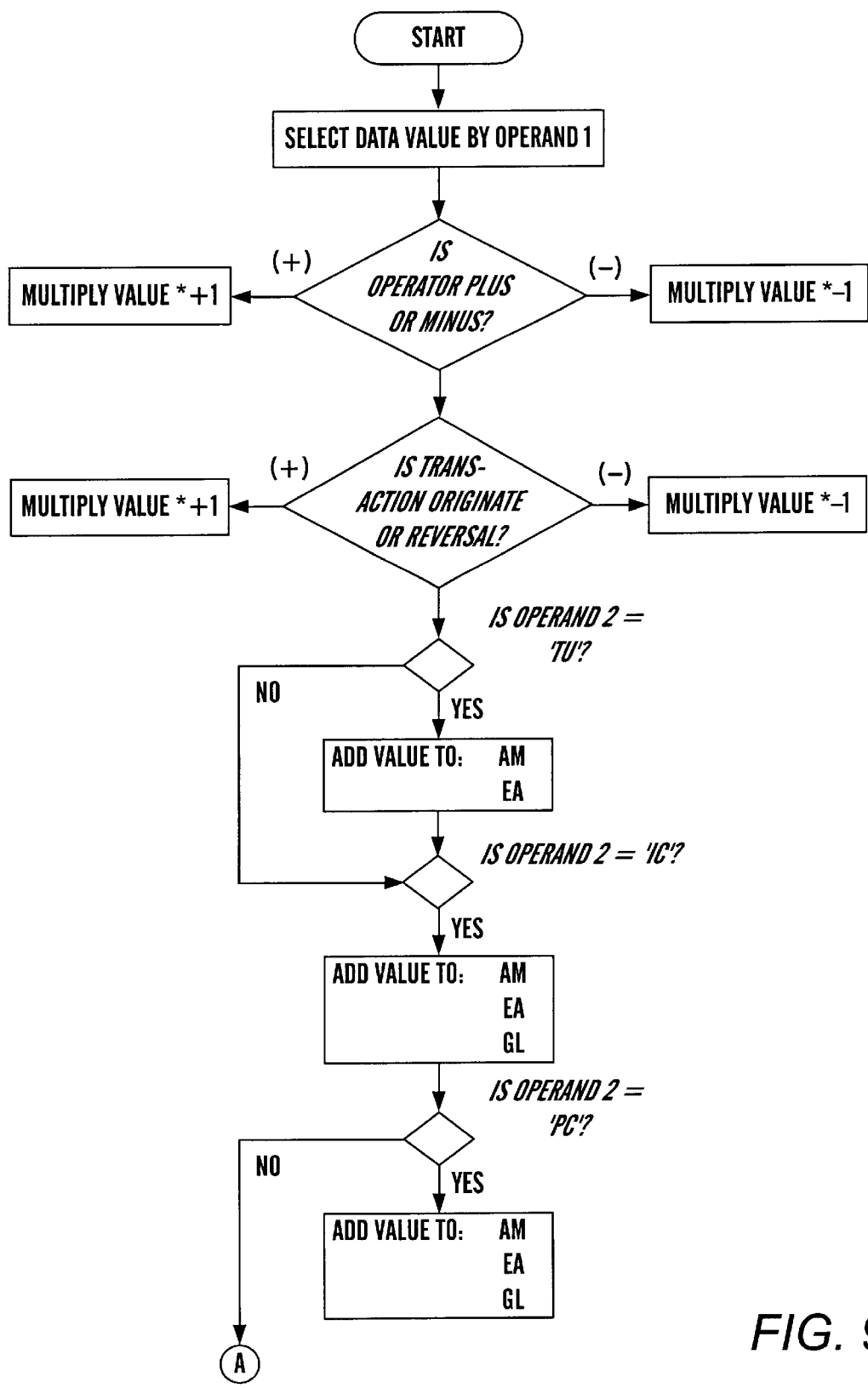
FIGS. 9-A and 9-B and 9-C show the steps for a flowchart of an embodiment of the subtransaction processing module 64 (FIG. 2A).
Figure 9B:
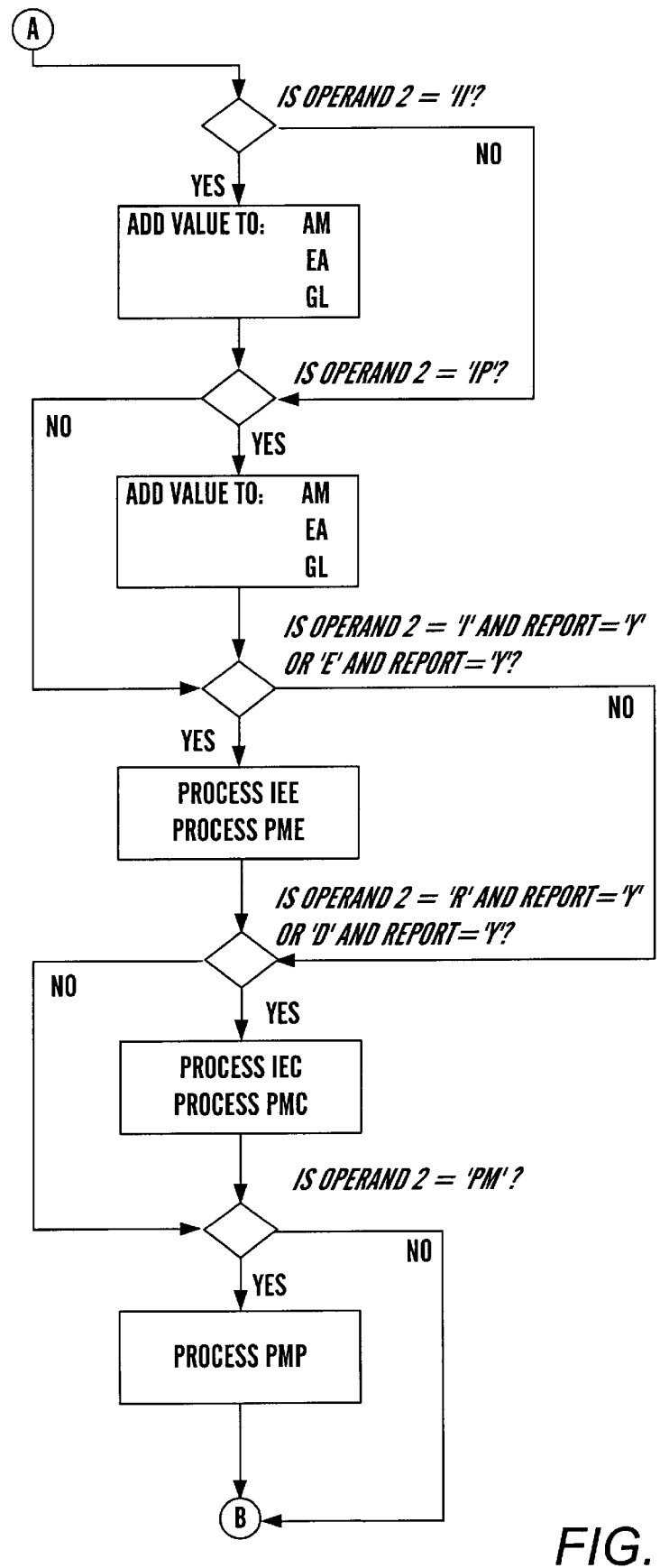
Figure 9C:
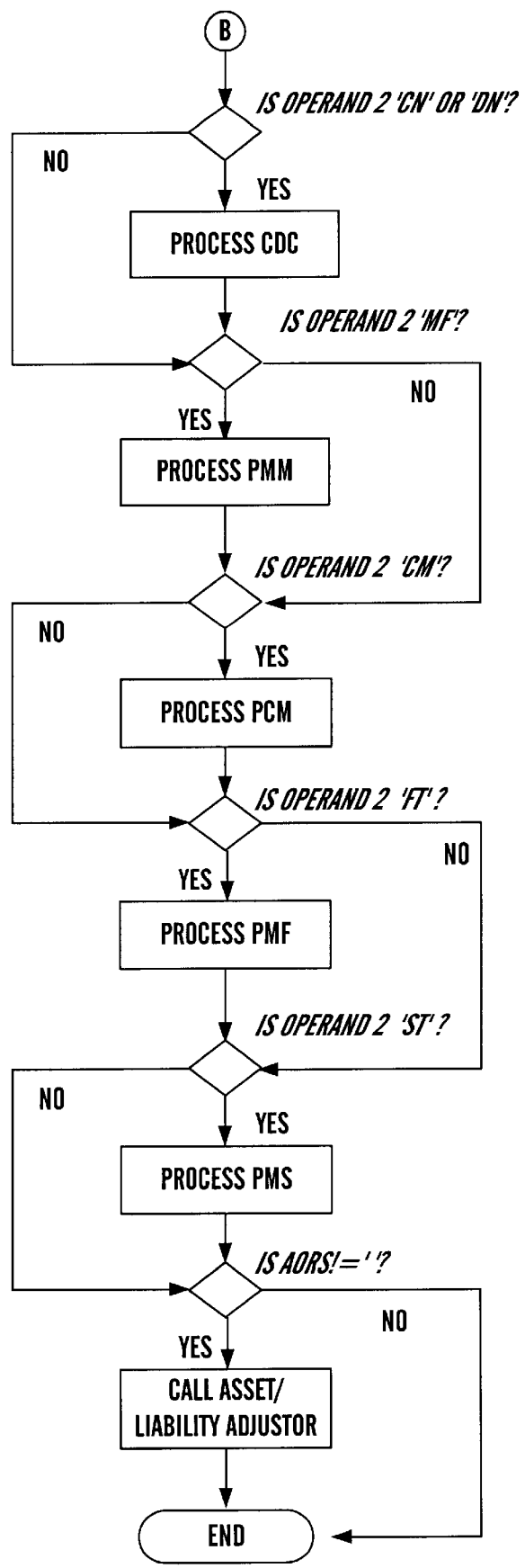
Figure 10A:
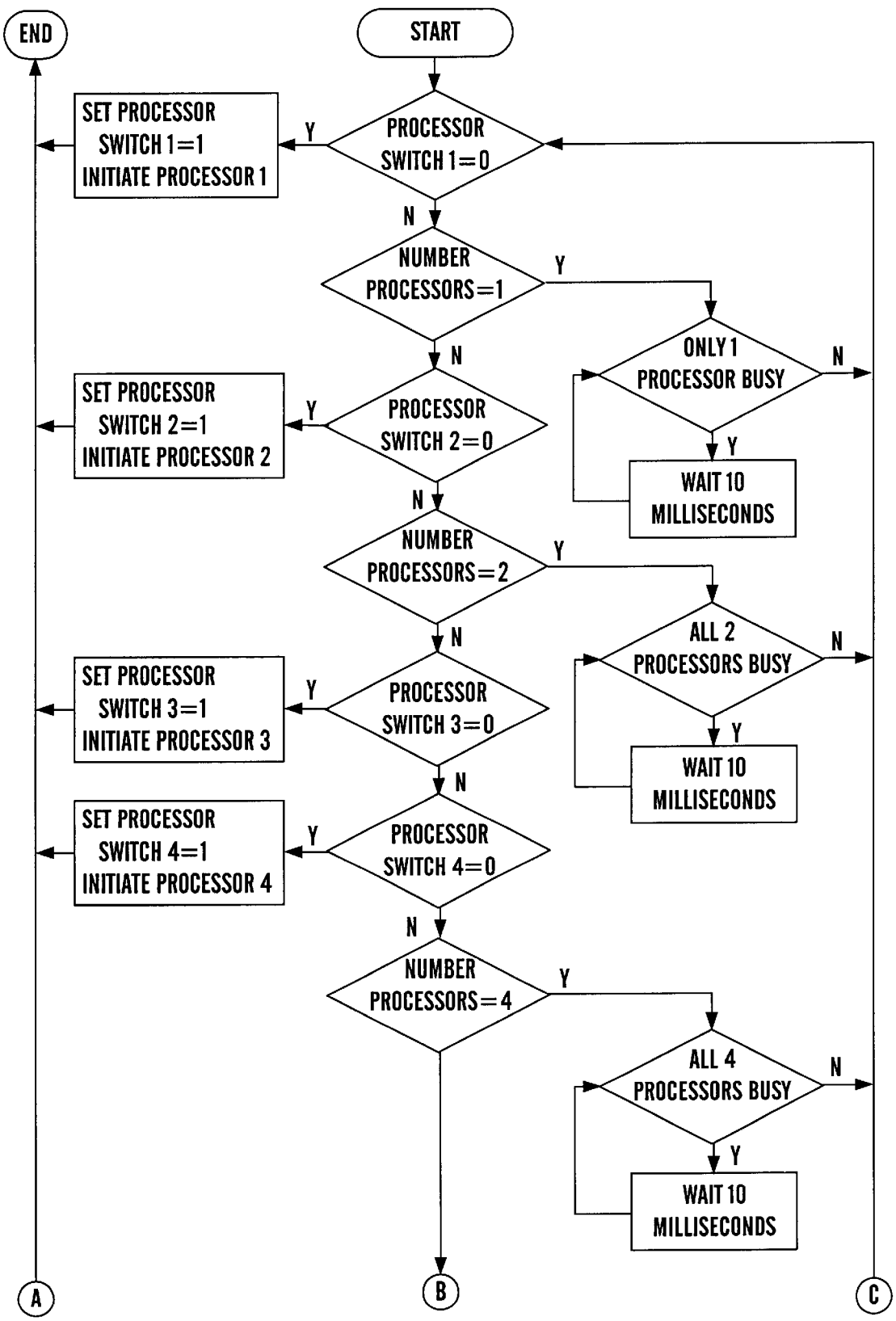
FIGS. 10A–10B show a flowchart of the steps performed for processing income cash transactions by the present invention.
Figure 10B:
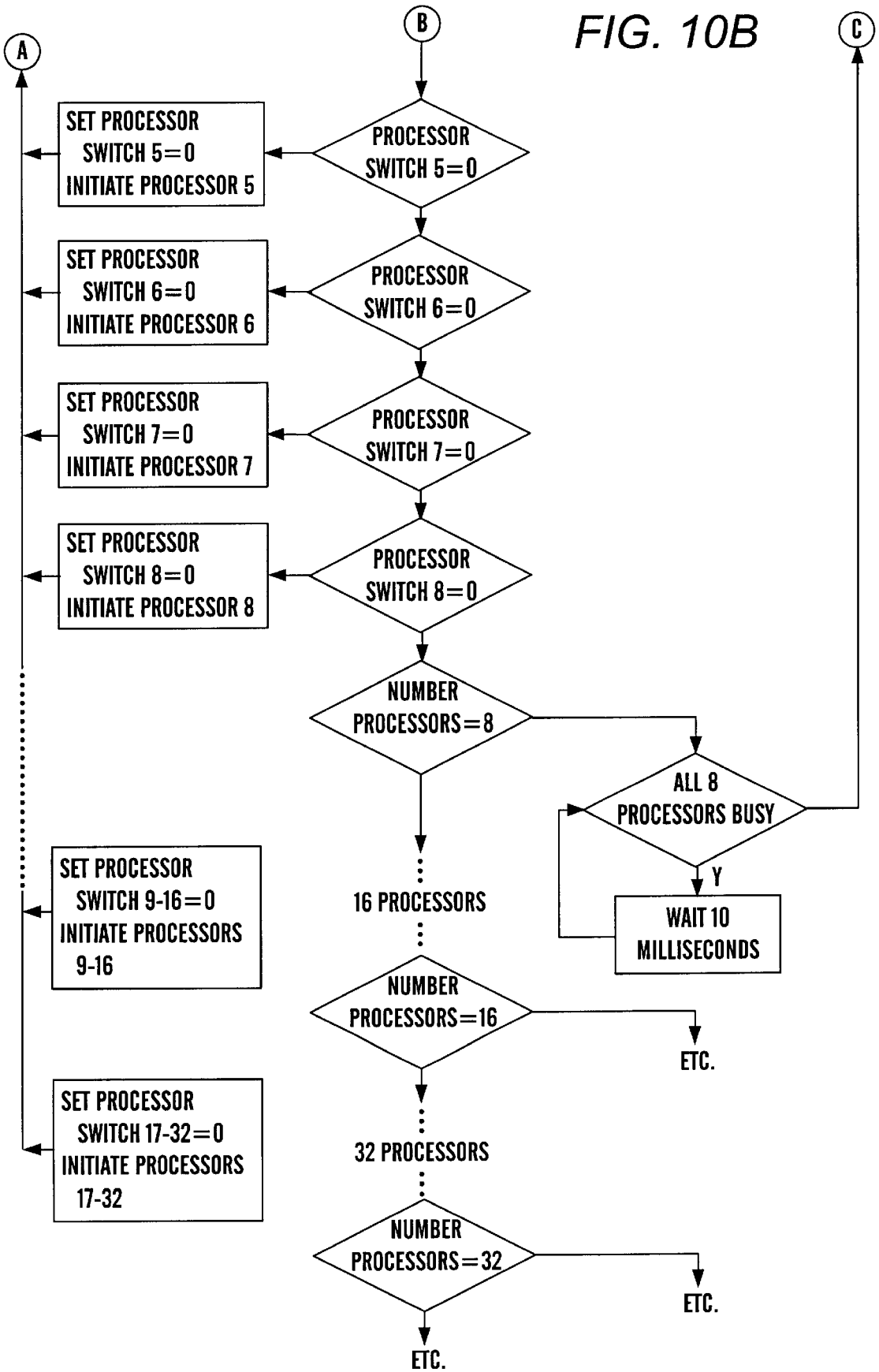
Figure 11:
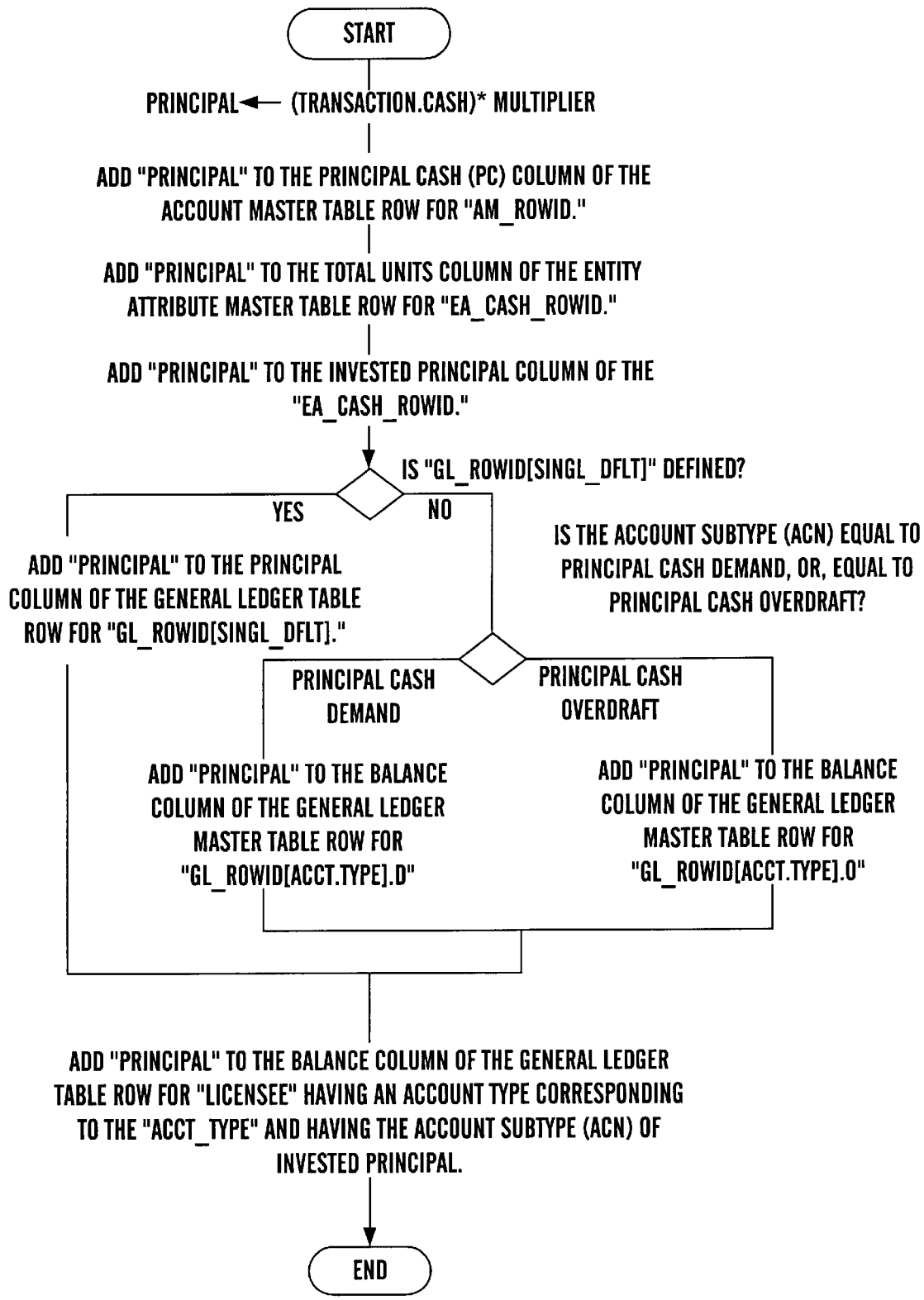
FIG. 11 is an embodiment of a flowchart of the steps performed for processing principal cash transactions by the present invention.
Figure 12:
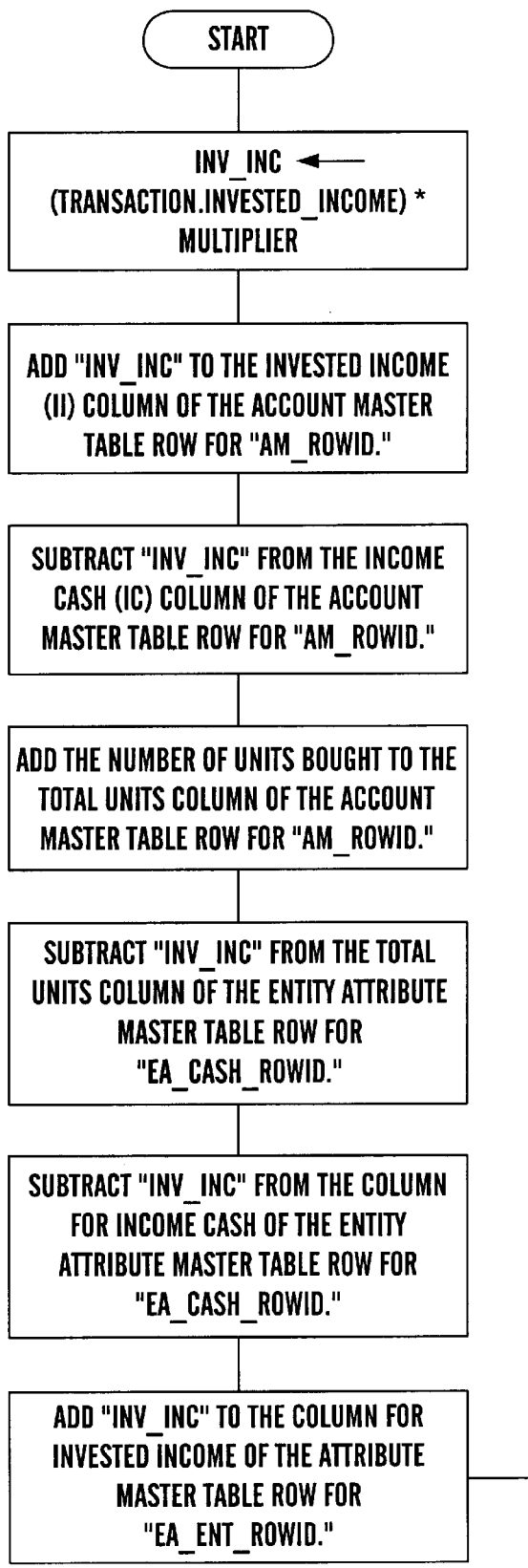
FIG. 12 is an embodiment of a flowchart of the steps performed for processing invested income transactions by the present invention.
Figure 12:
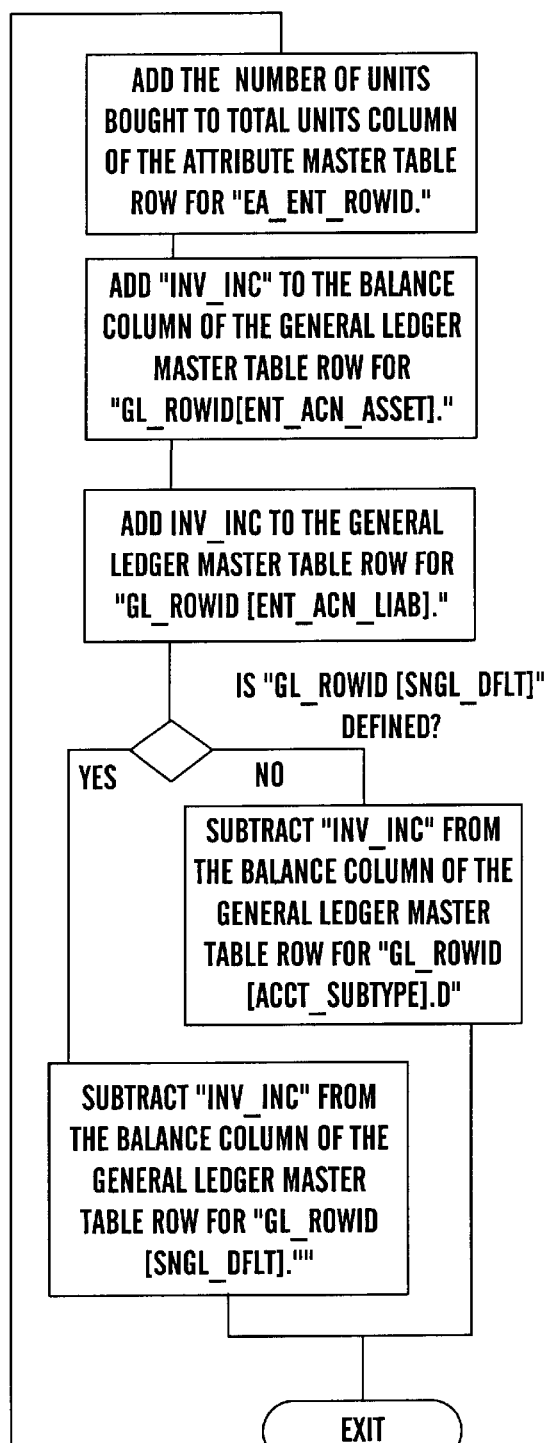
Figure 13:
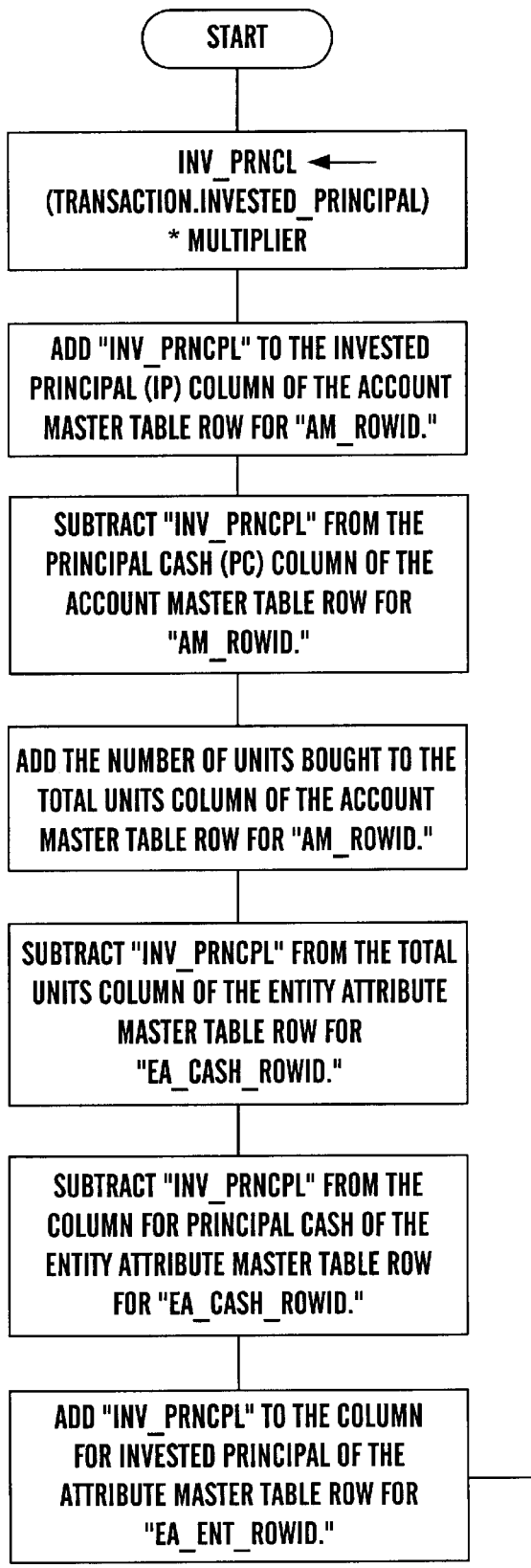
FIG. 13 is an embodiment of a flowchart of the steps performed for processing invested principal transactions by the present invention.
Figure 13:
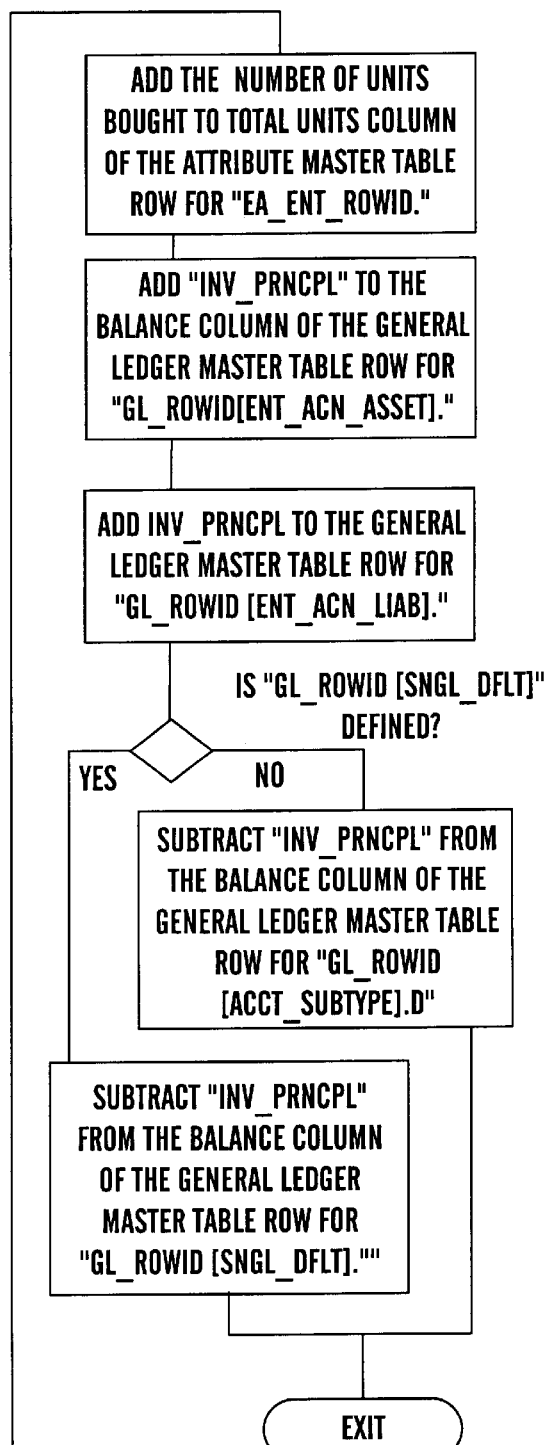
Figure 14:
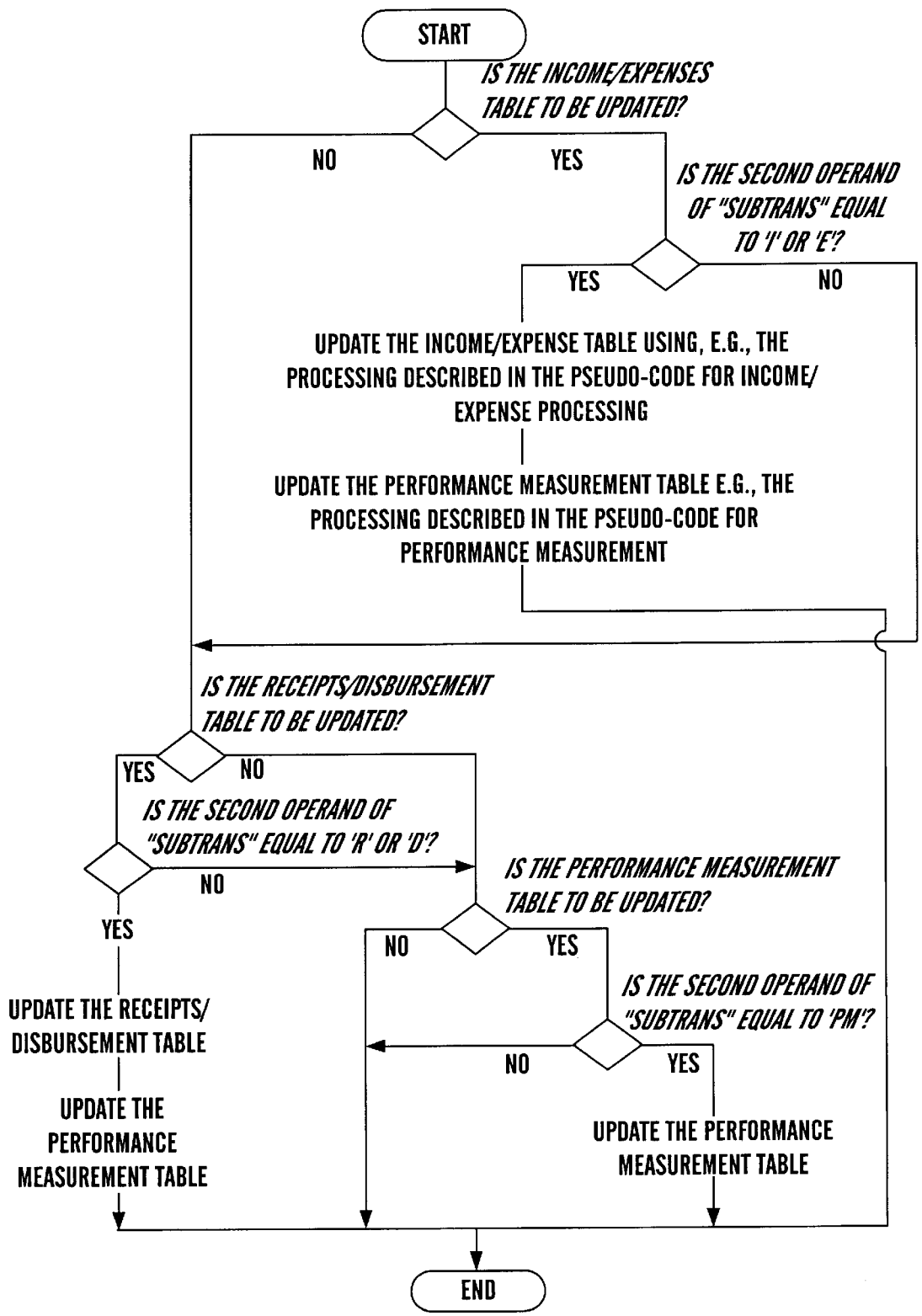
FIG. 14 is an embodiment of a flowchart of the steps for performing custom accounting such as income expenses, and cash flow for a business enterprise.
Figure 15:
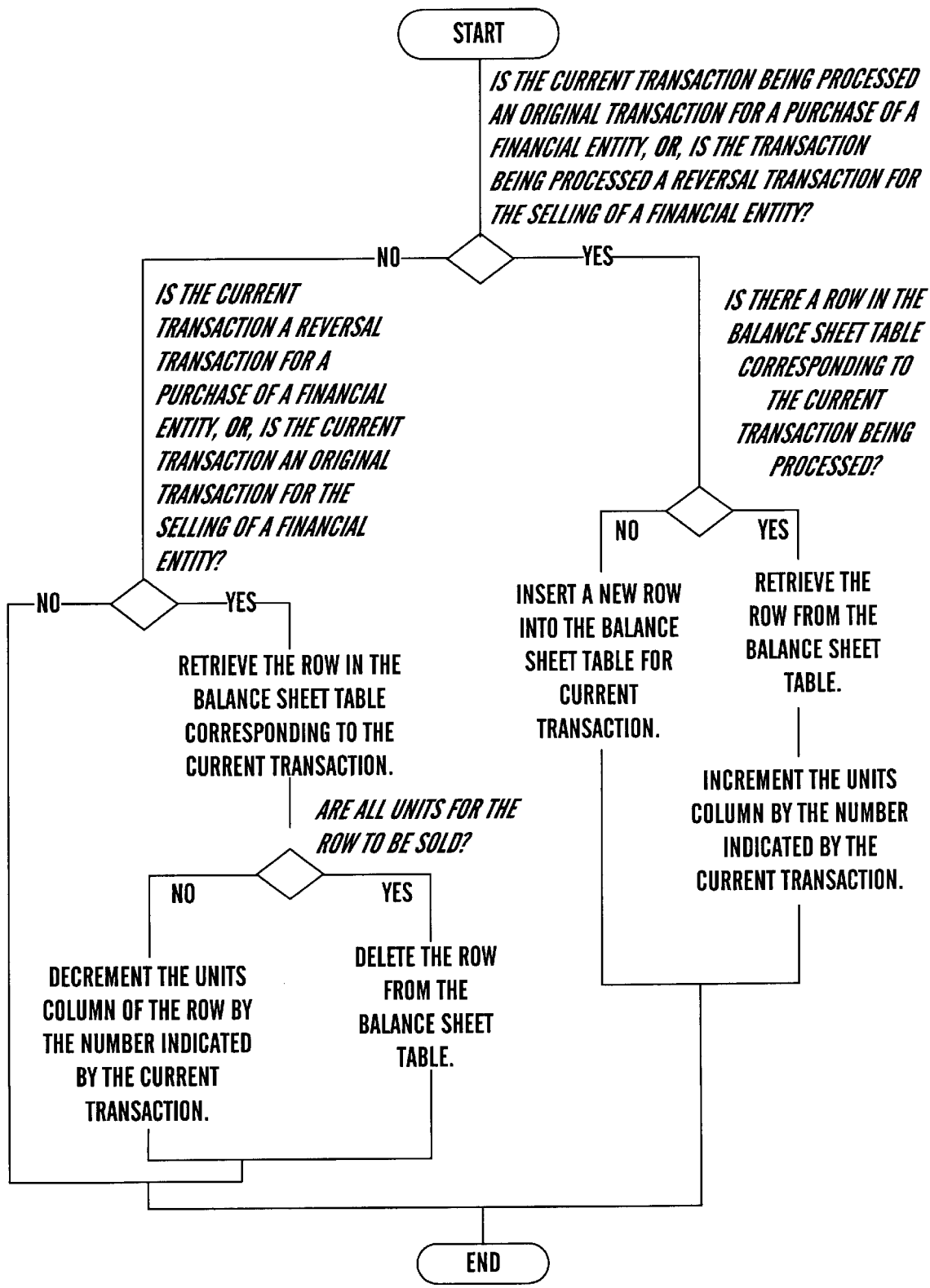
FIG. 15 is an embodiment of a flowchart of the steps for maintaining a business enterprise's balance sheet related to buys and sells of financial entities or instruments.

A first embodiment of the processing for the subtransaction processing module 64 is provided in the flowcharts of FIGS. 9-A through 9-B, FIGS. 10, 11, 12, 13 and 14. Note that for simplicity, error handling and related validity checking steps have been omitted. However, the performance of such steps is within the scope of the present invention, as one skilled in the art will appreciate.

A second pseudo-code embodiment of the transaction processing controller 52 follows.

Pseudo-Code for Processing for the Subtransaction Processing Module 64

```
BEGIN
    DO WHILE List of Subtransactions in the TT Table is Valid
        Select Next Row of Operator, Operand 1, and Operand 2 from TT into Working Storage
        /*      To choose the specific input field (or column) */
        IF      Operand 1 = '1 N'
                Set Value = Net Amount                              from Input String
        ELSIF   Operand 1 = 'I'
                Set Value = Interest                                from Input String
        ELSIF   Operand 1 = 'P'
                Set Value = Principal                               from Input String
        ELSIF   Operand 1 = 'H'
                Set Value = Amount Units                            from Input String
        ELSIF   Operand 1 = 'U'
                Set Value = Amount Units                            from Input String
        ELSIF   Operand 1 = 'C'
                Set Value = Cost Basis                              from Input String
        ELSIF   Operand 1 = 'V'
                Set Value = Amount Units * Curr Price               from Input String
        ELSIF   Operand 1 = 'F'
                Set Value = Federal Taxes                           from Input String
        ELSIF   Operand 1 = 'S'
                Set Value = State Taxes                             from Input String
        ELSIF   Operand 1 = 'L'
                Set Value = Local Taxes                             from Input String
        ELSIF   Operand 1 = 'M'
                Set Value = Management Fees                         from Input String
        ELSE
                Message "Invalid Operand 1", Details
        ENDIF
        /*      To Adjust for Plus or Minus                         */
        IF      Operator = 'P' then
                Set Multiplier = +1
        ELSIF   Operator = 'M' then
                Set Multiplier = -1
        ENDIF
        /*      To Adjust for Originate or Reversal                 */
        IF      OORR = 'O' then
                Set Multiplier = Multiplier * +1
        ELSIF   OORR = 'R'
                Set Multiplier = Multiplier * -1
        ENDIF
        /*      Test for Total Unit Changes                         */
        IF      Operand 2 = 'TU' then
                Add Value to AM - Total Units
                Add Value to EA - Total Units
        /*      Test for Income Cash Changes                        */
        IF      Operand 2 = 'IC' then
        /*      Add to First Controls - Account Master              */
                Add Value to AM - Income Cash
                Add Value to AM - Units
        /*      Add to Second Controls - Entity Attribute           */
                Add Value to EA - Invested Income
                Add Value to EA - Units
        /*      Add to Third Controls - General Ledger              */
        IF      Number of Entries = 1 then
                Add Value to GL - Income Cash
        ELSIF   Number of Entries = 2 then
        IF      Value > 0 then
                IF ICD >= 0 then
                    Add Value                                       to GL - Income Cash Demand
                ELSE ICD <0
                    Add (Value - ICO)                               to GL - Income Cash Demand
                    Set Zero                                        to GL - Income Cash Overdraft
                ENDIF
        ELSIF   Value <= 0 then
                IF ICD <0 then
                    Add Value                                       to GL - Income Cash Overdraft
                ELSE ICD >= 0 then
                    Add (Value - ICD)                               to GL - Income Cash Overdraft
```

-continued

```
                Set Zero                                    to GL - Income Cash Demand
                ENDIF
ELSE
                Message "Invalid Value", Details
ENDIF
                Add Value to Uninvested Income
ELSE
                Message "Invalid Number Entries", Details
ENDIF
/*              Test for Principal Cash Changes             */
ELSIF   Operand 2 = 'PC' then
/*              Add to First Controls - Account Master      */
                Add Value to AM - Principal Cash
                Add Value to AM - Units
/*              Add to Second Controls - Entity Attribute   */
                Add Value to EA - Invested Principal
                Add Value to EA - Units
/*              Add to Third Controls - General Ledger      */
IF      Number of Entries = 1 then
                Add Value to GL - Principal Cash
ELSIF   Number of Entries = 2 then
IF      Value > 0 then
        IF PCD >= 0 then
                Add Value                                   to GL - Principal Cash Demand
        ELSE PCD <0
                Add Value                                   to GL - Principal Cash Demand
                Set Zero                                    to GL - Principal Cash Overdraft
        ENDIF
ELSIF   Value <= 0 then
        IF PCD <0 then
                Add Value                                   to GL - Principal Cash Overdraft
        ELSE PCD >= 0 then
                Add (Value - PCD)                           to GL - Principal Cash Overdraft
                Set Zero                                    to GL - Principal Cash Demand
        ENDIF
ELSE
                Message "Invalid Value", Details
ENDIF
ELSE
                Message "Invalid Number Entries", Details
ENDIF
                Add Value to Uninvested Principal
/*              Test for Invested Income Changes            */
ELSIF   Operand 2 = 'II' then
/*              Add to First Controls Account Master        */
                Add Value to AM - Invested Income
/*              Add to Second Controls - Entity Attribute   */
                Add Value to EA - Invested Income
/*              Add to Third Controls - General Ledger      */
/*              Update Assets                               */
                Add Value to ACN - Assets
/*              Update Liabilities                          */
IF      ACN-Liab = ' ' then
                Add Value to Invested Income
ELSE
                Add Value to ACN_Liabilities
ENDIF
/*              Test for Invested Principal Changes         */
ELSIF   Operand 2 = 'IP' then
/*              Add to First Controls - Account Master      */
                Add Value to AM - Principal Cash
/*              Add to Second Controls - Entity Attribute   */
                Add Value to EA - Invested Principal
/*              Add to Third Controls - General Ledger      */
/*              Update Assets                               */
                Add Value to ACN - Assets
/*              Update Liabilities                          */
IF      ACN_Liab = ' ' then
                Add Value to Invested Pricipal
ELSE
                Add Value to ACN_Liabilities
ENDIF
/*              Test for Other Customized Reporting Changes */
ELSIF   Operand 2 = 'I' and Report Request = 'Y'
OR      Operand 2 = 'E' and Report Request = 'Y' then
                (IEE) Process IE
                (PME) Process PM
ELSIF   Operand 2 = 'R' and Report Request = 'Y'
OR      Operand 2 = 'D' and Report Request = 'Y' then
```

```
                (IEC) Proeess RD
                (PMC) Process PM
        /*      Test for other Performance Measurement Data        */
        ELSIF   Operand 2 = 'PM' and Report Request = 'Y' then
                (PMP) Process PM
        ELSIF   Operand 2 = 'CN'
        OR      Operand 2 = 'DN' then
                (CDC) Process PM
        ELSIF   Operand 2 = 'MF' then
                (PMM) Process PM
        ELSIF   Operand 2 = 'CM' then
                (PCM) Process PM
        ELSIF   Operand 2 = 'FT' then
                (PMF) Process PM
        ELSIF   Operand 2 = 'ST' then
                (PMS) Process PM
        ELSE
                Message "Invalid Operand 2", Details
        ENDIF
        /*      Test for Detail Record Maintenance of Financial Instruments   */
        IF      AORS != ' ' then
                ***********
                CALL PORTFOLIO ADJUSTER 110
                ***********
        ENDIF
    ENDDO
END
```

Pseudo-Code for Performance Measurement (PM)

Processing related to the Licensee

Performance Measurement Table 104

```
BEGIN
    IF      Trxn = 'A' and Type = 'O' OR Trxn = 'S' and
            Type = 'R' (which means ADD)
            SELECT Data into Working Storage from PM Record
            IF Error then
                INSERT INTO PM Record, Details
            IF Error then
                Message "INSERT PM Error", Details
                Goto Write Reject Report
            ENDIF
        ELSE
            Increment Units by amount to be increased
            UPDATE Data to Table / Row
            IF Error
                Message "UPDATE PM Error 1", Details
                Goto Write Report Error
            ENDIF
        ENDIF
    ELSIF Trxn = 'A' and Type = 'R' OR Trxn = 'S' and
    Type = 'O' (which means SUBTRACT)
            SELECT Data into Working Storage from PM Record
            IF Error then
                Message "SELECT PM Error 2", Details
                Goto Write Report Error
            ENDIF
            IF Units = 'ALL"
            and All Other Balances in the Row are Zero then
                DELETE from Table / Row
                IF Error
                    Message "DELETE PM Error", Details
                    Goto Write Report Error
                ENDIF
            ELSE
                Decrement Units by Amount to be reduced
                UPDATE PI SET Details
                IF Error then
                    Message "UPDATE PM Error 2", Details
                    Goto Write Report Writer
                ENDIF
            ENDIF
        ELSE
            Null
        ENDIF
        Goto EOJ
        <<Write Reject Report>>
        INSERT into Reject Table, Details
            IF Error
                STOP
            ENDIF
        <<EOJ>>
        Null
END
```

Pseudo-Code for Income/Expense Processing (IE)

Processing related to the Customer Income Statement

Income/Expense Table 96

```
BEGIN
    IF Trxn = 'Debit' and Type = 'O'    (which means ADD)
    OR Trxn = 'Credit' and Type 'O' then
            SELECT Data into Working Storage from IE Record
            IF Error then
                INSERT INTO IE Table, Details
                IF Error then
                    Message "INSERT IE Error 1", Details
                    Goto Write Report Error
                ENDIF
            ELSE
                Increment Units by amount to be increased
                UPDATE Data to Table/Row
                IF Error then
                    Message "UPDATE IE Error 1", Details
                    Goto Write Report Error
                ENDIF
            ENDIF
    ELSIF Trxn = 'Debit' and Type 'R'   (which means SUBTRACT)
```

-continued

```
    OR   Trxn = 'Credit' and Type = 'R' then
            SELECT Data into Working Storage from IE Record
            IF Error then
                    Message "SELECT IE Error 2", Details
                    Goto Write Report Error
            ENDIF
            IF Units = 'ALL" then
                    DELETE from Table/Row
                    IF Error then
                        Message "DELETE IE Error", Details
                        Goto Write Report Error
                    ENDIF
            ELSE
                    Decrement Units by Amount to be reduced
                    UPDATE IE SET Details
                    IF Error then
                        Message "UPDATE IE Error 2", Details
                        Goto Write Report Writer
                    ENDIF
            ENDIF
    ELSE
            Null
    ENDIF
    Goto EOJ
    <<Write Reject Report>>
    INSERT into Reject Table, Details
            IF Error then
                    STOP
            ENDIF
    <<EOJ>>
        Null
END
```

Pseudo-Code for AORS Processing

Portfolio Adjuster 110 Processing

```
BEGIN
        /* The End AORS Switch is a global switch that signals the end of all AORS processing */
        /* otherwise known as the Detail Record (or Row) Maintenance Processing.             */
        /* The switch is originally set = 0. Each called routine ends by setting the switch = 1.  */
        Set End AORL Switch = 0
        DO WHILE End AORS Switch = 0
            IF Trxn = "ADD" then
                IF Type = 'O' then
                    ************
                            CALL Original Add Module 114      (Originate Add)
                    ************
                            IF Error
                                    Message "No OADD Routine"
                                    Goto Write Reject Report
                            ENDIF
                ELSIF Type = 'R' then
                    ************
                            CALL Reverse Add Module 118       (Reverse Add)
                    ************
                            IF Error
                                    Message "NO RADD Routine"
                                    Goto Write Reject Routine
                            ENDIF
```

```
                ELSE
                        Message "Invalid O OR R Code for ADD", Details
                        Goto Write Reject Report
                ENDIF
        ELSIF Trxn = 'SUBTRACT' then
                IF Type = 'O' then
                        ************
                        CALL Original Sell Module 122      (Originate Subtract)
                        ************
                        IF Error then
                                Message "No OSUB Routine", Details
                                Goto Write Reject Report
                        ENDIF
                ELSIF Type = 'R' then
                        ************
                        CALL Reverse Sell Module 126       (Reverse Subtract)
                        ************
                        IF Error then
                                Message "No RSUB Routine, Details
                                Goto Write Reject Report
                        ENDIF
                ELSE
                        Message "Invalid O OR R for SUBTRACT", Details
                        Goto Write Reject Report
                ENDIF
        ELSE
                Message "Invalid Transaction", Details
                Goto Write Reject Report
        ENDIF
        Goto EOJ
        <<Write Reject Report>>
        INSERT into Reject Table
                IF Error then
                        STOP
                ENDOF
        Set End AORL Switch = 1
        <<EOJ>>
        Null
    ENDDO
END
```

A first embodiment of the processing for the balance sheet table 130 is provided in the flowchart of FIG. BAL-SHT. Note that for simplicity, error handling and related validity checking steps have been omitted. However, the performance of such steps is within the scope of the present invention, as one skilled in the art will appreciate.

A second pseudo-code embodiment of the processing for the balance sheet table 130 follows.
Balance Sheet Processing (BS)

```
BEGIN
    IF    AORL = 'A' and OORR = 'O'    (which means ADD)
    AND   AORL = 'S' and OORR = 'R' then
            SELECT Data into Working Storage from BS Record
            IF Error then
                    INSERT INTO BS Table, Details
                    IF Error then
                            Message "INSERT BS Error', Details
                            Goto Write Reject Table
                    ENDIF
            ELSE
                    Increment Units by amount to be increased
                    UPDATE Data to Table/Row
                    IF Error
                            Message "UPDATE BS Error 1", Details
                            Goto Write Report Error
                    ENDIF
            ENDIF
    ELSIF AORL = 'A' and OORR = 'R'   (which means SUBTRACT)
    OR    AORL = 'S' and OORR = 'O' then
            SELECT Data into Working Storage from BS Record
```

```
            IF Error then
                    Message "SELECT BS Error 2", Details
                    Goto Write Report Error
            ENDIF
            IF Units = 'ALL" then
                    DELETE from Table 1 Row
                    IF Error
                            Message "DELETE BS Error", Details
                            Goto Write Report Error
                    ENDIF
            ELSE
                    Decrement Units by Amount to be reduced
                    UPDATE IE SET Details
                    IF Error then
                            Message "UPDATE BS Error 2", Details
                            Goto Write Report Writer
                    ENDIF
            ENDIF
    ELSE
            Null
    ENDIF
    Goto EOJ
    <<Write Reject Report>>
    INSERT into Reject Table, Details
            IF Error
                    STOP
            ENDIF
    <<EOJ>>
    Null
END
```

Pseudo-Code for Processing the Capital Gains Table 140

```
BEGIN
    IF AORL = 'S' and Type 'O'    (which means ADD)
        SELECT Data into Working Storage from CG Record
        IF Error then
            INSERT INTO CG Table, Details
            IF Error then
                Message "INSERT CG Table", Details
                Goto Write Report Error
            ENDIF
        ELSE
            Increment Units by amount to be increased
            UPDATE Data to Table/Row
            IF Error
                Message "UPDATE CG Error 1", Details
                Goto Write Report Error
            ENDIF
        ENDIF
    ELSIF AORL = 'S' and Type = 'R'   (which means SUBTRACT)
        SELECT Data into Working Storage from CG Record
        IF Error then
            Message "SELECT CG Error 2", Details
            Goto Write Report Error
        ENDIF
        IF Units = 'ALL' then
            DELETE from Table/Row
            IF Error
                Message "DELETE CG Error", Details
                Goto Write Report Error
            ENDIF
        ELSE
            Decrement Units by Amount to be reduced
            UPDATE IE SET Detaiis
            IF Error then
                Message "UPDATE CG Error 2", Details
                Goto Write Report Writer
            ENDIF
        ENDIF
    ELSE
        Null
    ENDIF
    Goto EOJ
    <<Write Reject Report>>
    INSERT into Reject Table, Details
        IF Error
            STOP
        ENDIF
    <<EOJ>>
    Null
END
```

Pseudo-Code for Original Add Module 114 Processing

Note: Do not turn switch OFF or back to 0 as these switches indicate which processes remain.

```
BEGIN
    IF      Process 1 Switch = 0 then
            Set Process 1 Switch = 1
            ********
            CALL BS
            *********
    ELSIF   Process 2 Switch = 0 then
            Set Process 2 Switch = 1
            ********
            CALL PI
            ********
    ELSIF   Process 3 Switch = 0 then
            Set Process 3 Switch = 1
            ********
            CALL PA
            ********
    ELSIF   Process 4 Switch = 0 then
            Set Process 4 Switch = 1
            ********
            CALL TS
            ********
    ELSIF   Process 5 Switch = 0 then
            Set Process 5 Switch = 1
            ********
            CALL PM
            ********
            Set End AORS Switch = 1 Notes End of AORS Processing
    ELSE
            NULL
    ENDIF
    ****************
    CALL Subtransaction Scheduler 62
    ****************
END
```

Pseudo-Code for Reverse of Add Module 118 Processing

Note: Do not turn switch OFF or back to 0 as these switches indicate which processes remain.

```
BEGIN
    IF      Process 6 Switch = 0 then
            Set Process 6 Switch 1
            ********
            CALL BS
            ********
    ELSIF   Process 7 Switch = 0 then
            Set Process 7 Switch = 1
            **********
            CALL PI
            **********
    ELSIF   Process 8 Switch = 0 then
            Set Process 8 Switch = 1
            ********
            CALL PA
            ********
    ELSIF   Process 9 Switch = 0 then
            Set Process 9 Switch = 1
            ********
            CALL TS
            ********
    ELSIF   Process 10 Switch = 0 then
            Set Process 10 Switch = 1
            **********
            CALL PM
            **********
            Set End AORS Switch = 1 Notes End of AORS Processing
    ELSE
            NULL
    ENDIF
    ****************
    CALL Subtransaction Scheduler 62
    ****************
END
```

Pseudo-Code for Original Sell Module 122 Processing

```
BEGIN
    IF Sell-Method = 'LOT' then
        Select LOT Amount into Working Storage from BS
        record
        IF Amount Sold > Lot Amount in Working Storage
        then
```

-continued

```
            Message "Lot Amount > Amount Available"
            Goto Write Reject Report
       ENDIF
       IF     Process 11 Switch = 0 then
              Set Process 11 Switch = 0
              **************
              CALL BS
              **************
       ELSIF  Process 12 Switch = 0 then
              Set Process 12 Switch = 0
              *********
              CALL PI
              *********
       ELSIF  Process 13 Switch = 0 then
              Set Process 13 Switch = 0
              *********
              CALL PA
              *********
       ELSIF  Process 14 Switch = 0 then
              Set Process 14 Switch = 0
              *********
              CALL CG
              *********
       ELSIF  Process 15 Switch = 0 then
              Set Process 15 Switch = 1
              *********
              CALL TS
              *********
       ELSIF  Process 16 Switch = then
              Set Process 16 Switch = 0
              *********
              CALL PM
              *********
       ELSIF  Process 17 Switch = 0 then
              Set Process 17 Switch = 0
              *********
              CALL TL
              *********
              Set End AORS Switch = 1      Notes End of AORS
                                           Processing
       ELSE
              NULL
       ENDIF
       ****************
       CALL SUBTRACTION SCHEDULER 62
       ****************
ELSE
       Select all LOTS into Temporary Working Storage
       Table
       Licn/Acct/Asset/Purch/Amt/Cost/Unit-Cost/ROWID)
       Set Total Amount Sold = Data Entry Amount Sold
       IF Total Amount Sold > Total Amount Available then
              Message "Total Amount Sold > Total Amount Available",
              Details
              Goto Write Reject Report
       ENDIF
       Avg-Factor = 1
       IF Sell-Method = "AVG" then
              Avg-Factor = (Total Amount Sold / Total Amount
              Available)
       ENDIF
<<Sell Multiple Lot Routine>>
DO While Total Amount Sold = 0
       IF Total Amount Sold > 0 then
              IF Sell-Method = 'FIF' or ' ' then
                  Select LOT Amount Available into WS Lot
                  Amount
                      Where Purch = MIN (Purch)
              ENDIF
       ELSIF
              IF Sell-Method = 'LIF"
                  Select LOT Amount Available into WS Lot
                  Amount
                      Where Purch = MAX(Purch)
              ENDIF
       ELSIF
              IF Sell-Method = 'LCF'
                  Select LOT Amount Available into WS Lot
                  Amount
                      Where Unit-Cost = MIN(Unit-Cost)
              ENDIF
       ELSIF
              IF Sell-Method = 'HCF"
                  Select LOT Amount Available into WS Lot
                  Amount
                      Where Unit-Cost = MAX(Unit-Cost)
              ENDIF
       ELSE
              <<for Sell-Method = 'AVG' or 'ALL'>>
              IF Amount Sold * Avg Factor < WS Lot Amount then
                  UPDATE Temporary Table Lot Amount for
                  Amount Sold
              ELSE
                  DELETE Total Row Temporary Table
              ENDIF
              *********
       IF     Process 11 Switch = 0 then
              Set Process 11 Switch = 0
              **************
              CALL BS
              **************
       ELSIF  Process 12 Switch = 0 then
              Set Process 12 Switch = 0
              *********
              CALL PI
              *********
       ELSIF  Process 13 Switch = 0 then
              Set Process 13 Switch = 0
              *********
              CALL PA
              *********
       ELSIF  Process 14 Switch = 0 then
              Set Process 14 Switch = 0
              *********
              CALL CG
              *********
       ELSIF  Process 15 Switch = 0 then
              Set Process 15 Switch = 1
              *********
              CALL TS
              *********
       ELSIF  Process 16 Switch = 0 then
              Set Process 16 Switch = 0
              *********
              CALL PM
              *********
       ELSIF  Process 17 Switch = 0 then
              Set Process 17 Switch = 0
              *********
              CALL TL
              *********
              Set End AORS Switch = 1      Notes End of AORS
                                           Processing
       ELSE
              NULL
       ENDIF
       Decrement Total Amount Sold by Cap Gain Lot Amount
       Increment the e LOT Number
       ****************
       CALL SUBTRANSACTION SCHEDULE 62
       ****************
   ENDIF
ENDDO
ENDIF
<<EOJ>>
   NULL
END
```

Originate Sell Routine

```
BEGIN
       IF Sell-Method = 'LOT' then
              Select LOT Amount into Working Storage from BS
```

-continued

```
            record
            IF Amount Sold > Lot Amount in Working Storage
            then
                Message "Lot Amount > Amount Available"
                Goto Write Reject Report
            ELSE
                **************
                CALL BS Routine
                **************
            ENDIF
            **********
            CALL PIPA
            **********
            **********
            CALL CG
            **********
            **********
            CALL TS
            **********
            **********
            CALL PM
            **********
            **********
            CALL CG
            **********
            **********
            CALL TL
            **********
        ELSE
            Select All LOTS into Temporary Working Storage
            Table
            Licn/Acct/Asset/Purch/Amt/Cost/Unit-Cost/ROWID)
            Set Total Amount Sold = Data Entry Amount Sold
            IF Total Amount Sold > Total Amount Available then
                Message "Total Amount Sold > Total Amount
                Available", Details
                Goto Write Reject Report
            ENDIF
            Avg-Factor = 1
            IF Sell-Method = 'AVG' then
                Avg-Factor = (Total Amount Sold / Total Amount
                Available)
            ENDIF
            DO While Total Amount Sold = 0
                IF Total Amount Sold > 0 then
                IF Sell-Method = 'FIF' or ' ' then
                    Select LOT Amount Available into WS Lot
                    Amount
                        Where Purch = MIN (Purch)
                ENDIF
            ELSIF
                IF Sell-Method = 'LIF"
                    Select LOT Amount Available into WS Lot
                    Amount
                        Where Purch = MAX(Purch)
                ENDIF
            ELSIF
                IF Sell-Method = 'LCF'
                    Select LOT Amount Available into WS Lot
                    Amount
                        Where Unit-Cost = MIN(Unit-Cost)
                ENDIF
            ELSIF
                IF Sell-Method = 'HCF"
                    Select LOT Amount Available into WS Lot
                    Amount
                        Where Unit-Cost = MAX(Unit-Cost)
                ENDIF
            ELSE
                <<for Sell-Method = 'AVG' or 'ALL'>>
                IF Amount Sold * Avg Factor < WS Lot Amount then
                    UPDATE Temporary Table Lot Amount
                    for Amount Sold
                ELSE
                    DELETE Total Row Temporary Table
                ENDIF
                **********
                CALL BS with the amount of LOT sold
                **********
```

-continued

```
                ENDIF
                **********
                CALL PIPA
                **********
                **********
                CALL TS
                **********
                **********
                CALL PM
                **********
                **********
                CALL CG with the amount of LOT sold
                **********
                **********
                CALL TL
                **********
                Decrement Total Amount Sold by Cap Gain Lot
                Amount
                    Increment the LOT Number
            ENDIF
        ENDDO
    ENDIF
    Goto EOJ
    <<Write Reject Report>>
    INSERT into Reject Table
        IF Error then
            STOP
        ENDIF
    <EOJ>>
END
```

Pseudo-Code for Reverse of Original Sell Module 126 Processing

```
BEGIN
    IF          Process 18 Switch = 0 then
                Set Process 18 Switch = 1
                ********
                CALL BS with the amount of LOT sold
                ********
    ELSIF       Process 19 Switch = then
                Set Processor 19 Switch = 1
                ********
    CALL PI
                ********
    ELSIF       Process 20 Switch = 0 then
                Set Process 20 Switch = 1
                ********
                CALL PA
                ********
    ELSIF       Process 21 Switch = 0 then
                Set Process 21 Switch = 1
                ********
                CALL TS
                ********
    ELSIF       Process 22 Switch = 0 then
                Set Process 22 Switch = 1
                ********
                CALL PM
                ********
    ELSIF       Process 23 Switch = 0 then
                Set Process 23 Switch = 1
                ********
                CALL CG with the amount of LOT sold
                ********
    ELSIF       Process 24 Switch = 0 then
                Set Process 24 Switch = 1
                ********
                CALL TL
                ********
                Set End AORL Switch = 1     Notes End of AORS
Processing
    ELSE
                NULL
```

```
ENDIF
****************
CALL Subtransaction Scheduler 62
****************
END
```

Pseudo-Code for Processing Model #4

For All INSERTS, UPDATES, and DELETES to all Tables

```
BEGIN
    IF Trxn is 'ADD' then
        SELECT Data in Working Storage
        IF Error then
            INSERT INTO Table, Details
            IF Error then
                Message "INSERT Error", Details
                Goto Write Reject Report
            ENDIF
        ELSE
            Increment the Details
            UPDATE Set Table, Details
            IF Error then
                Message "UPDATE Error ADD", Details
                Goto Write Reject Report
            ENDIF
        ENDIF
    ELSIF Trxn is 'SUBTRACT' then
        SELECT Data into Working Storage
        IF Error then
            Message "SELECT Error Subtract", Details
            Goto Write Reject Report
        ENDIF
        If One or More Amounts > One or More Values from Existing Record then
            ADD to Reject Report
            IF Error then
                Message "INSERT Reject SUBTRACT", Details
                Goto Write Reject Report
            ENDIF
        IF Details = 'ALL" then
            DELETE From Table, Details
            IF Error then
                Message "DELETE Error", Details
                Goto Write Reject Report
            ENDIF
        ELSE
            Decrement the Details
            UPDATE SET, Details
            IF Error then
                Message "UPDATE Error SUBTRACT", Details
                Goto Write Reject Report
            ENDIF
        ENDIF
    ENDIF
    Goto EOJ
    <<Write Reject Report>>
    INSERT INTO Reject Table, Details
    IF Error then
        Message "INSERT Reject Table Error", Details
        STOP
    ENDIF
    <<EOJ>>
    NULL
END
```

Pseudo-Code for Processing the Trade Settlement Table 142

```
BEGIN
    IF Trxn = 'A' and Type = 'O' OR Trxn = 'S' and
    Type = 'O' (which means ADD)
        INSERT into TS table, Details
        IF Error then
            Message "INSERT TS Error 1", Details
            Goto Write Report Error
        END
    ELSIF Trxn = 'A' and Type = 'R' OR Trxn = 'S' and
    Type = 'R' (which means SUBTRACT)
        SELECT Data into Working Storage from TS Record
        IF Error then
            Message "SELECT TS Error 2", Details
            Goto Write Report Error
        ENDIF
        DELETE from Table/Row
        IF Error
            Message "DELETE TS Error", Details
            Goto Write Report Error
        ENDIF
    ELSE
        Null
    ENDIF
    Goto EOJ
    <<Write Reject Report>>
    INSERT into Reject Table, Details
        IF Error
            STOP
        ENDIF
    <<EOJ>>
    Null
END
```

Pseudo-Code for Processing the Customer Cash Flow

Receipts/Disbursements Table 100

```
BEGLN
    IF Trxn = 'Receipt' and Type = 'O' (which means ADD)
    OR Trxn = 'Disbursement' and Type = 'O' then
        SELECT Data into Working Storage from RD Record
        IF Error then
            INSERT INTO RD Table, Details
            IF Error then
                Message "INSERT RD Error", Details
                Goto Write Report Error
            ENDIF
        ELSE
            Increment Units by amount to be increased
            UPDATE Data to Table/Row
            IF Error then
                Message "UPDATE RD Error 1", Details
                Goto Write Report Error
            ENDIF
        ENDIF
    ELSIF Trxn = 'Receipt' and Type = 'R' (which means SUBTRACT)
    OR Trxn = 'Disbursement' and Type = 'R'
        SELECT Data into Working Storage from RD Record
        IF Error then
            Message "SELECT RD Error 2", Details
            Goto Write Report Error
        ENDIF
        IF Units = 'ALL" then
            DELETE from Table/Row
            IF Error
                Message "DELETE RD Error", Details
                Goto Write Report Error
            ENDIF
        ELSE
            Decrement Units by Amount to be reduced
```

-continued

```
        UPDATE IE SET Details
        IF Error then
            Message "UPDATE RD Error 2", Details
            Goto Write Report Writer
        ENDIF
    ENDIF
ELSE
    Null
ENDIF
Goto EOJ
<<Write Reject Report>>
INSERT into Reject Table, Details
    IF Error then
        STOP
    ENDIF
<<EOJ>>
    Null
END
```

Pseudo-Code for Processing the Pending Adjustment Table 138

```
BEGIN
    IF      Trxn = 'A' and Type = 'O' OR Trxn = 'S' and
            Type = 'R' (which means ADD)
    AND     Trade Date < Income Ex-Date then
            SELECT Data into Working Storage from PA Record
            IF Error then
                INSERT INTO PA Table, Details
                IF Error then
                    Message "INSERT PA Error", Details
                    Goto Write Report Error
                ENDIF
            ELSE
                Increment Units by amount to be increased
                UPDATE Data to Table / Row
                IF Error
                    Message "UPDATE PA Error 1", Details
                    Goto Write Report Error
                ENDIF
            ENDIF
    ELSIF   Trxn = 'A' and Type = 'R' OR Trxn = 'S' and
            Type = 'O' (which means SUBTRACT)
    AND     Trade Date > Income Ex-date + 1 then
            SELECT Data into Working Storage from PA Record
            IF Error then
                Message "SELECT PA Error 2", Details
                Goto Write Report Error
            ENDIF
            IF Units = 'ALL' then
                DELETE from Table / Row
                IF Error
                    Message "DELETE PA Error", Details
                    Goto Write Report Error
                ENDIF
            ELSE
                Decrement Units by Amount to be reduced
                UPDATE PA SET Details
                IF Error then
                    Message "UPDATE PA Error 2", Details
                    Goto Write Report Writer
                ENDIF
            ENDIF
    ELSE
            Null
```

```
    ENDIF
    Goto PA-EOJ
    <<Write Reject Report>>
    INSERT into Reject Table, Details
        IF Error
            STOP
        ENDIF
    <<PA-EOJ>>
        Null
END
```

Pseudo-Cod for Processing the Pending Income Table 134

```
BEGIN
    IF      Trxn = 'A' and Type = 'O' OR Trxn = 'S' and
            Type = 'R' (which means ADD)
    AND     Trade Date < Income Ex-Date then
            SELECT Data into Working Storage from PI Record
            IF Error then
                INSERT INTO PI Table, Details
                IF Error then
                    Message "INSERT PI Error", Details
                    Goto Write Reject Report
                ENDIF
            ELSE
                Increment Units by amount to be increased
                UPDATE Data to Table / Row
                IF Error
                    Message "UPDATE PI Error I", Details
                    Goto Write Report Error
                ENDIF
            ENDIF
    ELSIF   Trxn = 'A' and Type = 'R' OR Trxn = 'S' and
            Type = 'O' (which means SUBTRACT)
    AND     Trade Date > Income Ex-date + 1 then
            SELECT Data into Working Storage from PI Record
            IF Error then
                Message "SELECT PI Error 2", Details
                Goto Write Report Error
            ENDIF
            IF Units = 'ALL' then
                DELETE from Table / Row
                IF Error
                    Message "DELETE PI Error", Details
                    Goto Write Report Error
                ENDIF
            ELSE
                Decrement Units by Amount to be reduced
                UPDATE PI SET Details
                IF Error then
                    Message "UPDATE PI Error 2", Details
                    Goto Write Report Writer
                ENDIF
            ENDIF
    ELSE
            Null
    ENDIF
    Goto PI-EOJ
    <<Write Reject Report>>
    INSERT into Reject Table, Details
        IF Error
            STOP
        ENDIF
    <<PI-EOJ>>
        Null
END
```

N_gine File (or Table) Structure and Likely Order of Creation

Figure 4A:
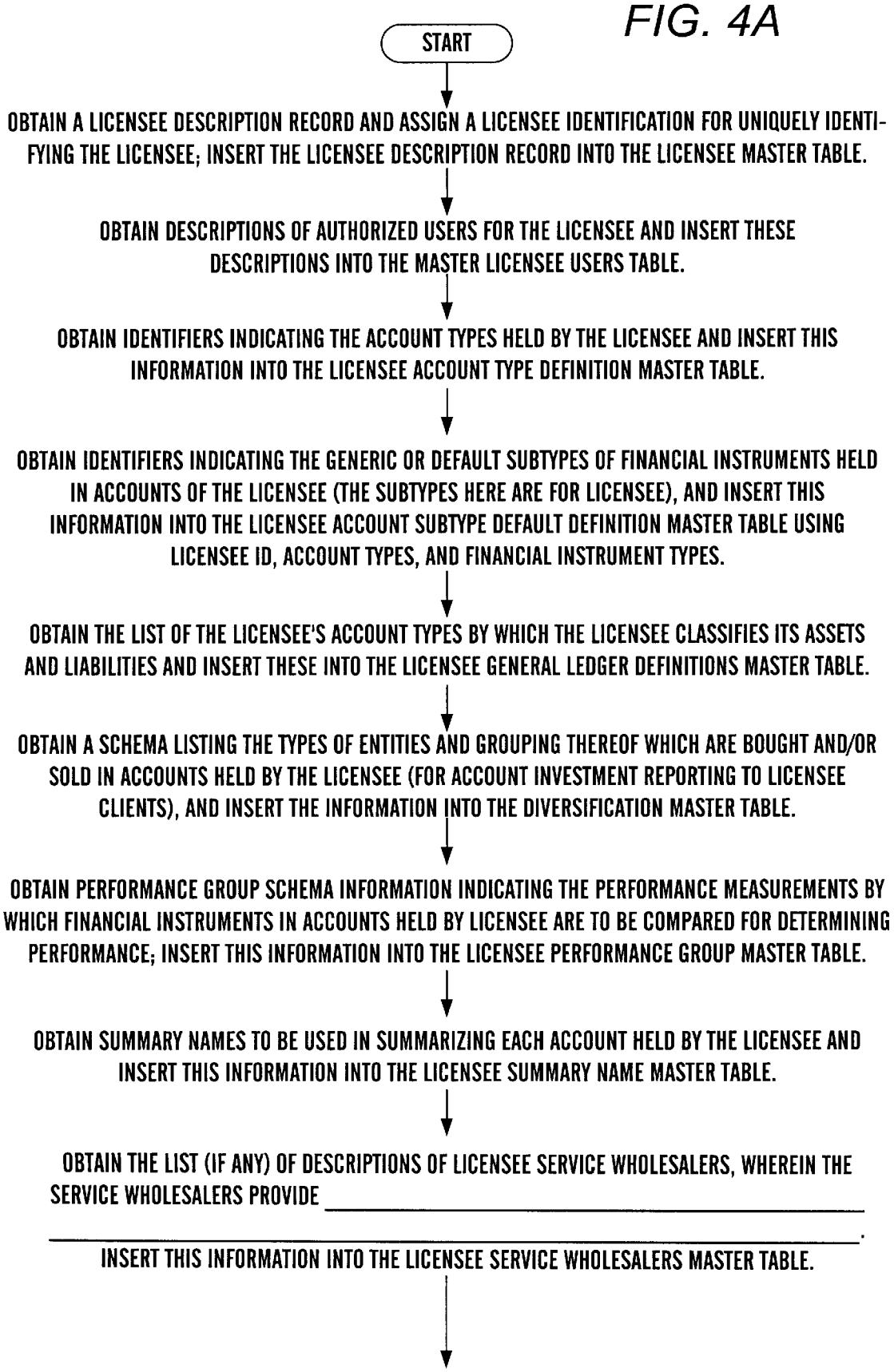
FIGS. 4-A through 4-D illustrate the steps of a flowchart for initializing the database tables of the present invention for a new business enterprise licensee that is to have its financial transactions subsequently processed by the present invention.

Corresponding with FIGS. 4-A Through 4-E

|  |  | Data Source |
|---|---|---|
| Institutional Profile | | |
| LM | Licensee Master | User-Definable |
| LU | Licensee Users | User-Definable |
| LT | Licensee Account Type | User-Definable |
| LD | Licensee Default Definitions | User-Definable |
| LL | Licensee General Ledger Definitions | User-Definable |
| LS | Licensee Diversification Scheme | User-Definable |
| LP | Licensee Performance Group | User-Definable |
| LN | Licensee Summary Names | User-Definable |
| LW | Licensee Service Wholesalers | User-Definable |
| LR | Licensee Service Resellers | User-Definable |
| Customer Profile | | |
| AO | Account Objective | User-Definable |
| AL | Account Legal Capacity | User-Definable |
| AJ | Account Jurisdiction | User-Definable |
| AR | Account Representatives | User-Definable |
| AN | Account Registration Names | User-Definable |
| AM* | Account Master | User-Definable |
| AC | Account Communication Links | User-Definable |
| Transaction Profile | | |
| TM** | Transaction Master | User-Definable "Driving" File |
| TP** | Transaction Processor | User-Definable "Driving" File |
| TR | Transactions - Recurring | User-Definabie "Driving" File |
| Entity Profile | | |
| EM | Entity Master | Public Market Data |
| EA* | Entity Attribute | User-Definable |
| ET | Entity Transaction | User-Definable |
| Licensee Status | | |
| SG* | System General Ledger | User-Definable |
| SJ* | System Transaction Journal | System Defined "Driven" File |
| ST | System Trade Settlement | System Defined "Driven" File |
| SS | System Summary Table | System Defined |
| SR | System Reject Table | System Defined |
| SC | System Transaction Count | System Defined |
| Customer Status | | |
| CS | Customer Income Statement (Income / Expense) | System Defined "Driven" File |
| CF | Customer Cash Flow (Receipts / Disbursements) | System Defined "Driven" File |
| CB* | Customer Balance Sheet | System Defined "Driven" File |
| CG | Customer Capital Gain | System Defined "Driven" File |
| CI | Customer Pending Income | System Defined "Driven" File |
| CA | Customer Pending Capital Adjustments | System Defined "Driven" File |
| CP* | Customer Performance Measurement | System Defined "Driven" File |

Notes:
*denotes Primary Control Tables
**denotes "Driving Tables"

TABLE DATA DESCRIPTIONS WITH EXAMPLES (LM) Licensee Master

Primary Data consisting of
Licensee Identifier

-continued

```
                    Licensee Description
        Trade Settlement Data consisting of
                    Licensee Trade Settlement Switch
                    Trade Offset Buy Identifier
                    Trade Offset Sell Identifier
                    Settle Offset Buy Identifier
                    Settle Offset Sell Identifier
                    +
        Other Details
                    +
        Audit Fields consisting of Processing Model 1
                    Add Date
                    Add Sequence Number
                    Add User Identifier
                    Change Date
                    Change Sequence Number
                    Change User Identifier
                    Delete Date
                    Delete Sequence Number
                    Delete User Identifier
                    Number of Modifications
                    Archive Status
                    Archive Date
Example:
```

| Licensee Identifier | Licensee Description | Other Licensee Address | Licensee City/State/ZIP |
|---|---|---|---|
| LICN1 | First Licensee Name | Main Street | Denver, CO |
| LICN2 | Second Licensee Name | Broadway | New York, NY |
| LICN3 | Third Licensee Name | Michigan Ave. | Chicago, IL |

(LU) Licensee Users

```
        Primary Data consisting of
                    Licensee Identifier
                    User Identifier
                    User Description
                    +
        Other Details
                    +
        Audit Fields consisting of Processing Model 1
                    Add Date
                    Add Sequence Number
                    Add User Identifier
                    Change Date
                    Change Sequence Number
                    Change User Identifier
                    Delete Date
                    Delete Sequence Number
                    Delete User Identifier
                    Number of Modifications
                    Archive Status
                    Archive Date
Example:
```

| Licensee Identifier | User Identifier | User Description | Other User Address | User City/State/ZIP |
|---|---|---|---|---|
| LICN1 | FUN | First User Name | Lincoln Ave | Denver, CO |
| LICN2 | SUN | Second User Name | Park Ave | New York, NY |
| LICN3 | TUN | Third User Name | Montgomery | San Francisco, CA |

(LT) Licensee Account Type

```
        Primary Data consisting of
                    Licensee Identifier
                    Account Type Identifier
                    Account Type Description
                    +
        Other Details
                    +
        Audit Fields consisting of Processing Model 1
                    Add Date
                    Add Sequence Number
                    Add User Identifier
                    Change Date
                    Change Sequence Number
                    Change User Identifier
```

-continued

```
                Delete Date
                Delete Sequence Number
                Delete User Identifier
                Number of Modifications
                Archive Status
                Archive Date
Example:
```

| Licensee Identifier | Account Type Number | Account Type Name |
|---|---|---|
| LICN1 | 100 | Pension Trust |
| LICN1 | 200 | Investment Advisory |
| LICN1 | 300 | Estates |
| LICN1 | 400 | Settlements - Buy |
| LICN1 | 500 | Settlements - Sell |
| LICN2 | 1000 | Wireless Communications |
| LICN2 | 2000 | Landline Communications |
| LICN2 | 3000 | Satellite Broadcast |
| LICN3 | 9000 | Domestic Subsidiary |
| LICN3 | 10000 | Foreign Subsidiary |

(LD) Licensee Default Definitions

```
    Primary Data consisting of
                Licensee Identifier
                Default Class
                Demand or Overdraft
                Accounting Control Number
                Accounting Control Number Description
                Cash Record Pointer in EA Table
                +
    Other Details
                +
    Audit Fields consisting of Processing Model 1
                Add Date
                Add Sequence Number
                Add User Identifier
                Change Date
                Change Sequence Number
                Change User Identifier
                Delete Date
                Delete Sequence Number
                Delete User Identifier
                Number of Modifications
                Archive Status
                Archive Date
Example:
```

| Licensee Identifier | Class Iden | Sub-Class Iden | Accounting Control Number | Accounting Control Name |
|---|---|---|---|---|
| LICN1 | IC | D | A01 | Income Cash Demand |
| LICN1 | IC | O | A02 | Income Cash Overdraft |
| LICN1 | IC | D | A03 | Principal Cash Demand |
| LICN1 | IC | O | A04 | Principal Cash Overdraft |
| LICN1 | UI |  | L05 | Uninvested Income |
| LICN1 | UP |  | L10 | Uninvested Principal |
| LICN1 | II |  | L15 | Invested Income |
| LICN1 | IP |  | L20 | Invested Principal |

(LL) Licensee General Ledger Definition

```
    Primary Data consisting of
                Licensee Identifier
                Asset or Liability
                Account Type Identifier
                Account Type Description
                +
    Other Details
                +
    Audit Fields consisting of Processing Model 1
                Add Date
                Add Sequence Number
                Add User Identifier
                Change Date
                Change Sequence Number
                Change User Identifier
                Delete Date
```

-continued

|  |  |
|---|---|
|  | Delete Sequence Number |
|  | Delete User Identifier |
|  | Number of Modifications |
|  | Archive Status |
|  | Archive Date |
| (See Details Provided) | |

| (LS) | Licensee Diversification Scheme |
|---|---|

Primary Data consisting of
    Licensee Identifier
    Diversification Type Identifier
    Diversification Group Identifier
    Diversification Class Identifier
    Diversification Description
    +
Other Details
    +
Audit Fields consisting of Processing Model 1
    Add Date
    Add Sequence Number
    Add User Identifier
    Change Date
    Change Sequence Number
    Change User Identifier
    Delete Date
    Delete Sequence Number
    Delete User Identifier
    Number of Modifications
    Archive Status
    Archive Date Example:

| Licensee Identifier | Diversification Type | Diversification Group | Diversification Class | Diversification Name |
|---|---|---|---|---|
| LICN1 | 100 | 000 | 000 | Money Market Instruments |
| LICN1 | 100 | 100 | 000 | US Govt Bills |
| LICN1 | 100 | 200 | 000 | US Govt Notes |
| LICN1 | 100 | 300 | 000 | Par Notes |
| LICN1 | 100 | 400 | 000 | Discount Notes |
| LICN1 | 200 | 000 | 000 | Fixed Income Securities |
| LICN1 | 200 | 100 | 000 | US Govt Bonds |
| LICN1 | 200 | 200 | 000 | Municipal Bonds |
| LICN1 | 200 | 300 | 000 | Corporate Bonds |
| LICN1 | 200 | 400 | 000 | Bond Funds |
| LICN1 | 300 | 000 | 000 | Equities |
| LICN1 | 300 | 100 | 000 | Preferred Stock |
| LICN1 | 300 | 200 | 000 | Convertible Preferred |
| LICN1 | 300 | 300 | 000 | Common Stock |
| LICN1 | 300 | 300 | 100 |    Automotive |
| LICN1 | 300 | 300 | 200 |    Building |
| LICN1 | 300 | 300 | 300 |    Chemical |
| LICN1 | 300 | 300 | 400 |    Drug |
| LICN1 | 300 | 400 | 000 | Oil Partnerships |
| LICN1 | 300 | 500 | 000 | Real Estate Partnerships |
| LICN2 | 100 | 000 | 000 | Communication Services |
| LICN2 | 100 | 100 | 000 | Wireless Communication |
| LICN2 | 100 | 200 | 000 | Landline Communication |
| LICN2 | 100 | 300 | 000 | Direct Satellite |
| LICN3 | 100 | 100 | 000 | Cash |
| LICN3 | 100 | 200 | 000 | Other Current Assets |
| LICN3 | 100 | 300 | 000 | Fixed Assets |
| LICN3 | 100 | 400 | 000 |    Depreciation |
| LICN3 | 100 | 500 | 000 | Other Tangible Assets |
| LICN3 | 100 | 600 | 000 | Other Intangible Assets |
| LICN3 | 100 | 700 | 000 | Current Liabilities |
| LICN3 | 100 | 800 | 000 | Deferred Taxes |
| LICN3 | 100 | 900 | 000 | Long-Term Debt |
| LICN3 | 100 | 1000 | 000 | Net Worth |

| (LP) | Licensee Performance Group |
|---|---|

Primary Data consisting of
    Licensee Identifier
    Performance Type Identifier
    Performance Group Identifier
    Performance Class Identifier
    Performance Description -continued

```
            +
    Other Details
            +
    Audit Fields consisting of Processing Model 1
                Add Date
                Add Sequence Number
                Add User Identifier
                Change Date
                Change Sequence Number
                Change User Identifier
                Delete Date
                Delete Sequence Number
                Delete User Identifier
                Number of Modifications
                Archive Status
                Archive Date
Example:
```

| Licensee Identifier | Perf Meas Type | Perf Meas Group | Perf Meas Class | Perf Meas Name |
|---|---|---|---|---|
| LICN1 | 100 | 000 | 000 | Money Market |
| LICNI | 100 | 100 | 000 | US Notes |
| LICN1 | 100 | 100 | 9710 | Maturing 10/97 |
| LICN1 | 100 | 100 | 9711 | Maturing 11/97 |
| LICN1 | 100 | 200 | 000 | Par Notes |
| LICN1 | 100 | 200 | 9711 | Maturing 11/97 |
| LICN1 | 100 | 200 | 9712 | Maturing 12/97 |
| LICN1 | 200 | 000 | 000 | Municipal Bonds |
| LICN1 | 200 | AAA | 000 | Rated AAA |
| LICN1 | 200 | AAA | 9803 | Maturing 03/98 |
| LICN1 | 200 | AAA | 9806 | Maturing 06/98 |
| LICN1 | 300 | 000 | 000 | Common Stock |
| LICN1 | 300 | 100 | 000 | Durables |
| LICN1 | 300 | 100 | 100 | Autos |
| LICN1 | 300 | 100 | 200 | Appl |
| LICN1 | 300 | 200 | 000 | Consumer Goods |
| LICN1 | 300 | 200 | 100 | Food |
| LICN1 | 300 | 200 | 200 | Beverage |

(LN) Licensee Summary Names

```
    Primary Data consisting of
                Licensee Identifier
                Summary Type Identifier
                Summary Number
                Summary Description
            +
    Other Details
            +
    Audit Fields consisting of Processing Model 1
                Add Date
                Add Sequence Number
                Add User Identifier
                Change Date
                Change Sequence Number
                Change User Identifier
                Delete Date
                Delete Sequence Number
                Delete User Identifier
                Number of Modifications
                Archive Status
                Archive Date
Example:
```

| Licensee Identifier | Type Code | Group Code | Class Code | Summary Item Name |
|---|---|---|---|---|
| LICN1 | I | 0001 | | Dividends - Ordinary |
| LICN1 | I | 0002 | | Dividends - Partially Tax-Exempt |
| LICN1 | I | 0003 | | Dividends - Tax-Free |
| LICN1 | E | 0001 | | Management Fees |
| LICN1 | E | 0004 | | Legal Expenses |
| LICN1 | R | 0001 | I | Dividends |
| LICN1 | R | 0002 | I | Interest-Net |
| LICN1 | R | 0007 | P | Principal Contributions |
| LICN1 | R | 0008 | P | Principal Sale Proceeds |

-continued

| LICN1 | D | 0001 | I | Management Fees |
| LICN1 | D | 0009 | P | Principal Disbursements |

(LW) Licensee Service Wholesalers

Primary Data consisting of
        Licensee Identifier
        Wholesaler Identifier
        Wholesaler Address
        Number of Calls
        Value of Call
        +
    Other Details
        +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date Example:

| Licensee Identifier | Wholesaler Identifier | Wholesaler Name | Wholesaler Address | City/State/ZIP Codes |
|---|---|---|---|---|
| LICN1 | ABCD | AB Cellular Dealer | 100 Main Street | Denver, CO |
| LICN1 | RSTU | RS Telephone Utility | 200 Broadway | NY, NY |

(LR) Licensee Resellers

Licensee Identifier
        Wholesaler Identifier
        Reseller Identifier
        Reseller Address
        +
    Other Details
        +
    Audit Fields consisting of processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date Example:

| Licensee Identifier | Wholesaler Identifier | Reseller Identifier | Reseller Name | Reseller Address | City/State/ZIP Codes |
|---|---|---|---|---|---|
| LICN1 | ABCD | 123 | 123 Reseller | 200 Oak | Tulsa, OK |
| LICN1 | ABCD | 234 | 234 Reseller | 500 Elm | Okla City, OK |
| LICN1 | RSTU | 678 | 678 Reseller | 300 Pine | Fresno, CA |
| LICN1 | STUV | 789 | 789 Reseller | 700 Cedar | Pittsburgh, PA |

(AO) Account Objective

Primary Data consisting of
        Licensee Identifier
        Objective Identifier
        Objective Description
        +
    Other Details
        +
    Audit Fields consisting of Processing Model 1
        Add Date
        Add Sequence Number -continued

```
                    Add User Identifier
                    Change Date
                    Change Sequence Number
                    Change User Identifier
                    Delete Date
                    Delete Sequence Number
                    Delete User Identifier
                    Number of Modifications
                    Archive Status
                    Archive Date
Example:
```

| Licensee Identifier | Objective Identifier | Objective Name |
|---|---|---|
| LICN1 | 0100 | Growth |
| LICN1 | 0200 | Income |
| LICN1 | 0300 | Growth with Income |
| LICN1 | 0400 | Capital Preservation |
| LICN1 | 0500 | High-Risk |

(AL) Account Legal Capacity

```
        Primary Data consisting of
                    Licensee Identifier
                    Legal Capacity Identifier
                    Legal Capacity Description
                    +
        Other Details
                    +
        Audit Fields consisting of processing Model 1
                    Add Date
                    Add Sequence Number
                    Add User Identifier
                    Change Date
                    Change Sequence Number
                    Change User Identifier
                    Delete Date
                    Delete Sequence Number
                    Delete User Identifier
                    Number of Modifications
                    Archive Status
                    Archive Date
Example:
```

| Licensee Identifier | Legal Capacity Number | Legal Capacity Name |
|---|---|---|
| LICN1 | 010 | Trustee |
| LICN1 | 020 | Broker |
| LICN1 | 030 | Advisor |
| LICN1 | 040 | Agent |
| LICN1 | 050 | Escrow |
| LICN1 | 060 | Executor |
| LICN1 | 070 | Administrator |

(AJ) Account Jurisdiction

```
        Primary Data consisting of
                    Licensee Identifier
                    Jurisdiction Identifier
                    Jurisdiction Description
                    +
        Other Details
                    +
        Audit Fields consisting of Processing Model I
                    Add Date
                    Add Sequence Number
                    Add User Identifier
                    Change Date
                    Change Sequence Number
                    Change User Identifier
                    Delete Date
                    Delete Sequence Number
                    Delete User Identifier
```

-continued

Number of Modifications
     Archive Status
     Archive Date

Example:

| Licensee Identifier | Jurisdiction Identifier | Jurisdiction Name |
|---|---|---|
| LICN1 | CA | California |
| LICN1 | PA | Pennsylvania |
| LICN1 | VI | Virgin Islands |
| LICN1 | NA | Netherlands Antilles |

(AR) Account Representative

Primary Data consisting of
    Licensee Identifier
    Account Representative Identifier
    Account Representative Name
    +
  Other Details
    +
  Audit Fields consisting of processing Model 1
    Add Date
    Add Sequence Number
    Add User Identifier
    Change Date
    Change Sequence Number
    Change User Identifier
    Delete Date
    Delete Sequence Number
    Delete User Identifier
    Number of Modifications
    Archive Status
    Archive Date Example:

| Licensee Identifier | Representative Identifier | Representative Name |
|---|---|---|
| LICN1 | RR | Rhonda Red |
| LICN1 | WW | Wanda White |
| LICN1 | BB | Bill Brown |
| LICN | GG | Glenn Green |

(AN) Account Registration Name

Primary Data consisting of
    Licensee Identifier
    Registration Identifier
    Registration Description
    +
  Other Details
    +
  Audit Fields consisting of Processing Model 1
    Add Date
    Add Sequence Number
    Add User Identifier
    Change Date
    Change Sequence Number
    Change User Identifier
    Delete Date
    Delete Sequence Number
    Delete User Identifier
    Number of Modifications
    Archive Status
    Archive Date Example:

| Licensee Identifier | Registration Identifier | Registration Name |
|---|---|---|
| LICN1 | AA | Able & Company |
| LICN1 | BB | Baker & Company |
| LICN1 | CC | Charlie & Company |

(AM) Account Master

Primary Data consisting of

-continued

```
                Licensee Identifier
                Account Identifier
                Account Description
                Account Address
                Account Fiscal Year - MM
                Account Fiscal Year - DD
                Account Fiscal Year - Number of Periods
                Income Posting Code
                Account Type
                Account Objective
                Account Legal Capacity
                Account Jurisdiction
                Account Representative
                Account Registration Name
                Income/Expense Switch
                Receipts/Disbursement Switch
                Performance Measurement Switch
                Licensee Wholesaler
                Licensee Reseller
                Account Settlement Switch
                +
Other Details
                +
System Control Data consisting of
                Income Cash
                Principal Cash
                Invested Income
                Invested Principal
                Total Units - Assets
                Liabilities
                Total Units - Liabilities
                +
Capital Gain Control Fields consisting of
                Total Units
                Total Cost Basis
System Control Fields consisting of
                Total Income
                Total Expense
                Total Receipts
                Total Disbursements
                +
Pending Income consisting of
                Total Units
                Total Cost Basis
                Total Pending Income
                +
Pending Cap Adj Out consisting of
                Cap Adj Out - Units
                Cap Adj Out - Cost Basis
                Cap Adj In - Units
                Cap Adj In - Cost Basis
                +
Audit Fields consisting of processing Model 1
                Add Date
                Add Sequence Number
                Add User Identifier
                Change Date
                Change Sequence Number
                Change User Identifier
                Delete Date
                Delete Sequence Number
                Delete User Identifier
                Number of Modifications
                Archive Status
                Archive Date
```

| | |
|---|---|
| (AC) | Account Communication Links |

```
Primary Data consisting of
                Account Identifier
                Communications Number
                +
Other Details
                +
Audit Fields consisting of Processing Model 1
                Add Date
                Add Sequence Number
                Add User Identifier
                Change Date
```

```
                    Change Sequence Number
                    Change User Identifier
                    Delete Date
                    Delete Sequence Number
                    Delete User Identifier
                    Number of Modifications
                    Archive Status
                    Archive Date
Example:
```

| Licensee Identifier | Account Identifier | Communications Identifier |
|---|---|---|
| LICN1 | 123456 | ATT-001 |
| LICN1 | 123456 | TCI-345 |
| LICN1 | 234567 | US-West |
| LICN1 | 234567 | ATT-002 |
| LICN1 | 234567 | MCI |
| LICN1 | 456789 | Sprint |

(TM) Transaction Master

```
        Primary Data consisting of
                    Licensee Identifier
                    Transaction Identifier
                    Income Posting Code
                    Transaction Description
                    Add or Subtract Switch
                    Settlement Transaction Identifier
                    Terminate Settlement Switch
                    +
        Other Details
                    +
        Audit Fields consisting of Processing Model 1
                    Add Date
                    Add Sequence Number
                    Add User Identifier
                    Change Date
                    Change Sequence Number
                    Change User Identifier
                    Delete Date
                    Delete Sequence Number
                    Delete User Identifier
                    Number of Modifications
                    Archive Status
                    Archive Date
Example:
```

| Licensee Identifier | Transaction Identifier | Income Posting Code | Transaction Name |
|---|---|---|---|
| LICN1 | D01 | I | Paid Management Fee |
| LICN1 | D01 | I | Paid Management Fee |
| LICN1 | D01 | I | Paid Management Fee |
| LICN1 | SE | I | Sell Equity |
| LICN1 | SE | P | Sell Equity |
| LICN1 | SE | B | Sell Equity |
| LICN2 | D01 | P | Cellular Charge |
| LICN2 | D02 | P | Landline Charge |
| LICN2 | D03 | P | Direct Satellite Charge |
| LICN2 | D04 | P | America On-Line Charge |

(TP) Transaction Processor

```
        Primary Data consisting of
                    Licensee Identifier
                    Transaction Identifier
                    Transaction Income Posting Code
                    Transaction Process Description
                    +
        Other Details
                    +
        Audit Fields consisting of Processing Model 1
                    Add Date
                    Add Sequence Number
                    Add User Identifier
                    Change Date
                    Change Sequence Number
                    Change User Identifier
```

-continued

Delete Date
            Delete Sequence Number
            Delete User Identifier
            Number of Modifications
            Archive Status
            Archive Date Example:

| Licensee Identifier Suffix | Transaction Identifier | Income Posting Code | Operator | Operand 1 | Operand 2 |
|---|---|---|---|---|---|

(TR)  Transactions - Recurring

Primary Data consisting of
            Licensee Identifier
            Account Identifier
            Transaction Identifier
            Transaction Amount
            Begin Paying
            End Paying
            User Identifier
            +
    Other Details
            +
    Audit Fields consisting of Processing Model 1
            Add Date
            Add Sequence Number
            Add User Identifier
            Change Date
            Change Sequence Number
            Change User Identifier
            Delete Date
            Delete Sequence Number
            Delete User Identifier
            Number of Modifications
            Archive Status
            Archive Date Example:

| Licensee Identifier | Account Identifier | Transaction Identifier | Transaction Amount | Begin Date | End Date | User Identifier |
|---|---|---|---|---|---|---|

(EM)  Entity Master

Primary Data consisting of
            Entity Identifier
            Entity Description
            Asset or Liability Code
            Settlement Days
            +
    Income Collection Data consisting of
            Income Rate
            Income Ex-Date
            Income Record Date
            Income Payment Date
            +
    Capital Adjustment Data consisting of
            Capital Adjustment Rate
            Capital Adjustment Ex-Date
            Capital Adjustment Record Date
            Capital Adjustment Payment Date
            Capital Adjustment New Entity
            +
    Other Details
            +
    Audit Fields consisting of Processing Model 1
            Add Date
            Add Sequence Number
            Add User Identifier
            Change Date
            Change Sequence Number
            Change User Identifier
            Delete Date -continued

|  |  |
|---|---|
|  | Delete Sequence Number<br>Delete User Identifier<br>Number of Modifications<br>Archive Status<br>Archive Date |
| (EA) | Entity Attribute |

Primary Data consisting of
    Licensee Identifier
    Entity Identifier
    +
Management Decision-Making Data consisting of
    Diversification Type
    Diversification Group
    Diversification Class
    +
Performance Measurement Data consisting of
    Performance Type
    Performance Group
    Performance Class
    +
Accounting Data consisting of
    Accounting Control Number - Asset
    Accounting Control Number - Liability
    +
System Control Data consisting of
    Invested Income
    Invested Principal
    Total Units - Assets
    Liabilities
    Total Units - Liabilities
    +
Settlement Data consisting of
    Buy - In Units
    Buy - Out Cost Basis
    Sell - In Proceeds
    Sell- Out Units
    +
Other Details
    +
Audit Fields consisting of Processing Model 1
    Add Date
    Add Sequence Number
    Add User Identifier
    Change Date
    Change Sequence Number
    Change User Identifier
    Delete Date
    Delete Sequence Number
    Delete User Identifier
    Number of Modifications
    Archive Status
    Archive Date

| (ET) | Entity Transaction |
|---|---|

Primary Data consisting of
    Licensee Identifier
    Entity Identifier
    Transaction Identifier
    +
Other Details
    +
Audit Fields consisting of Processing Model 1
    Add Date
    Add Sequence Number
    Add User Identifier
    Change Date
    Change Sequence Number
    Change User Identifier
    Delete Date
    Delete Sequence Number
    Delete User Identifier
    Number of Modifications
    Archive Status
    Archive Date -continued Example:

| Licensee Identifier | Entity Identifier | Transaction Identifier |
|---|---|---|
| LICN1 | GM | BE |
| LICN1 | GM | XO |
| LICN1 | GM | XI |

(SG) System General Ledger

Primary Data consisting of
        Licensee Identifier
        +
    Control Fields consisting of
        Asset or Liability
        Account Type Identifier
        Accounting Control Number
        Account Balance
        +
    Other Details
        +
    Audit Fields consisting of Processing Model 1
        Add Date
        Add Sequence Number
        Add User Identifier
        Change Date
        Change Sequence Number
        Change User Identifier
        Delete Date
        Delete Sequence Number
        Delete User Identifier
        Number of Modifications
        Archive Status
        Archive Date Example:

(See Details provided)

(SJ) System Transaction Journal

Primary Data consisting of
        Licensee Identifier
        Account Identifier
        Transaction Identifier and either

| Buys/Sells | | Debits/Credits |
|---|---|---|
| Entity Identifier | | Entity Identifier (if any) |
| Purchase Date | | Principal |
| Amount Units | or | Income |
| Net Amount | | Net Amount |
| Cost Basis (if Sell) | | |

+
    Other Details
        +
    Currency Fields consisting of
        Currency Rate
        Currency From
        Currency To
        Currency Date
        +
    Sell Data consisting of
        Sell Date
        Sell Price
        Sell Proceeds
        Sell Transaction Date
        Sell Transaction Sequence Number
        Sell Transaction Lot
        Sell To
        Capital Gain Amount
        Capital Gain Period
        +
    Sell Currency Data consisting of
        Sell Currency Rate
        Sell Currency From -continued

|  |  |
|---|---|
| | Sell Currency To<br>Sell Currency Date<br>+<br>Audit Fields consisting of Processing Model 2<br>    Transaction Date<br>    Transaction Sequence Number<br>    Transaction Lot<br>    Reversing Transaction Date<br>    Reversing Sequence Number<br>    Reversing Transaction Lot<br>    Reversed By Transaction Date<br>    Reversed By Transaction Sequence Number<br>    Reversed By Transaction Lot<br>    Trade Date<br>    Archive Status<br>    Archive Date |
| (ST) | System Trade Settlement |
| | Primary Data consisting of<br>    Licensee Identifier<br>    Account Identifier<br>    Entity Identifier<br>    Purchase Date<br>    Amount Units<br>    Cost Basis<br>    Buyer/Seller<br>    Trade Settlement Date<br>    +<br>Currency Fields consisting of<br>    Currency Ratio<br>    Currency From<br>    Currency To<br>    Currency Date<br>    +<br>Other Details<br>    +<br>    Transaction Date<br>    Transaction Sequence Number<br>    Transaction Lot<br>    +<br>Audit Data consisting of<br>    Add Date<br>    Add User Identifier<br>    Archive Status<br>    Archive Date |
| (SS) | System Summary Table |
| | Primary Data consisting of<br>    Licensee Identifier<br>    Job Number<br>    Job Name<br>    Begin Time<br>    End Time<br>    Number of Accepts<br>    Number of Rejects<br>    Total Items<br>    +<br>Audit Data consisting of<br>    Add Date<br>    Add User Identifier<br>    Archive Status<br>    Archive Date |

Example:

| Licensee Identifier | Job Number | Job Name | Begin Time | End Time | Total Transactions | Number Accepts | Number Rejects |
|---|---|---|---|---|---|---|---|

| | |
|---|---|
| (SR) | System Reject Table |
| | Primary Data consisting of<br>    Licensee Identifier<br>    Licensee Record<br>    +<br>Audit Data consisting of<br>    Add Date<br>    Add User Identifier |

-continued

|  | Archive Status |
|  | Archive Date |

Example:

| License Identifier | Transaction Record |
|---|---|

| (SC) | System Transaction Count |
|---|---|

Primary Data consisting of
    Licensee Identifier
    Today's Date
    Transaction Identifier
    Transaction Count - Originate
    Transaction Count - Reversal
    +
Audit Data consisting of
    Add Date
    Add User Identifier
    Archive Status
    Archive Date Example:

| License Identifier | Transaction Date | Transaction Identifier | Transaction Count - Orig | Transaction Count - Rev |
|---|---|---|---|---|

| (CS) | Customer Income Statement (Income/Expense) |
|---|---|

Primary Data consisting of
    Licensee Identifier
    Account Identifier
    Fiscal Year - YYYY
    Fiscal Year - Period
    Income/Expense
    Income/Expense Number
    Income/Expense Balance
    +
Audit Fields consisting of
    Add Date
    Add User Identifier
    Archive Status
    Archive Date Example:

| Licensee Identifier | Account Identifier | Fiscal Year | Fiscal Period | Inc/Exp Identifier | Inc/Exp Number | Inc/Exp Balance |
|---|---|---|---|---|---|---|
| LICN1 | | | | | | |

| (CF) | Customer Cash Flow (Receipts/Disbursements) |
|---|---|

Primary Data consisting of
    Licensee Identifier
    Account Identifier
    Fiscal Year - YYYY
    Fiscal year - Period
    Receipt/Disbursement
    Receipt/Disbursement Number
    Receipt/Disbursement Balance
    +
Audit Fields consisting of
    Add Date
    Add User Identifier
    Archive Status
    Archive Date Example:

| Licensee Identifier | Account Identifier | Fiscal Year | Fiscal Period | Rec/Dis Identifier | Rec/Dis Number | Rec/Dis Balance |
|---|---|---|---|---|---|---|
| LICN1 | | | | | | |

| (CB) | Customer Balance Sheet |
|---|---|

Primary Data consisting of
    Licensee Identifier
    Account Identifier
    Entity Identifier
    Purchase Date -continued

```
                Amount Units
                Cost Basis
                +
Currency Data consisting of
                Currency Rate
                Currency From
                Currency To
                Currency Date
                +
Other Details
                +
Transaction Identification consisting of
                Transaction Date
                Transaction Sequence Number
                Transaction Lot
                +
Audit Fields consisting of
                Add Date
                Add User Identifier
                Archive Status
                Archive Date
```

(CG) Customer Capital Gains

```
Primary Data consisting of
                Licensee Identifier
                Account Identifier
                Entity Identifier
                Purchase Date
                Amount Units
                Cost Basis
                Purchase Price
                Buy From
                +
Transaction Identification consisting of
                Transaction Date
                Transaction Sequence Number
                Transaction Lot
                +
Buy Currency Fields consisting of
                Current Rate
                Currency From
                Currency To
                Currency Date
                +
Sell Data consisting of
                Sell Date
                Sell Price
                Sell Proceeds
                Sell Transaction Date
                Sell Transaction Sequence Number
                Sell Transaction Lot
                Sell To
                Capital Gain Amount
                Capital Gain Period
                +
Sell Currency Data consisting of
                Sell Currency Rate
                Sell Currency From
                Sell Currency To
                Sell Currency Date
                +
Audit Fields consisting of
                Add Date
                Add User Identifier
                Archive Status
                Archive Date
```

(CI) Customer Pending Income

```
Primary Data consisting of
                Licensee Identifier
                Account Identifier
                Entity Identifier
                Purchase Date
                Amount Units
                Cost Basis
                Purchase Price
                +
```

-continued

| | |
|---|---|
| | Transaction Identification consisting of<br>    Transaction Date<br>    Transaction Sequence Number<br>    Transaction Lot<br>    +<br>Payment Date Data consisting of<br>    Income - Ex-Date<br>    Income - Record Date<br>    Income - Payment Date<br>    +<br>Audit Fields consisting of<br>    Add Date<br>    Add User Identifier<br>    Archive Status<br>    Archive Date |
| (CA) | Pending Capital Adjustment |
| | Primary Data consisting of<br>    Licensee Identifier<br>    Account Identifier<br>    +<br>Pending Out Data consisting of<br>    Entity Identifier (Old Entity)<br>    Purchase Date<br>    Transaction Identifier (Exchange Out)<br>    Amount Units (Old Amount)<br>    Cost Basis<br>    Purchase Price<br>    +<br>Transaction Identification consisting of<br>    Transaction Date<br>    Transaction Sequence Number<br>    Transaction Lot<br>    +<br>Pending In Data consisting of<br>    Transaction Identifier (Exchange In)<br>    Entity Identifier (New Entity)<br>    Amount Units (New Amount)<br>    +<br>Payment Date Data consisting of<br>    Capital Adjustment - Ex-Date<br>    Capital Adjustment - Record Date<br>    Capital Adjustment - Payment Date<br>    +<br>Audit Fields consisting of<br>    Add Date<br>    Add User Identifier<br>    Archive Status<br>    Archive Date |
| (CP) | Customer Performance Measurement |
| | Primary Data consisting of<br>    Licensee Identifier<br>    Account Identifier<br>    Fiscal Year - YYYY<br>    Fiscal Year - Period<br>    Performance Measurement - Type<br>    Performance Measurement - Group<br>    Performance Measurement - Class<br>    Beginning Value<br>    Beginning Units<br>    Contributions<br>    Distributions<br>    Income<br>    Expenses<br>    Management Fees<br>    Commissions<br>    Federal Taxes<br>    State Taxes<br>    Local Taxes<br>    Ending Value<br>    Ending Units<br>    Ending Net Asset Value<br>    +<br>Capital Gain Control Fields consisting of<br>    Total Units<br>    Total Cost Basis |

-continued

```
System Control Fields consisting of
        Total Income
        Total Expense
        Total Receipts
        Total Disbursements
        +
Pending Income consisting of
        Total Units
        Total Cost Basis
        Total Pending Income
        +
Pending Cap Adj Out consisting of
        Cap Adj Out - Units
        Cap Adj Out - Cost Basis
        Cap Adj In - Units
        Cap Adj In - Cost Basis
        +
Audit Fields consisting of
        Add Date
        Add User Identifier
        Archive Status
        Archive Date
```

Sample Data for License General Ledger Definition Table (L)

| Licensee Identifier | Asset or Liab | Accounting Control Number | Accounting Name |
|---|---|---|---|
| LICN1 | A | A05 | Municipal Bonds |
| LICN1 | A | A07 | Corporate Bonds |
| LICN1 | A | A10 | Common Stocks |
| LICN1 | A | A12 | Mutual Funds |
| LICN1 | A | A13 | International Currencies |
| LICN1 | A | A15 | Oil Partnerships |
| LICN1 | A | A20 | Real Estate Partnerships |
| LICN1 | A | A30 | Foreign Equities |
| LICN1 | A | A35 | Objects of Art |
| LICN1 | A | A40 | Jewelry |
| LICN1 | A | A45 | Homes |
| LICN | A | A50 | Automobiles |
| LICN | A | A90 | Derivatives |
| LICN2 | A | W10 | MSA/RSA -North |
| LICN2 | A | W20 | MSA/RSA -East |
| LICN2 | A | W30 | MSA/RSA -South |
| LICN2 | A | W40 | MSA/RSA -West |
| LICN2 | A | L10 | Alabama |
| LICN2 | A | L20 | Alaska |
| . | . | . | . |
| . | . | . | . |
| . | . | . | . |
| LICN2 | A | L500 | Wyoming |
| LICN2 | A | S10 | Major Market 1 |
| LICN2 | A | S20 | Major Market 2 |
| LICN2 | A | S30 | Major Market 3 |
| . | . | . | . |
| . | . | . | . |
| . | . | . | . |
| LICN2 | A | S1000 | Major Market N |
| LICN3 | A | C10 | Cash |
| LICN3 | A | C20 | Other Current Assets |
| LICN3 | A | C30 | Fixed Assets |
| LICN3 | A | C40 | Depreciation |
| LICN3 | A | C50 | Intangible Assets |
| LICN1 | L | L05 | Uninvested Income |
| LICN1 | L | L10 | Invested Income |
| LICN1 | L | L15 | Uninvested Principal |
| LICN1 | L | L20 | Invested Principal |
| LICN1 | L | L30 | Personal Notes |
| LICN1 | L | L40 | Mortgages |
| LICN1 | L | L90 | Income |
| LICN1 | L | L60 | Short-Term Liabilities |
| LICN1 | L | L65 | Deferred Taxes |
| LICN1 | L | L70 | Long-Term Liabilities |
| LICN1 | L | L75 | Net Worth |

Sample Data for System General Ledger Table

| Licensee Master | Asset or Liab | Account Type | Accounting Control Number | Accounting Name |
|---|---|---|---|---|
| LICN1 | A | 000 | 000 | Financial Services Assets |
| LICN1 | A | 100 | 000 | Pension Trust |
| LICN1 | A | 100 | A01 | Income Cash Demand |
| LICN1 | A | 100 | A02 | Income Cash Overdraft |
| LICN1 | A | 100 | A03 | Principal Cash Demand |
| LICN1 | A | 100 | A04 | Principal Cash Overdraft |
| LICN1 | A | 100 | A07 | Corporate Bonds |
| LICN1 | A | 100 | A10 | Common Stocks |
| LICN1 | A | 100 | A15 | Oil Partnerships |
| LICN1 | A | 100 | A20 | Real Estate Partnerships |
| LICN1 | A | 100 | A30 | Foreign Equities |
| LICN1 | A | 200 | 000 | Investment Advisory |
| LICN1 | A | 200 | A01 | Income Cash Demand |
| LICN1 | A | 200 | A02 | Income Cash Overdraft |
| LICN1 | A | 200 | A03 | Principal Cash Demand |
| LICN1 | A | 200 | A04 | Principal Cash Overdraft |
| LICN1 | A | 200 | A05 | Municipal Bonds |
| LICN1 | A | 200 | A07 | Municipal Bonds |
| LICN1 | A | 200 | A10 | Common Stocks |
| LICN1 | A | 200 | A12 | Mutual Funds |
| LICN1 | A | 200 | A13 | International Currencies |
| LICN1 | A | 200 | A15 | Oil Partnerships |
| LICN1 | A | 200 | A20 | Real Estate Partnerships |
| LICN1 | A | 100 | A30 | Foreign Equities |
| LICN1 | A | 100 | A90 | Financial Derivatives |
| LICN1 | A | 300 | 000 | Estates |
| LICN1 | A | 300 | A01 | Income Cash Demand |
| LICN1 | A | 300 | A02 | Income Cash Overdraft |
| LICN1 | A | 300 | A03 | Principal Cash Demand |
| LICN1 | A | 300 | A04 | Principal Cash Overdraft |
| LICN1 | A | 300 | A05 | Municipal Bonds |
| LICN1 | A | 300 | A07 | Corporate Bonds |
| LICN1 | A | 300 | A10 | Common Stocks |
| LICN1 | A | 300 | A12 | Mutual Funds |
| LICN1 | A | 300 | A15 | Oil Partnerships |

-continued

| Licensee Master | Asset or Liab | Account Type | Accounting Control Number | Accounting Name |
|---|---|---|---|---|
| LICN1 | A | 300 | A20 | Real Estate Partnerships |
| LICN1 | A | 300 | A30 | Foreign Equities |
| LICN1 | A | 300 | A35 | Objects of Art |
| LICN1 | A | 300 | A40 | Jewelry |
| LICN1 | A | 300 | A40 | Homes |
| LICN1 | A | 300 | A50 | Automobiles |
| LICN1 | A | 400 | 000 | Settlement Accounts - Buy |
| LICN1 | A | 400 | A01 | Income Cash Demand |
| LICN1 | A | 400 | A02 | Income Cash Overdraft |
| LICN1 | A | 400 | A03 | Principal Cash Demand |
| LICN1 | A | 400 | A04 | Principal Cash Overdraft |
| LICN1 | A | 400 | A05 | Corporate Bonds |
| LICN1 | A | 400 | A07 | Municipal Bonds |
| LICN1 | A | 400 | A10 | Common Stocks |
| LICN1 | A | 400 | A15 | Oil Partnerships |
| LICN1 | A | 400 | A20 | Real Estate Partnerships |
| LICN1 | A | 400 | A30 | Foreign Equities |
| LICN1 | A | 500 | 000 | Settlement Accounts - Sell |
| LICN1 | A | 500 | A01 | Income Cash Demand |
| LICN1 | A | 500 | A02 | Income Cash Overdraft |
| LICN1 | A | 500 | A03 | Principal Cash Demand |
| LICN1 | A | 500 | A04 | Principal Cash Overdraft |
| LICN1 | A | 500 | A05 | Corporate Bonds |
| LICN1 | A | 500 | A07 | Municipal Bonds |
| LICN1 | A | 500 | A10 | Common Stocks |
| LICN1 | A | 500 | A15 | Oil Partnerships |
| LICN1 | A | 500 | A20 | Real Estate Partnerships |
| LICN1 | A | 500 | A30 | Foreign Equities |
| | | | (AND/OR) | |
| LICN2 | A | 1000 | 000 | Communication Assets |
| LICN2 | A | 1000 | W00 | Wireless Communications |
| LICN2 | A | 1000 | W10 | MSA/RSA - North |
| LICN2 | A | 1000 | W20 | MSM/RSA - East |
| LICN2 | A | 1000 | W30 | MSA/RSA - South |
| LICN2 | A | 1000 | W40 | MSA/RSA - West |
| LICN2 | A | 2000 | L00 | Landline Communications |
| LICN2 | A | 2000 | L10 | Alabama |
| LICN2 | A | 2000 | L20 | Alaska |
| . | | | . | |
| . | | | . | |
| . | | | . | |
| LICN2 | A | 2000 | L500 | Wyoming |
| LICN2 | A | 3000 | S00 | Satellite Broadcast |
| LICN2 | A | 3000 | S10 | Major Market 1 |
| LICN2 | A | 3000 | S20 | Major Market 2 |
| LICN2 | A | 3000 | S30 | Major Market 3 |
| . | | | . | |
| . | | | . | |
| LICN2 | A | 3000 | S1000 | Major Market 4 |
| | | | (AND/OR) | |
| LICN3 | A | 0000 | 000 | Corporate Assets |
| LICN3 | A | 9000 | 000 | Domestic Subsidiary |
| LICN3 | A | 9000 | C10 | Cash |
| LICN3 | A | 9000 | C20 | Other Current Assets |
| LICN3 | A | 9000 | C30 | Fixed Assets |
| LICN3 | A | 9000 | C40 | Depreciation |
| LICN3 | A | 9000 | C50 | Intangible Assets |
| LICN3 | A | 9000 | 000 | Foreign Subsidiary |
| LICN3 | A | 9000 | C10 | Cash |
| LICN3 | A | 9000 | C20 | Other Current Assets |
| LICN3 | A | 9000 | C30 | Fixed Assets |
| LICN3 | A | 9000 | C40 | Depreciation |
| LICN3 | A | 9000 | C50 | Intangible Assets |
| LICN1 | L | 000 | 000 | Financial Services Liabilities |
| LICN1 | L | 100 | 000 | Pension Trust |
| LICN1 | L | 100 | L15 | Uninvested Principal |
| LICN1 | L | 100 | L20 | Invested Principal |
| LICN1 | L | 200 | 000 | Investment Advisory |
| LICN1 | L | 200 | L05 | Uninvested Income |
| LICN1 | L | 200 | L10 | Invested Income |
| LICN1 | L | 200 | L15 | Uninvested Principal |
| LICN1 | L | 200 | L20 | Invested Principal |
| LICN1 | L | 300 | 000 | Estates |
| LICN1 | L | 300 | L05 | Uninvested Income |
| LICN1 | L | 300 | L10 | Invested Income |
| LICN1 | L | 300 | L15 | Uninvested Principal |
| LICN1 | L | 300 | L20 | Invested Principal |
| LICN1 | L | 300 | L30 | Personal Notes |
| LICN1 | L | 300 | L40 | Mortgages |
| LICN1 | L | 400 | 000 | Settlement - Buy |
| LICN1 | L | 400 | L15 | Uninvested Principal |
| LICN1 | L | 400 | L20 | Invested Principal |
| LICN1 | L | 500 | 000 | Settlement - Buy |
| LICN1 | L | 500 | L15 | Uninvested Principal |
| LICN1 | L | 500 | L20 | Invested Principal |
| | | | (AND/OR) | |
| LICN2 | L | 1000 | 000 | Communications |
| LICN2 | L | 1000 | 000 | Wireless |
| LICN2 | L | 1000 | L90 | Income |
| LICN2 | L | 2000 | 000 | Landline |
| LICN2 | L | 2000 | L90 | Income |
| LICN2 | L | 3000 | 000 | Satellite Broadcast |
| LICN2 | L | 3000 | L90 | Income |
| | | | (AND/OR) | |
| LICN3 | L | 9000 | 000 | Domestic Subsidiary |
| LICN3 | L | 9000 | L60 | Short-Term Liabilities |
| LICN3 | L | 9000 | L65 | Deferred Taxes |
| LICN3 | L | 9000 | L70 | Long-Term Liabilities |
| LICN3 | L | 9000 | L75 | Net Worth |
| LICN3 | L | 9000 | 000 | Foreign Subsidiary |
| LICN3 | L | 9000 | L60 | Short-Term Liabilities |
| LICN3 | L | 9000 | L65 | Deferred Taxes |
| LICN3 | L | 9000 | L70 | Long-Term Liabilities |
| LICN3 | L | 9000 | L75 | Net Worth |

A Standardized Method for Naming the Programs (or SQL Scripts) and Data Elements of Real-time Multiprocessed Automated Applications The specific invention is a standardized file naming convention to be used in the automatic generation of program code for multiple large-scale transaction processing applications (such as securities trading, telecommunications billing, and work management) on multi-processing computers (using 4, 8, 16, 32 processors) with 100% auditability of user-defined controls. The standardized file naming convention is totally independent of any specific a.) application such as accounts receivable, customer billing, etc., b.) industry such as financial services, telecommunications, or work management, c.) hardware manufacturer such as Compaq, Digital, HP, IBM, NCR, Unisys, d.) operating system such as MS-DOS, UNIX, OpenVMS, MVS, etc., e.) relational database management system such as Oracle, Sybase, MS-SQL Server, f.) computer language such as SQL, COBOL, Fortran, PL/1, etc.

The standard naming convention contains the fewest number of characters in any naming conventions; namely, eleven characters used by MS-DOS. The naming convention of MS-DOS uses eight characters as a file name and three characters as a file extension wherein the user may define a file name using the alphabet and selected other characters. While this flexibility is suitable for home use are a small number of files and users, it is not acceptable for large-scale enterprise-wide applications with large number of files and large number of supporting technicians. Hence, the need for enterprise-wide standards.

The standard file naming convention contains six elements that permit the technician to readily identify the functionality of the specific script (or program) without looking at its contents. Using ANSI Standard structured Query Language as an example language, the six elements are:

a.) a 2-character mnemonic for the SQL commands such as:

| Mnemonic | ANSI Standard SQL Commands |
|---|---|
| CT | Create Table |
| SF | Select From Table |
| DF | Delete From |
| DT | Drop Table |
| II | Insert Into |
| SI | Select Into |
| CS | Create Sequence |
| DS | Drop Sequence |
| CI | Create Index |
| DI | Drop Index |
| RV | Review |
| RT | Retest |
| RS | Reset, etc. | b.) a 2-character mnemonic for the application name such as

| Mnemonic | User Defined Application Name Examples |
|---|---|
| ST | Securities Trading |
| TC | Telecommunications Billing |
| WM | Work Management, etc. | c.) a 2-character mnemonic for the table (or file name) such as

| Mnemonic | User-Defined Table Name Examples |
|---|---|
| AM | Account Master Name/Address/Etc. |
| SM | Securities Master |
| DC | Detail Calls |
| XB | External Billing, etc. | d.) a 1-character mnemonic for the table cluster role such as

| Mnemonic | Standard Table Roles |
|---|---|
| M | Master |
| I | Input |
| A | Accepts |
| R | Rejects |
| H | History |
| S | Summary |
| 1 | Master History |
| 2 | Accepts History |
| O | Output | e.) a 1-character mnemonic for the table cluster type such as

| Mnemonic | Standard Table Types |
|---|---|
| M | Master |
| J | Journal |
| T | Temporary |
| 1–9 | Index Numbers | f.) a 3-character extension is then added to the file name depending upon
the type of operating system being used such as MS-DOS, UNIX, OpenVMS, etc. and
whether or not the file is a source file for programmer use or a compiled file (or stored procedure) for machine use.

Hence, script name examples are:
CTXBMDMM.SQL—Create Table for the External Billing System, Master Definition Table Cluster, Master Table, and Master Role for SQL use.
DTXBDCOJ.SQL—Drop Table for the External Billing System, Detail Call Cluster, Output Table, and Journal Role for SQL use.

Circumstances Leading to the Invention

The circumstances leading to the invention of a standard SQL script naming convention are:

a.) one programmer will rarely adhere to the same naming conventions over time and unless an acceptable standard is defined each succeeding programmer added to the job will only complicate the issue by bringing their own standards. Hence, software maintenance becomes a matter of knowing which programmer wrote which program at what time.

b.) without a naming standard any programmer has no idea of what functions the programming is performing without opening the program and examining the program code. This process produces create inefficient maintenance by existing programmers and inefficient training for new programmers.

c.) Competitive pressures are mounting for the efficient of software maintenance.

Advantage of the Invention

Because no duplicate script names are permitted the name of each SQL Script should a.) convey to the user the precise use of each SQL Script and b.) permit the storage of all SQL scripts in a one SQL Script Library, or directory.

A standard naming convention also permits the user to determine what scripts may be automatically executed in sequence by use of a SQL command script, which is a single SQL script containing a list of SQL scripts to be executed in sequence. Hence, any single SQL scripts contained in the SQL Library can be reused in many different SQL command scripts.

Although any standard naming convention represents a unique entity separate and apart from the other technologies described immediately above, this particular naming convention is unique in that it embraces all of the logical information necessary to readily identify the role of the script in the total system.

Detailed Description of Invention std_name is a standard naming convention that constructs names for programs (or SQL Scripts), system tables, table clusters, and data elements. The seven basic elements are:

| | | | |
|---|---|---|---|
| 1.) org_name | Organization | 2 |
| 2.) com_name | SQL Command | 2 |
| 3.) app_name | Application | 2 |
| 4.) tab_name | Table | 2 |
| 5.) rol_name | Table Role | 1 |
| 6.) typ_name | Table Type | 1 |
| 7.) col_name | Column (or Field) | 4 | std_name defines both "external" names used by the operating system and "internal" names used by the specific program.

The "external" resulting names are:

| | | |
|---|---|---|
| 1.) clu_name | Cluster Name | 4 |
| 2.) sys_name | System Table Name | 6 |
| 3.) ext_name | Extension Name | 3 |
| 4.) sql_name | SQL Script Name | 11 (8 name plus 3 extension) | where the SQL Script Names are used by the operating systems.

The "internal" resulting names are:

| | | |
|---|---|---|
| 1.) tab_iden | Table Iden Name | 4 |
| 2.) col_name | Column (or Field) Name | 4 |
| 3.) dat_name | Data Element Name | 8 or more, in increments of 4 | where the Data Element Names are used by the programs (or SQL Scripts).

External Names used by the operating system in identifying programs (or SQL Scripts) are created by employing the following naming components:

| | |
|---|---|
| com_name | SQL Command Mnemonic |
| app_name | Application Name Mnemonic |
| tab_name | Table Name Mnemonic |
| rol_name | Table Role Name Mnemonic |
| tab_name | Table Type Name Mnemonic |
| ext_name | Extension Mnemonic |

| | 1 | 2 | 3 | 4 | 5 | 6 | 7 | 8 | . | 9 | 10 | 11 |
|---|---|---|---|---|---|---|---|---|---|---|---|---|
| Examples: | C | T | X | B | M | D | M | M | . | S | Q | L |
|  | S | F | X | B | M | D | M | M | . | S | Q | L |

| | |
|---|---|
| clu_name | |
| tab_iden | |
| sys_name | ext_name |
| sql_name | |

Internal Names used by the program (or SQL Script) in processing the data elements are created by employing the following naming components:

| 5 | 6 | 7 | 8 | |
|---|---|---|---|---|
| tab_name | | | | Table Name Mnemonic |
| | rol_name | | | Role Name Mnemonic |
| | | typ_name | | Type Name Mnemonic |
| | | | col_name | Column Name |

| Examples: | M | D | M | M | LNAM . . . for last name |
|---|---|---|---|---|---|
| | M | D | M | M | FNAM . . . for first name |
| | M | D | M | M | MNAM . . . for middle name |
| | M | D | M | M | ADR1 . . . address - 1st line |
| | M | D | M | M | ADR2 . . . address - 2cd line |
| | M | D | M | M | CITY . . . city |
| | M | D | M | M | STAT . . . state |
| | M | D | M | M | ZIPC . . . zip code |
| | dat_name | | | | |

Data Tracing

By addressing both the external names for the operating system and the internal names for a specific program, the naming convention is global in nature. In the event that one data element derives its source of input from another table rather than its own specific input screen, then the data name is extended by placing the table identifier of the table supplying the data between the first four and second four characters of the intended data name. Should the data be derived from another table that also derived its data from another table, then eight characters are placed between the first four characters and the last four characters of the intended data name. In the fashion, the data name points backwards through all of the preceding tables to the original source of data and its input form. This process is called "data tracing", and it provides benefits to programmers in the testing and debugging stages of software development by identifying the original source of data. Thus, "data tracing" provides the programmer with thorough documentation of the data flow throughout an entire system.

Standard naming conventions do not apply to certain language extensions such as the script footings that, for example, specify the size of the table to be created in a "Create Table" script.

The foregoing discussion of the invention has been presented for purposes of illustration and description. Further, comments and description is not intended to limit the invention to the form disclosed herein. Consequently, variation and modification commensurate with the above teachings, and within the skill and knowledge of the relevant art, are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for processing financial transactions for disparate applications, comprising:
   providing a system that facilitates (1) flexibility to satisfy customized needs of an enterprise or individual, (2) auditability to track all financial transactions from data inception to permanent archives, without substantial error, and (3) multi-processing of each individual transaction to expedite response times, said user definability consists essentially of steps a–e:

(a) defining a set of driven tables comprising a set of data records or a set of financial reports selected from the group consisting of balance sheets, income statements, cash flow statements, performance measurements, capital gains, pending income/expense, pending capital adjustments, general ledger, and transaction ledger;

(b) defining a set of data records that provides verification of incoming data for the processing of accounts, financial entities, account structures, management philosophies, management information, and any of said financial reports;

(c) defining a first driving table comprising a set of disparate financial transactions used to update any one or more of said reports set forth in step (a), each said transaction having one entry in a transaction master table which identifies a transaction name;

(d) defining a second driving table comprising a set of disparate processing algorithms in a transaction processing table for each transaction in step (c), each of said algorithms containing one operator and first and second operands, said first operand identifying a specific input variable in said data records and said second operand identifying a specific output value to be updated in one more of the financial tables set forth in step (a);

(e) aggregating a set of incoming random disparate financial transactions into a single machine readable input table;

wherein said step of multi-processing consists essentially of:

(f) reading an input record from said input table, said input table containing at least three or more variables, two of said variables which comprise at least a licensee identifier and a transaction identifier, with all remaining of said variables representing input values;

(g) matching said licensee identifier and said transaction identifier with a like licensee identifier and transaction identifier in said transaction master table, said transaction master table containing a list of all financial transactions as set forth in step (c);

(h) matching said licensee identifier and said transaction identifier on said data record with a set of algorithms in said transaction processing table as set forth in step (d);

(i) assigning the next available algorithm matched in step (h) from said transaction processing table to be processed to the next available processor in a multi-processing machine to update one or more values in said driven table with a specific value identified in said data record;

(j) returning to said next algorithm identified in step (d) and continuing processing until all of said algorithms for said specific transaction are processed;

(k) repeating step (f) to read a next input record until all of said input records are processed;

(l) adding subsequent data records to said driven tables as set forth in step (a);

(m) adding subsequent data records to said transaction master as set forth in step (c); and (n) adding subsequent data records to said transaction processing table sot forth in step (d).

2. The method as set forth in claim 1, further comprising:

(a) creating at least three control fields for every one of said data records in at least three control tables;

(b) updating said three control fields for a specific one of said data records in each of said three control tables with thee values from each transaction process; and (c) aggregating said at least three control fields in all of said data records in at least said three control tables.

3. The method as set forth in claim 1, wherein at least some of said data records are transferred from a first set of tables to a second set of tables, wherein data records in said second set of tables cannot be changed.

4. The method as set forth in claim 1, wherein sad data records comprise a data field selected from the group consisting of:

(1) Insert Date;

(2) Insert Sequence Number;

(3) Insert User Identifier;

(4) Insert Update Date;

(5) Update Sequence Number;

(6) Update User Identifier;

(7) Delete Date;

(8) Delete Sequence Numbers;

(9) Delete User Identifier; and

(10) Number of Times Updated.

5. The method as set forth in claim 1, further comprising reversing at least one of said individual transaction.

6. The method as set forth in claim 1, wherein said algorithms are processed on separate processors.

7. The method as set forth in claim 1, wherein said step of multi-processing comprises overlapping of at least one of said algorithms.

8. The method as set forth in claim 1 wherein said step of processing is performed on a multi-processing machine.

* * * * *